(12) United States Patent
Oomura et al.

(10) Patent No.: US 6,259,466 B1
(45) Date of Patent: Jul. 10, 2001

(54) LIGHT SOURCE DRIVE APPARATUS AND IMAGE FORMATION APPARATUS

(75) Inventors: Masanobu Oomura, Kawasaki; Somei Kawasaki, Urawa, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/253,511

(22) Filed: Feb. 22, 1999

(30) Foreign Application Priority Data

Feb. 25, 1998 (JP) .................................... 10-043339
Feb. 27, 1998 (JP) .................................... 10-048173

(51) Int. Cl.[7] .................................... B41J 2/435
(52) U.S. Cl. .................................... 347/237; 347/247
(58) Field of Search .................................... 347/246, 247, 347/237, 253, 236; 372/29, 38

(56) References Cited

U.S. PATENT DOCUMENTS 5,912,694 * 6/1999 Miyake et al. .................................... 347/247

* cited by examiner

*Primary Examiner*—N. Le
*Assistant Examiner*—Hai C. Pham
(74) *Attorney, Agent, or Firm*—Fitzpatrick, Cella, Harper & Scinto

(57) ABSTRACT

An image formation apparatus stably controls a drive current of a laser diode irrespective of change in density. In the apparatus, a current restriction circuit restricts a current ILD according to the output light quantity. If the current ILD increases and thus approaches to the value of a reference current IPO, the circuit outputs the current restricted to be the certain value substantially equal to the current IPO. Then, current buffers and, a current subtraction circuit, a switching circuit and a current addition circuit cooperatively supply the function current obtained from the input and output currents of the circuit to the cathode of the laser diode.

24 Claims, 29 Drawing Sheets

LIGHT SOURCE DRIVE APPARATUS AND IMAGE FORMATION APPARATUS

BACKGROUND OF THE INVENTION

1. Field of the Invention

The present invention relates to an image formation apparatus, and more particularly to an image formation apparatus such as a copy machine, a printer, a facsimile apparatus or the like which exposes a photosensitive body by driving a laser beam source on the basis of a detection signal obtained by detecting a laser beam from the laser beam source to form a latent image on a photosensitive face of the photosensitive body.

2. Related Background Art

In an image formation apparatus or the like which performs digital optical communication or an electrophotographic process, a laser diode is used as a light emission element to convert an electrical pulse signal into an optical pulse. For this laser diode, it is required to be able to obtain the desired light emission quantity even if the operation temperature of the element changes. However, since the light emission characteristic of the laser diode highly depends on the operation temperature, it is necessary to control a laser diode drive current by a light emission element drive circuit so as to obtain the desired light quantity even if the operation temperature changes.

As a first conventional example, FIG. 30 shows the structure of the laser diode drive circuit which performs the pulse current control on a laser of cathode drive type.

In FIG. 30, numeral 3001 denotes a comparator, numerals 3002 and 3006 denote reference voltage sources, numeral 3003 denotes a sample-and-hold (S/H) circuit, numeral 3004 denotes a hold capacitor (CH), numeral 3005 denotes a current amplification circuit, numeral 3008 denotes a reference current source (IO), numeral 3007 denotes a switching circuit (SW), numeral 3011 denotes a laser diode (LD), numeral 3012 denotes a photodiode (PD), and numeral 3010 denotes a monitor resistor (RM).

In the conventional example shown in FIG. 30, for the sampling state of the S/H circuit 3003 (referred as APC (automatic power control) operation hereinafter), the switching circuit 3007 is ON, and input data (DATA) is set such that the laser diode 3011 is in its entire-face light emission state. In the APC operation, the light quantity from the laser diode 3011 is monitored at the photodiode 3012 such that the light emission quantity of the diode 3011 becomes the desired quantity. Then, if a monitor current IM produced at the photodiode 3012 flows in the monitor resistor 3010, a monitor voltage VM is produced at the end of the monitor resistor 3010. Further, the laser diode drive current is controlled by the current amplification circuit 3005 on the basis of the reference current source 3008 such that the monitor voltage VM becomes constant (i.e., light emission quantity becomes constant).

Further, during the hold of the S/H circuit 3003, the laser diode drive current is set to be ON/OFF by the switching circuit 3007 according to the input data, whereby the pulse modulation signal is given to the laser diode 3011.

However, in the structure shown in FIG. 30, if the operation frequency in the optical pulse modulation becomes high, the problem of light emission delay which is peculiar to the laser diode occurs, whereby the transition characteristic of the modulated optical pulse deteriorates.

FIG. 31 shows a second conventional example relating to one method to solve the above problem of the first conventional example. In the second conventional example, a DC bias current is added to the laser diode drive current to improve the transition characteristic of the optical pulse which has been deteriorated by the light emission delay of the laser diode. Since the basic structure of the second conventional example is the same as that of the first conventional example shown in FIG. 30, the detailed explanation thereof is omitted. In FIG. 31, numeral 3009 denotes a current source (IB) which produces the bias current, and numeral 3015 denotes a reference pulse current source (IPO).

Also, in the second conventional example of FIG. 31, during the APC operation, the switching circuit 3007 is ON, and the input data is set such that the laser diode 3011 is in its entire-face light emission state. A pulse current IP is controlled by the current amplification circuit 3005 according to the reference pulse current IPO, on the basis of the monitor voltage VM obtained by the structure consisting of the photodiode 3012 and the monitor resistor 3010, so that the light emission quantity of the laser diode 3011 becomes constant in the entire-face light emission state. Then, a laser diode drive current ILD is determined by superimposing the pulse current IP on the bias current IB.

Further, during the hold of the S/H circuit 3003, the pulse current IP is set to be ON/OFF by the switching circuit 3007 according to the input data, whereby the pulse modulation signal is given to the laser diode drive current ILD.

In the second conventional example of FIG. 31, if the bias current IB is not added nearly up to the threshold current from which the laser diode 3011 starts light emission, it is impossible to effectively lower the light emission delay of the diode 3011.

However, in the second conventional example, as described above, the oscillation threshold current of the diode 3011 changes due to the operation temperature. Also, such the current changes according to respective elements. For these reasons, since the optical pulse does not completely come to be OFF, there is every possibility that a sufficient quenching ratio can not be obtained. Therefore, it is difficult in the practical use to set the bias current to be the fixed value nearby the threshold current.

FIG. 32 shows a third conventional example. Like the second conventional example, the third conventional example relates to the method in which the bias current is added to the drive current. However, the current to be controlled is the bias current while the pulse current is given as the fixed current. In FIG. 32, it should be noted that the detailed explanations of the parts added with the same reference numerals as those in FIG. 30 are omitted. In the drawing, numeral 3013 denotes a reference bias current source (IB0) which determines a bias current IB, and numeral 3014 denotes a pulse current source (IP) which produces the pulse current IP.

Also, in the third conventional example of FIG. 32, during the APC operation, the switching circuit 3007 is ON, and the input data is set such that the laser diode 3011 is in its entire-face light emission state. In order that the light emission quantity of the laser diode 3011 reaches the desired value in the light emission state, the bias current IB is controlled by the current amplification circuit 3005 according to the reference bias current IB0, on the basis of the error voltage (i.e., difference voltage) between the monitor voltage VM obtained by the structure consisting of the photodiode 3012 and the resistor 3010 and a reference voltage Vref1 corresponding to the desired light quantity, thereby controlling the laser diode drive current ILD. Further, during the hold of the S/H circuit 3003, the pulse current IP is set to be ON/OFF by the switching circuit 3007 according to the input data, whereby the pulse data is given to the laser diode drive current ILD to perform the optical pulse modulation.

However, in the third conventional example of FIG. 32, e.g., when the laser diode drive current may be small in such the case as the laser diode 3011 operates at low temperature, there is some possibility that the bias current becomes unnecessary and thus the operation becomes uncontrollable.

Hereinafter, the case where the operation becomes uncontrollable will be explained in detail.

FIG. 33 shows the relation between the laser drive diode current ILD and a light output P based on the change in the operation temperature of the general laser diode.

If the operation temperature rises, the threshold current increases, whereby the laser diode drive current ILD increases. In this case, the above-described problem does not occur. On the other hand, if the operation temperature lowers, the threshold current decreases. Thus, since the current ILD may be small, the bias current IB is decreased to set the light output P to have the desired value. However, in such the state as the bias current IB is unnecessary and also the desired light output can be obtained at the value lower than the setting value of the pulse current IP, it is impossible to control the light quantity to be constant. This is because the pulse current IP being the fixed value can not be set to be equal to or lower than the setting value.

Further, in the temperature characteristic of the laser diode, there is the specific phenomenon that the slope efficiency (also called as differential efficiency) is lowered in the laser oscillation area. Thus, in the optical pulse modulation, in the case where the laser diode drive current is increased due to increase of the operation temperature or the like and thus the slope efficiency is lowered, it is impossible to sufficiently secure the quenching ratio of the laser diode if the pulse current is not increased.

FIG. 34 shows the relation between the change of the temperature and the change of the laser drive current ILD and also shows the ratio of the pulse current to the bias current.

If an operation temperature Ta is lowered, the laser drive current ILD decreases. Even if the operation temperature Ta is further lowered, it is possible to set the light emission quantity of the laser diode to be constant until the bias current IB reaches "IB=0". However, if the bias current becomes unnecessary, the control becomes impossible. That is, in an area A of FIG. 34, the current to be used to decrease the pulse current IP is necessary, whereby it is impossible to perform the control for obtaining the desired light quantity.

As described above, in the conventional technique, in order to secure the high-speed light emission operation of the laser diode, the DC current close to the oscillation threshold current has been previously supplied as the bias current. Then, the pulse current according to the input data is superimposed on the bias current, and the obtained current is supplied to the laser diode. In this operation, as the methods to drive the light emission operation of the laser diode, there are the pulse current control and the bias current control, and each control has its merits and demerits.

In the bias current control, the high-speed optical pulse modulation can be secured. However, there is every possibility that sufficient quenching ratio of the laser beam can not be obtained due to the changes of the oscillation threshold current and the slope efficiency that occur by the operation temperature change of the laser diode or the like. Further, in the state that the bias current is equal to or lower than "0", it is impossible to perform the control for obtaining the desired light quantity. On the other hand, in the pulse current control, if the bias current is set not to exceed the threshold current in any operation temperature, the quenching ratio of the laser beam can be sufficiently secured. However, in such a case, when the optical pulse of high frequency is modulated, the transition characteristic of the optical pulse is deteriorated.

FIG. 35 shows the laser diode drive circuit used in a fourth conventional example.

In the drawing, numeral 3501 denotes a laser diode, and numeral 3502 denotes a photodiode which monitors the light emission quantity of the laser diode 3501. A controllable bias constant current source 3526 is connected to the laser diode 3501, and a controllable light emission constant current source 3527 is also connected to the diode 3501 through a switching circuit 3528 which generates the pulse modulation signal according to the input data. One end of a resistor r is connected to the output of the photodiode 3502, and the other end thereof is grounded. Further, a low-level sample-and-hold (S/H) circuit 3529 which samples and holds the quantity of the light emitted by the bias current and a high-level sample-and-hold (S/H) circuit 3530 which samples and holds the quantity of the light emitted by the light emission current are connected to the output of the photodiode 3502. Furthermore, the switching circuit 3528, the low-level S/H circuit 3529 and the high-level S/H circuit 3530 are controlled by a control circuit 3531.

Initially, in order to determine the bias current IB, the control circuit 3531 sends the control signal to set the switching circuit 3528 to be nonconductive. Then, the light emission quantity monitored by the photodiode 3502 is sampled and held by the low-level S/H circuit 3529, the obtained quantity is compared with the low-level reference light quantity value, thereby controlling the bias constant current 3526 to obtain the desired low-level light quantity.

Subsequently, the light emission current is determined. At this time, the control circuit 3531 sends the control signal to set the switching circuit 3528 to be conductive, and thus the light emission current is controlled in the state that the bias current flows. The light emission quantity monitored by the photodiode 3502 is sampled and held by the high-level S/H circuit 3530, the obtained quantity is compared with the high-level reference light quantity value, thereby controlling the light emission control current source 3527 to obtain the light quantity capable of giving the desired high level.

When the optical pulse modulation is intended to be performed on the laser diode, the switching circuit 3528 may be turned on/off according to the modulation data. Thus, the bias current is applied in the low level pulse modulation in the state that the circuit 3528 is OFF.

FIG. 36 shows the laser diode drive circuit used in a fifth conventional example.

Numeral 3501 denotes the laser diode, and numeral 3502 denotes the photodiode which monitors the light emission quantity from the laser diode 3501. The output of the photodiode 3502 is connected to a control circuit 3531. The controllable bias constant current source 3526 is connected to the laser diode 3501, and the controllable light emission constant current source 3527 is also connected to the diode 3501 through the switching circuit 3528 which generates the pulse modulation signal according to the input data.

Numeral 3531 denotes the control circuit which is composed of, e.g., the CPU and the like. The control circuit 3531 sends the control signal to a latch circuit 3532 for determining the bias current and also to a latch circuit 3533 for determining the light emission current. Numerals 3534 and 3535 respectively denote digital-to-analog (D/A) conversion circuits. The D/A conversion circuit 3534 converts the digital data held by the latch circuit 3532 into the analog data to supply the data for the output control of the bias constant current source 3526. On the other hand, the D/A conversion circuit 3535 converts the digital data held by the latch circuit 3533 into the analog data to supply the data for the output control of the light emission constant current source 3527.

FIG. 37 is the characteristic diagram showing the relation of the laser drive current and the laser light emission quantity.

If it is externally instructed to set the light emission quantity of the laser diode 3501 to be the desired light quantity, the control circuit 3531 initially sets the switching circuit 3528 to be nonconductive to determine the current value of the bias constant current source. Then, the circuit 3531 sends the control data signal to the latch circuit 3532 and the D/A conversion circuit 3534 to stepwise increase the bias current. After then, the bias current is stepwise increased, and the output current of the bias constant current source at the time when the light emission quantity of the laser diode 3501 is abruptly increased is considered as an oscillation threshold current Ith. Thus, the bias current source is controlled by correcting the current Ith.

Alternatively, in the circuit structure same as that shown in FIG. 36, the calculation means for obtaining the oscillation threshold current is provided in the control circuit 3531. Thus, in order to determine the current value of the bias constant current source, the circuit 3531 sets the switching circuit 3528 to be nonconductive and sends the control data to the latch circuit 3532 and the D/A conversion circuit 3534 to stepwise increase the bias current. If the light emission quantity of the laser diode 3501 reaches a predetermined first light emission quantity P1, the circuit 3531 stores bias current control data I1 obtained at that time into its internal memory. Also, the circuit 3531 increases the light emission quantity to increase the bias current up to a second light emission quantity P2, and stores bias current control data I2 obtained at this time into its internal memory.

Subsequently, the control circuit 3531 resets the data of the latch circuit 3532 and once stops the bias current control. Then, the circuit 3531 calculates the oscillation threshold current Ith of the laser diode 3501 from the bias current control data I1 for the first light emission quantity P1 and the bias current control data I2 for the second light emission quantity P2 on the basis of a following equation (I).

$$Ith = I2 - P2 \cdot (I2 - I1)/(P2 - P1) \quad (I)$$
$$= (P2 \cdot I1 - P1 \cdot I2)/(P2 - P1)$$

However, even if the oscillation threshold current Ith obtained based on the equation (I) is applied to the laser diode 3501 as the bias current, the diode 3501 is not sufficiently quenched. That is, as shown in FIG. 37, it has been known that the diode 3501 emits the light of light quantity Pth. For this reason, e.g., in the electrophotographic process, there is every possibility that such the light quantity produces undesirable background on the image.

Therefore, the control circuit 3531 has the means to correct the oscillation threshold current Ith on the basis of a following equation (II) or (III), thereby determining the bias current IB.

$$IB = Ith \times \alpha (0 \leq \alpha \leq 1) \quad (II)$$

$$IB = Ith - Ix (0 \leq Ix \leq Ith) \quad (III)$$

If the bias current IB is determined by the above means, the control circuit 3531 sends the digital data to the latch circuit 3532 such that the output current value of the bias constant current source 3526 has the value IB. Then, the D/A conversion circuit 3534 converts the digital data held by the latch circuit 3532 into the analog data, to control the bias constant current source 3526 and apply the bias current IB to the laser diode 3501.

Subsequently, the control circuit 3531 sets the switching circuit 3528 to be conductive, and sends the control data signal to the latch circuit 3533 to increase the light emission current up to the desired light emission quantity. That is, the current of the light emission constant current source 3527 is supplied to the laser diode 3501 in the state that the bias current IB is applied by the bias constant current source 3526. Then, if the light emission quantity of the diode 3501 reaches the desired light quantity, the circuit 3531 stops to increase the light emission current. The light emission current control data value at this time is held by the latch circuit 3533. When the optical pulse modulation is intended to be performed on the laser diode 3501, the switching circuit 3528 may be turned on and off according to the modulation data. Thus, the bias current is applied in the low-level pulse modulation in the state that the circuit 3528 is OFF.

However, the following problems have occurred in the conventional laser diode drive circuit.

In such the method as in FIG. 35 that the light emission quantity only by the bias current is monitored and the bias current is controlled based on the monitored quantity, it is impossible to completely make the low-level light quantity "0". Therefore, such the method may be used to perform the high- and low-level pulse modulation. However, if such the method is used in the electrophotographic process, it is desirable to restrict the low-level light quantity as little as possible. That is, if the light is produced from the laser diode in the low-level pulse modulation, there is every possibility that such the light quantity produces undesirable background on the image. This is the serious problem.

Further, when the very small low-level light quantity is detected, there is every possibility that it is resultingly impossible to stably control the bias current based on the output signal from the photodiode 3502.

On the other hand, in such a laser drive circuit as in FIG. 36, the bias current is stepwise increased by using the D/A conversion circuit to determine the bias current. Thus, in order to perform the accurate control, it is necessary to improve the resolution of the D/A conversion circuit. Especially, the serious problem due to high resolution occurs when the laser drive current is increased or the slope efficiency in the laser light emission area is increased. For example, if such the drive circuit is used in the electrophotographic process, it becomes difficult to output the halftone image.

Further, in such the control operation, since the current value is stepwise increased from the natural light emission area to the laser light emission area, a long operation time is necessary until the bias current and the light emission current are determined. Thus, the high-speed clock signal is necessary to terminate the control as quickly as possible.

SUMMARY OF THE INVENTION

An object of the present invention is to provide a light source drive apparatus which could solve the above-described problems.

In order to achieve the above object, the present invention provides the light source drive apparatus for causing a light source to generate a modulation light beam of a desired light quantity by supplying a drive current to the light source, wherein the drive voltage for causing the light source to generate the light beam of the desired light quantity is supplied to the light source on the basis of an ON state of an input signal, and a bias current to the extent that the light source does not generate the light beam is supplied according to a level of the drive current, on the basis of an OFF state of the input signal.

Further, in order to achieve the above object, the present invention provides the light source drive apparatus for causing a light source to generate a modulation light beam of a desired light quantity by supplying a drive current to the light source, comprising:

determination means for determining a drive current value for obtaining the light beam of the desired light quantity, wherein the current of the drive current value determined by the determination means is supplied to the light source on the basis of an ON state of an input signal, and a bias current to the extent that the light source does not generate the light beam is supplied according to a level of the drive current value determined by the determination means, on the basis of an OFF state of the input signal.

Further, in order to achieve the above object, the present invention provides the light source drive apparatus for causing a light source to generate a modulation light beam of a desired light quantity by supplying a drive current to the light source, comprising:

means for supplying the drive current for causing the light source to generate the light beam of the desired light quantity, to the light source on the basis of an ON state of an input signal;

means for supplying a bias current of a level to the extent that the light source does not generate the light beam, on the basis of an OFF state of the input signal; and restriction means for restricting a difference between a value of the drive current and a value of the bias current.

Further, in order to achieve the above object, the present invention provides the light source drive apparatus for causing a light source to generate a modulation light beam of a desired light quantity by supplying a drive current to the light source, comprising:

determination means for determining a value of the drive current by which the light beam of the desired light quantity is generated;

modulation current generation means for generating a modulation current modulated by an input signal;

restriction means for restricting an amplitude value of the modulation current;

bias current generation means for generating a bias current representing a difference between the value of the drive current and the amplitude value of the modulation current restricted by the restriction means; and supply means for adding the bias current to the modulation current of which amplitude value is restricted by the restriction means, and supplying the obtained current to the light source.

Further, in order to achieve the above object, the present invention provides the light source drive apparatus for causing a light source to generate a modulation light beam of a desired light quantity by supplying a drive current to the light source, comprising:

determination means for determining a value of the drive current by which the light beam of the desired light quantity is generated;

drive current generation means for generating the drive current;

modulation current generation means for generating a modulation current modulated by an input signal;

restriction means for restricting an amplitude value of the modulation current; and supply means for subtracting the modulation current restricted by the restriction means from the drive current, and supplying the obtained current to the light source.

Further, in order to achieve the above object, the present invention provides the light source drive apparatus for causing a light source to generate a modulation light beam of a desired light quantity by supplying a drive current to the light source, comprising:

determination means for determining a value of the drive current by which the light beam of the desired light quantity is generated;

means for generating a modulation current modulated according to an input signal; and restriction means for restricting an amplitude value of the modulation current, wherein the current of the determined value is supplied to the light source on the basis of an ON state of the input signal, and the current representing a difference between the determined value of the drive current and the amplitude value of the modulation current restricted by the restriction means is supplied to the light source on the basis of an OFF state of the input signal.

Other objects, structure and effect of the present invention will become apparent from the following detailed description and the accompanying drawings.

DETAILED DESCRIPTION OF PREFERRED EMBODIMENTS

Hereinafter, the embodiments of the present invention will be explained in detail with reference to the attached drawings.

(First Embodiment)

Figure 1:
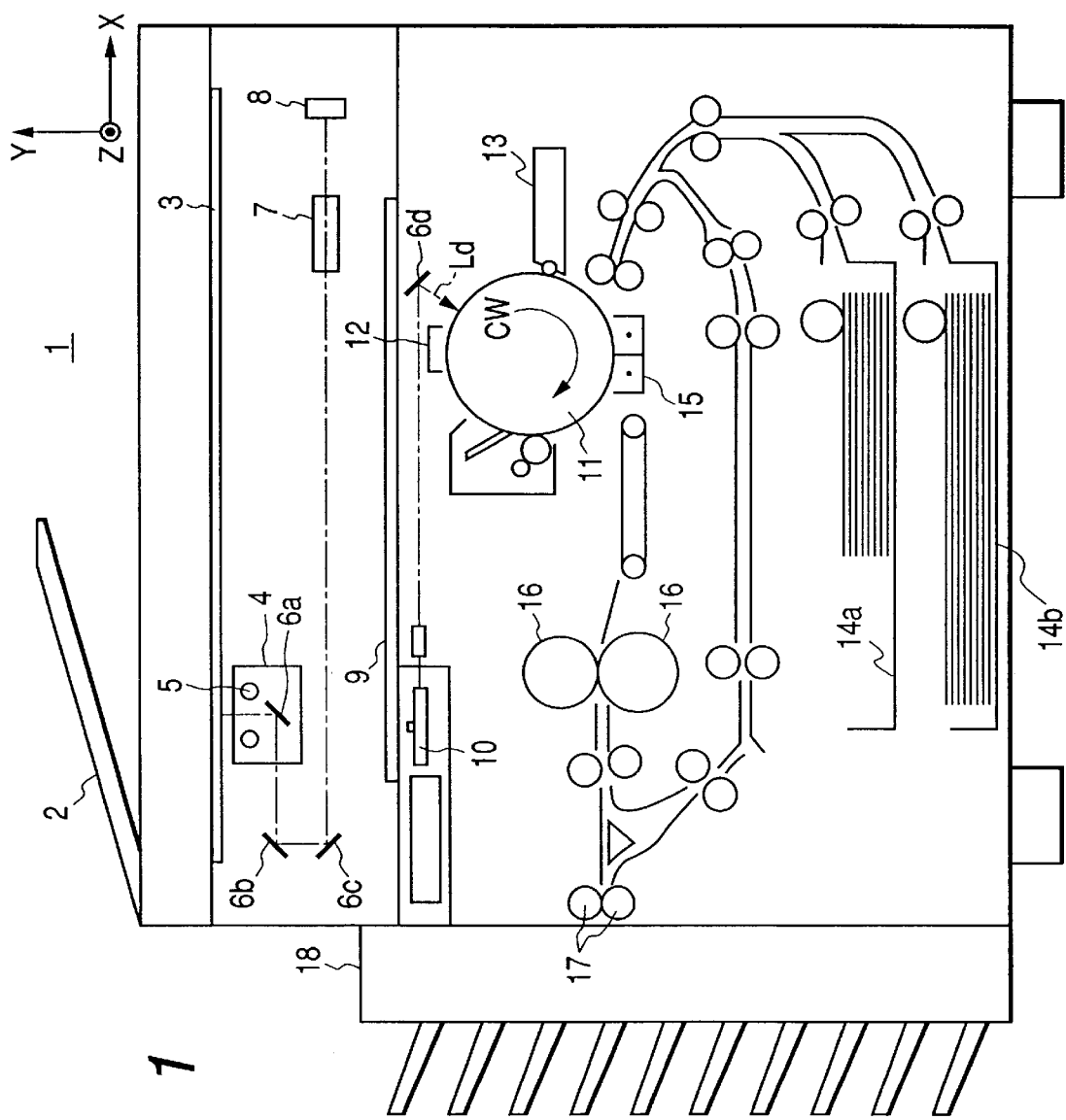
FIG. 1 is a side perspective view showing the image formation apparatus according to the first embodiment of the present invention.

FIG. 1 is the side perspective view showing an image formation apparatus to which the first embodiment of the present invention is applied.

A copy machine 1 shown in FIG. 1 is a kind of image formation apparatus. In the copy machine 1, the original put on an original document feeder 2 is carried one by one onto an original mounting board glass face 3. If the original is mounted on the glass face 3, a lamp 5 in a scanner unit 4 is turned on, and also the unit 4 is moved in an X direction to irradiate the entire face of the mounted original.

The reflection light from the original is sent to the image pickup face of a linear image sensor 8 extended in a Z direction, through mirrors 6a, 6b and 6c and a lens system 7. Thus, the image on the original is formed on the image pickup face. Then, the sensor 8 performs the photoelectric conversion on the formed image, and outputs the obtained image signal. The output image signal is subjected to the correlative double sampling process, the waveform shaping process and the like by the signal process circuit (not shown), and the processed signal is once stored in the image memory (not shown) consisting of, e.g., a DRAM. Then, the stored image signal is again read and input to an exposure control unit 9.

The unit 9 contains the semiconductor laser corresponding to the light source, and the light emission timing of the laser is controlled according to the image signal read from the image memory. The laser beam from the laser is irradiated onto a rotation polygonal mirror 10. A cylindrical photosensitive drum 11 is rotating clockwise (CW), and its photosensitive face has been uniformly charged by a charger 12. The reflection light from the mirror 10 is further reflected by a mirror 6d and then irradiated onto the photosensitive face of the drum 11. Subsequently, the electrical charge on the photosensitive face is partially eliminated to form the electrostatic latent image. For example, although it is possible to consider that the gas laser is used instead of the semiconductor laser, the light modulation apparatus for performing high-speed light modulation is necessary in such the case.

Figure 2:
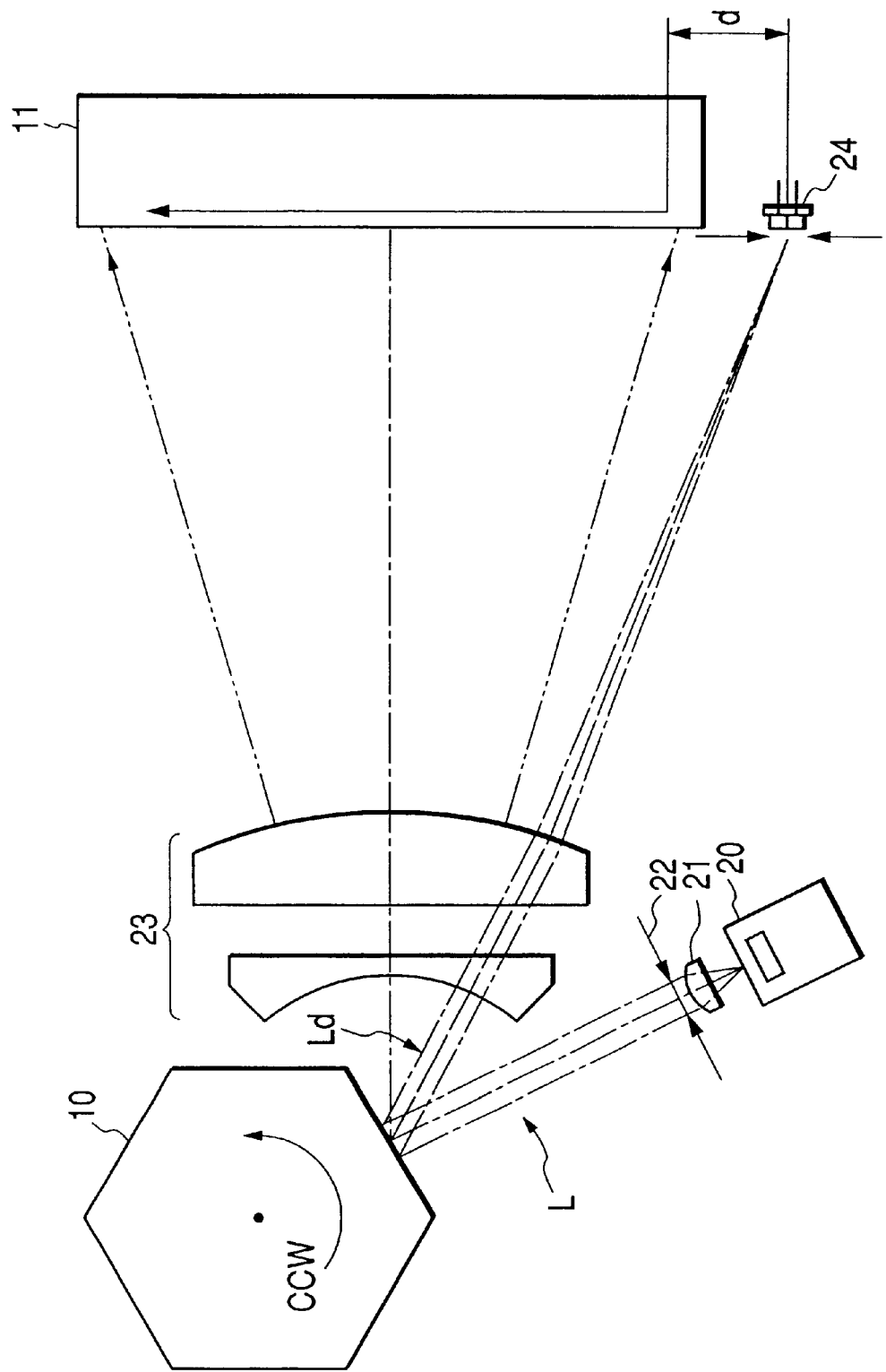
FIG. 2 is a diagram showing the structure of the main portion shown in FIG. 1.

FIG. 2 is the view showing the main structure of the image formation apparatus in FIG. 1. In FIG. 2, it should be noted that the parts same as those in FIG. 1 are added with the same reference numerals respectively, and the mirror 6a is omitted.

Laser beams L from a semiconductor laser 20 are refracted by a collimator lens 21 and an iris diaphragm 22 to obtain substantial parallel beams of light (referred as laser beam L hereinafter) having the predetermined diameter. Then, the beam L is incident on the rotation polygonal mirror 10. Since the mirror 10 is rotating counterclockwise (CCW) at conformal speed, the laser beam L incident on the mirror 10 is reflected as polarizing beams Ld (referred as beam Ld hereinafter) such that the reflection angle of each beam continuously vary.

The beam Ld being arc scanning light is concentrated by an f-θ lens 23 and focused on the line extended on the photosensitive face of the drum 11. Simultaneously, since distortion aberration is corrected such that the lens 23 can guarantee linearity in scanning time, the beam Ld scans at identical speed the photosensitive face of the drum 11 in the direction indicated by the arrow in FIG. 2. The latent image is formed on the drum 11 by variably controlling the light emission timing of the laser 20 according to the image signal from the image memory.

A beam detector 24 detects the beam Ld reflected from the mirror 10, whereby the drive timing of the semiconductor laser 20 is controlled to start the modulation of the laser beam L on the basis of the image signal after the certain time according to a distance d elapses. Thus, the recording start position of the image on the photosensitive face of the drum 11 can be set constant.

Again in FIG. 1, since the electrical charge on the photosensitive face is eliminated and exposed by the beam Ld according to the image signal, the electrostatic latent image is formed on the drum 11. If a development unit 13 applies the toner onto the drum 11, the electrostatic latent image is developed. At the timing when the electrostatic latent image formed on the drum 11 is developed, the transfer paper sheet (referred as transfer sheet hereinafter) onto which the image is transferred is carried by the transfer mechanism from a transfer sheet stacking unit 14a or 14b to the position nearby the drum 11.

Then, when the transfer sheet is carried between the drum 11 and a transfer unit 15 provided under the drum 11, the developed image is transferred onto the transfer sheet. After then, the image on the transfer sheet is heated and pressed by a fixing unit 16, whereby the image is fixed to the sheet. The transfer sheet to which the image has been fixed and thus the printing has terminated is discharged by a pair of paper discharge rollers 17 onto the predetermined tray of a multitray unit 18.

Figure 3:
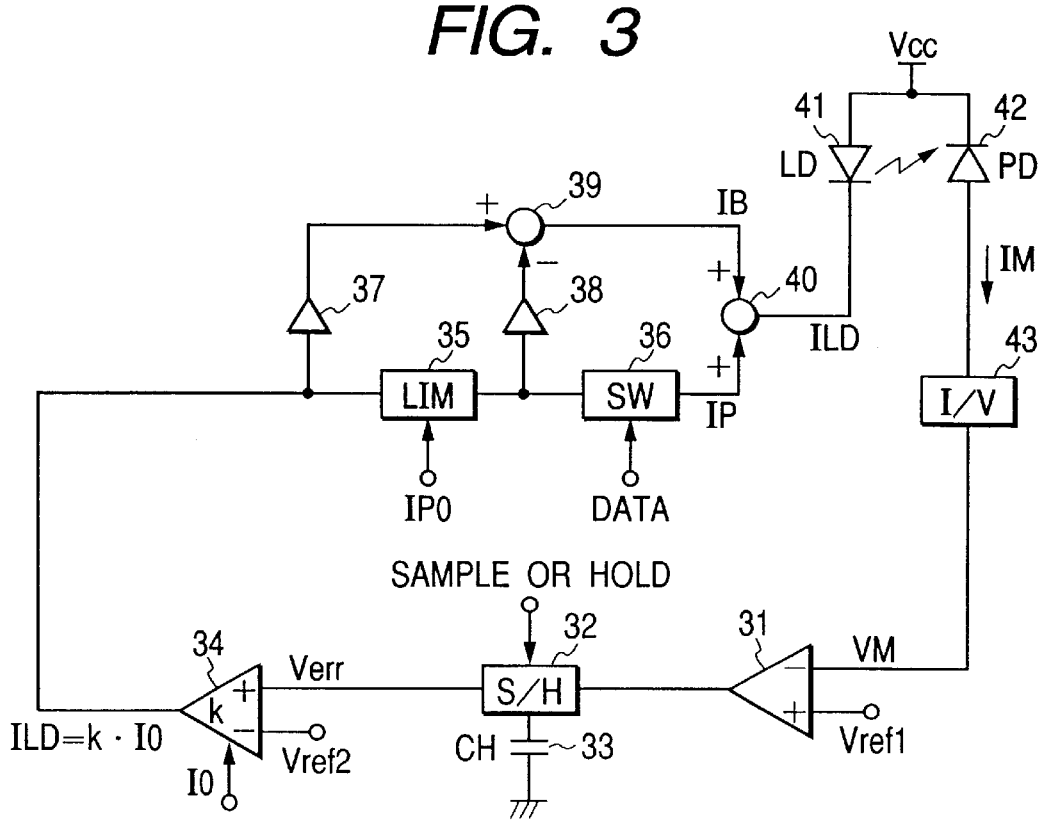
FIG. 3 is a diagram showing the structure of the laser diode drive circuit according to the first embodiment of the present invention.

FIG. 3 shows the light emission element drive circuit which is used in the image formation apparatus to drive the laser diode of cathode drive type.

In FIG. 3, numeral 31 denotes a comparator, numeral 32 denotes a sample-and-hold (S/H) circuit, numeral 33 denotes a hold capacitor (CH), numeral 34 denotes a variable gm amplifier, numeral 35 denotes a current restriction (or limitation) circuit (LIM), numeral 36 denotes a switching (SW) circuit, numerals 37 and 38 denote current buffers, numeral 39 denotes a current subtraction circuit, numeral 40 denotes a current addition circuit, numeral 41 denotes a laser diode (LD), numeral 42 denotes a photodiode (PD), and numeral 43 denotes a current/voltage conversion (I/V) circuit.

Initially, the variable gm amplifier 34 used in the present embodiment will be defined hereinafter. The amplifier 34 is the current amplifier to which two voltages and one reference current I0 are input, and in which its output current has a certain function to the reference current I0. If the potential difference between the two input voltages is defined as "ΔVi", an output current Iout of the amplifier 34 is represented by the following equation. In this case, to simplify the explanation, the gain of the amplifier 34 is assumed to be "1".

$$Iout = f(\Delta vi) \cdot Iin = k \cdot Iin \; (k = f(\Delta vi))$$

In this equation, "k" satisfies "0≦k≦1" and is called as "control function k" hereinafter.

If the input potential difference Δvi changes within the range of −1 to +1, the control function k and the output current Iout change as follows. In the above range, the function k and the current Iout are assumed to linearly change.

$$\Delta vi = -1 \text{ to } 0 \text{ to } +1$$

$$k = 0 \text{ to } 0.5 \text{ to } 1$$

$$Iout = 0 \text{ to } Iin/2 \text{ to } Iin$$

In FIG. 3, an output monitor current IM of the photodiode 42 is input to the current/voltage conversion circuit 43, and an output voltage VM of the circuit 43 is input to the negative input terminal of the comparator 31. Further, a reference voltage Vref1 corresponding to the desired light quantity is input to the positive input terminal of the comparator 31, and the output of the comparator 31 is input to the S/H circuit 32. The hold capacitor 33 is connected to the S/H circuit 32. An output voltage Verr of the S/H circuit 32 is input to the positive input terminal of the variable gm amplifier 34.

Further, a reference voltage Vref2 is input to the negative input terminal of the amplifier 34, a reference current I0 is also input to the amplifier 34, and the current output according to the potential difference between the two input voltages Verr and Vref2 acts as a laser diode drive current ILD (=k·I0) to determine the light emission quantity. The current ILD is input to the current restriction circuit 35 and the current buffer 37. Further, a reference pulse current IPO acting as the current restriction value is input to the circuit 35, and the output of the circuit 35 acts as the current to give the amplitude level of the optical pulse modulation signal to the output light (or beam) of the laser diode 41.

The output current of the circuit 35 is input to the switching circuit 36 and the current buffer 38. The output currents of the current buffers 37 and 38 are subjected to the current subtraction by the current subtraction circuit 39, and the subtracted current acts as the low-level current (called as bias current IB hereinafter) in the pulse modulation. An output current IP (called as pulse current IP hereinafter) of the switching circuit 36 and the bias current IB are subjected to the current addition by the current addition circuit 40, and the obtained current is supplied to the cathode of the laser diode 41.

Figure 4:
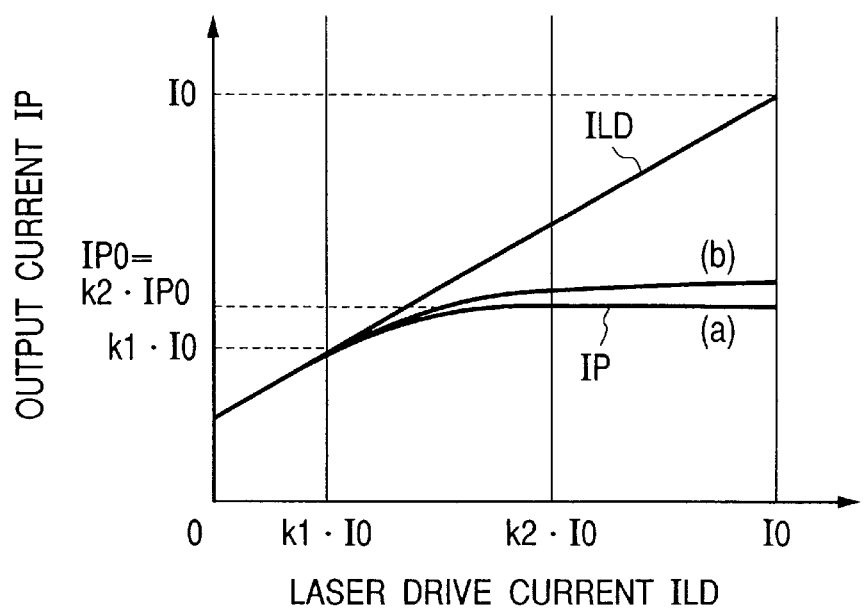
FIG. 4 is a characteristic diagram of the current restriction circuit used in the present invention.

In this case, it is assumed that, in the input/output characteristic of the current restriction circuit 35, the maximum value of the output current IP is restricted to the certain current restriction value (k2·IPO=IPO) for increase of the laser diode drive current ILD, as shown by a curve (a) in FIG. 4.

Subsequently, the operation in the present embodiment to determine the current ILD will be explained.

It is assumed that, in the APC operation, the switching circuit 36 is ON and input data (DATA) based on the image signal is set such that the laser diode 41 is in its entire-face light emission state. If the light output of the diode 41 is monitored by the photodiode 42 in the state that the switching circuit 36 is ON, the monitor current IM flows in the current/voltage conversion circuit 43, and thus the monitor voltage VM is produced at the output of the circuit 43.

The comparator 31 compares the monitor voltage VM with the reference voltage Vref1 corresponding to the desired light quantity, and then outputs the compared result as the error voltage Verr to the variable gm amplifier 34 through the S/H circuit 32. The amplifier 34 determines the control function k on the basis of the potential difference between the voltages Verr and Vref2, thereby controlling the laser diode drive current ILD.

When the control function k linearly changes from "0" to "1", also the current ILD linearly changes. The pulse current IP and the bias current IB at that time are determined as follows. In this case, it should be noted that a variable k1 used in such determination is the control function value at the time when the current control starts, and a variable k2 is the control function value at the time when the current control is completely carried on.

(1) If the control function k is in the range of "$0 \leq k \leq k1$", since the laser diode drive current ILD is smaller than the reference pulse current IPO, the current restriction circuit 35 does not operate, whereby the current ILD acts as the pulse current IP. That is, in the range of "$0 \leq k \leq k1$", the light emission operation of the laser diode 41 is controlled on the basis of the pulse current control.

(2) If the control function k is in the range of "$k1 \leq k \leq k2$", since the laser diode drive current ILD is close to the reference pulse current IPO, the current restriction circuit 35 gradually starts to operate, whereby the current ILD becomes different from the pulse current IP. Then, the difference between the currents ILD and IP acts as the bias current IB, and the current IB gradually increases if the control function k further increases. That is, in the range of "$k1 \leq k \leq k2$", the operation is shifted or switched from the pulse current control to the bias current control. Thus, the light emission operation of the laser diode 41 is controlled in the state that the pulse current control and the bias current control are mixed together.

(3) If the control function k is in the range of "$k2 \leq k \leq 1$", since the laser diode drive current ILD is larger than the reference pulse current IPO, the current restriction circuit 35 sufficiently operates. Thus, the pulse current IP acts as the reference pulse current IPO being the current restriction value, and the bias current IB linearly increases. That is, in the range of "$k2 \leq k \leq 1$", the light emission operation of the laser diode 41 is controlled on the basis of the bias current control.

Figure 5:
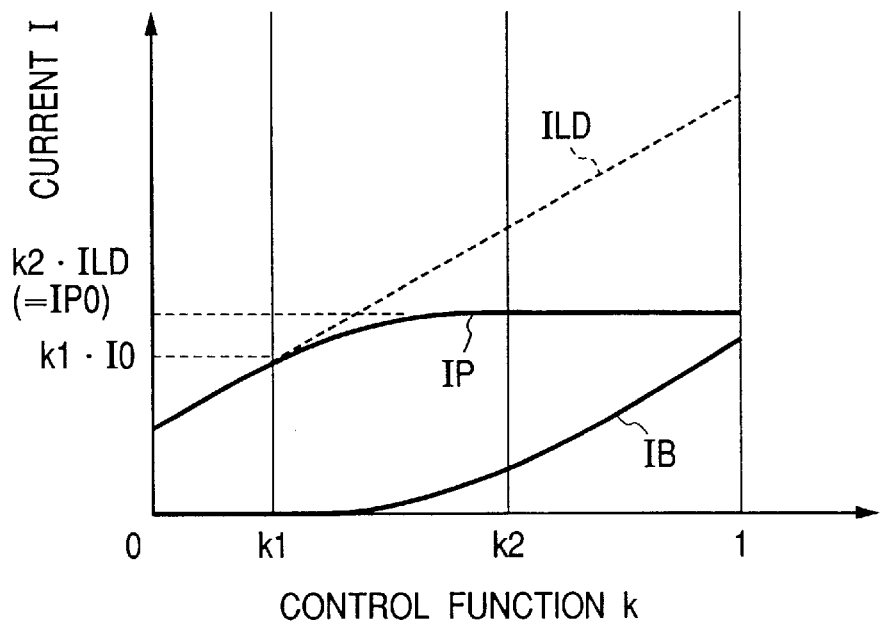
FIG. 5 is a characteristic diagram showing the relation of the pulse current and the bias current to a control function k of the laser diode drive circuit according to the embodiment of the present invention.

FIG. 5 is the diagram showing the contents of the above explanation. The laser diode drive circuit in the present embodiment can continuously shift or switch the operation from the pulse current control to the bias current control. Further, even if the laser diode drive circuit is in the halfway through such the shifting, the circuit can perform the control in the state that the pulse current control and the bias current control are mixed together. Furthermore, the drive circuit can oppositely shift the operation from the bias current control to the pulse current control.

When the S/H circuit 32 is in the holding state, the control function k, the laser diode drive current ILD, the pulse current IP and the bias current IB are determined on the basis of the error voltage Verr held by the hold capacitor 33.

In order to perform the optical pulse modulation according to the input data, the switching circuit 36 is turned on/off according to the input data.

Figure 6:
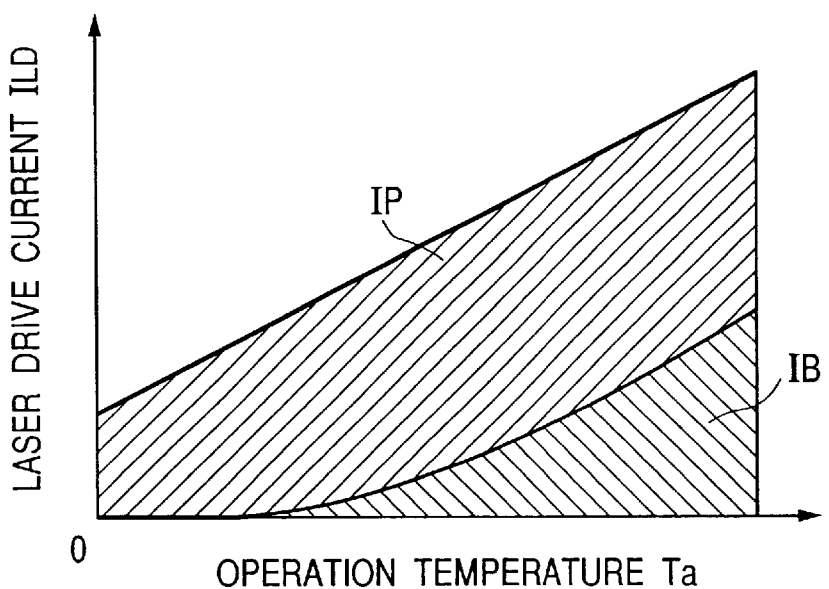
FIG. 6 is a characteristic diagram showing the relation of the pulse current and the bias current to the change of the operation temperature according to the embodiment of the present invention.
Figure 34:
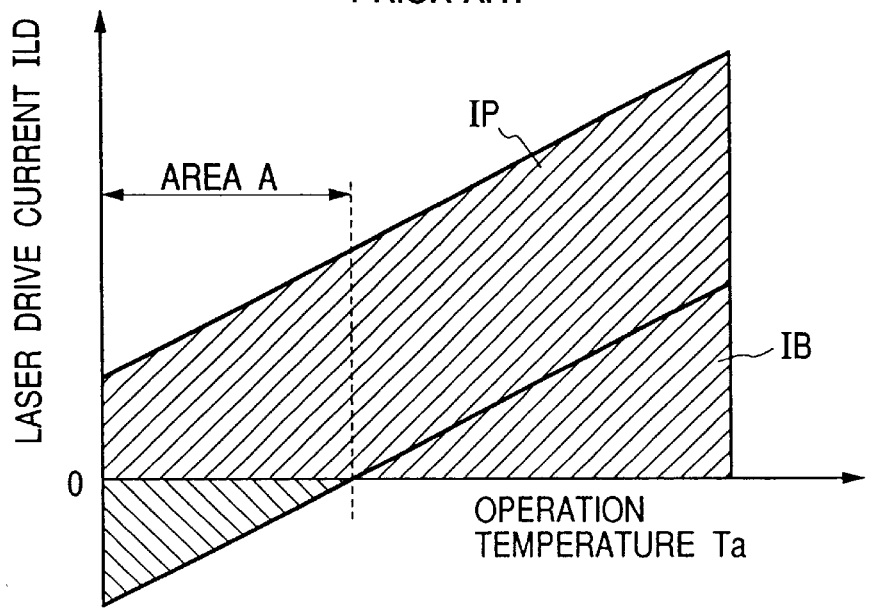
FIG. 34 is a characteristic diagram showing the relation of the pulse and bias currents to the change of the operation temperature of the drive circuit in the conventional image formation apparatus.
Figure 35:
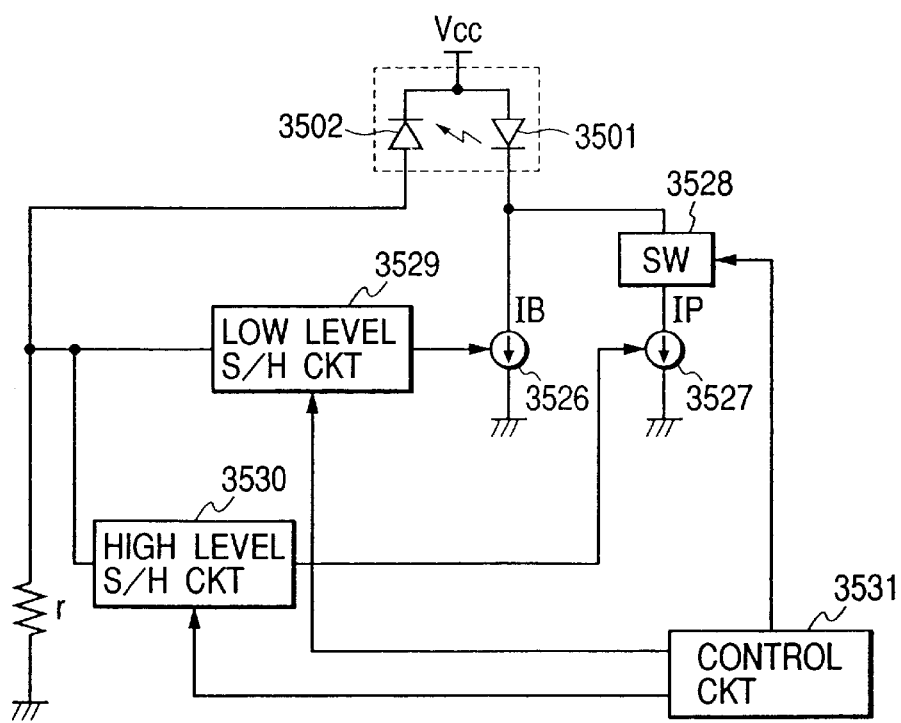
FIG. 35 is a circuit diagram showing the structure of the laser diode drive apparatus in the fourth conventional example.
Figure 36:
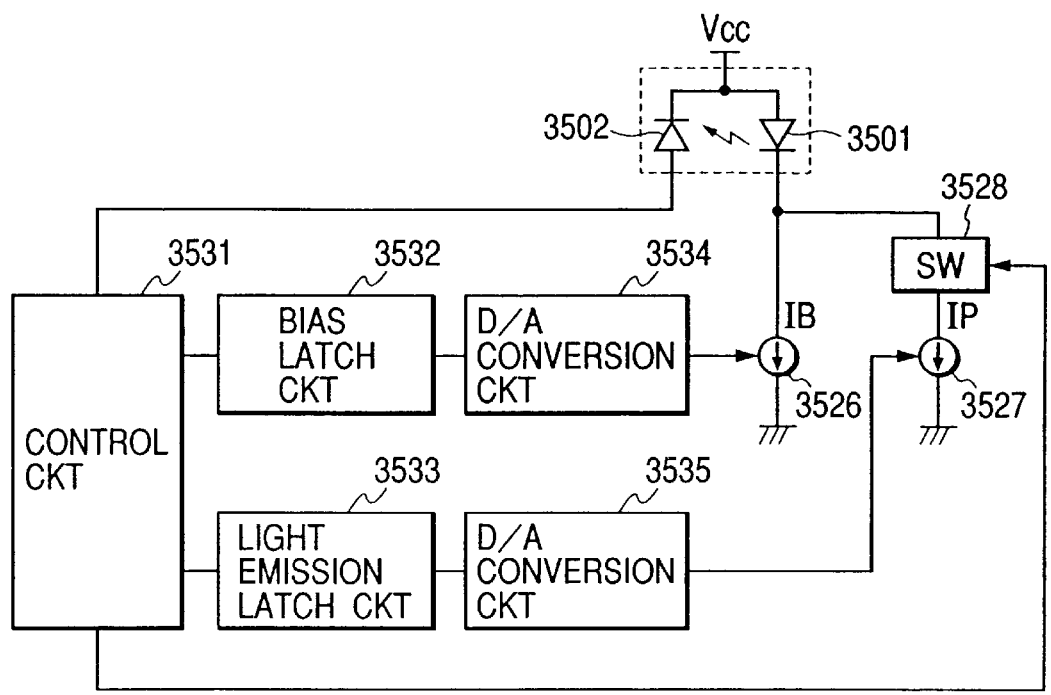
FIG. 36 is a circuit diagram showing the structure of the laser diode drive apparatus in the fifth conventional example.
Figure 37:
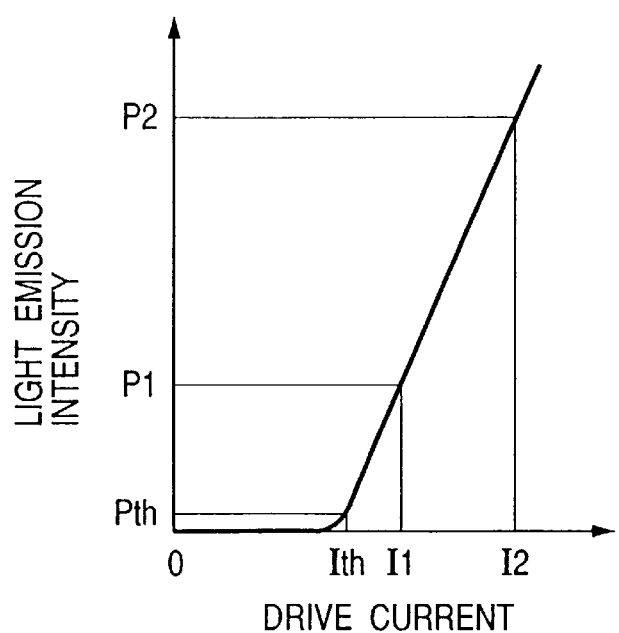
FIG. 37 is a characteristic diagram showing the relation of the laser diode drive current and the light intensity in the fifth conventional example.

FIG. 6 shows the laser diode drive current in the case where the operation temperature changes in the present embodiment. It should be noted that FIG. 6 corresponds to FIG. 34.

The ratio of the pulse and bias currents IP and IB constituting the laser diode drive current ILD in the axis of ordinate to the operation temperature Ta in the axis of abscissa satisfies the relation shown in FIG. 6. As can be understood by comparing FIGS. 6 and 34 with each other, in the present embodiment, it is possible to control even in the area (corresponding to area A in FIG. 34) uncontrollable in the conventional technique. That is, when the temperature Ta is high, the pulse current is constant, whereby the controllable range can be made wider than the conventional range by the bias current control. Similarly, when the temperature Ta is low, the controllable range can be made wider by the pulse current control.

The further feature in the present embodiment is that it is possible to freely change the transition point of the control from the pulse current control to the bias current control and vice versa by changing the reference pulse current IPO being the current restriction value of the current restriction circuit 35. In rough conclusion, if the current IPO is set to be equal to or larger than the maximum laser diode drive current ILD, the light emission operation of the laser diode 41 is performed on the basis of the pulse current control.

Further, the bias current IB is determined according to the difference between the currents ILD and IP. Thus, the current ILD is determined only based on the error voltage Verr output from the comparator 31, irrespective of the transition point of the control.

As explained above, in the present embodiment, the pulse current IP is determined by the current restriction circuit 35 and the switching circuit 36, from the laser diode drive current ILD controlled by the variable gm amplifier 34 to be able to obtain the desired light quantity. Further, the difference between the currents ILD and IP is obtained by the current subtraction circuit 39, the obtained current is set as the bias current IB, the currents IP and IB are superimposed by the circuit addition circuit 40, and the superimposed current is then supplied to the cathode of the laser diode 41.

By doing so, in the low temperature operation in which the current ILD may be small, the current ILD is equal to or smaller than the restriction value of the circuit 35, whereby the current ILD is controllable as a whole only based on the pulse current IP. Therefore, the light emission operation of the laser diode 41 is controlled when the current ILD is controlled completely based on only the pulse current control.

When the current ILD comes to be close to the restriction value (i.e., reference pulse current value) of the circuit 35, the increased quantity of the current IP gradually decreases, and the current IB becomes unnecessary because the current ILD may be small. In such the state, the difference between the currents ILD and IP is produced as the bias current IB. That is, at this time, the light emission operation of the laser diode 41 is controlled by controlling the current ILD in the state that the pulse control and the bias control are mixed together.

Further, in the high temperature operation in which the large current ILD is necessary due to the operation temperature change of the diode 41 or the like, the current ILD is equal to or larger than the restriction value of the circuit 35, the current IP acts as the restriction value of the circuit 35, and the current IB comes to be the difference between the currents ILD and IP. Therefore, the light emission operation of the laser diode 41 is controlled when the current ILD is controlled based on only the bias current control.

The transition of the control, i.e., the transition from the bias current control to the pulse current control and vice versa, can be automatically and continuously performed. Further, since the reference pulse current for determining the current restriction value can be arbitrarily set, the transition point of the control can be freely changed.

(Second Embodiment)

Figure 7:
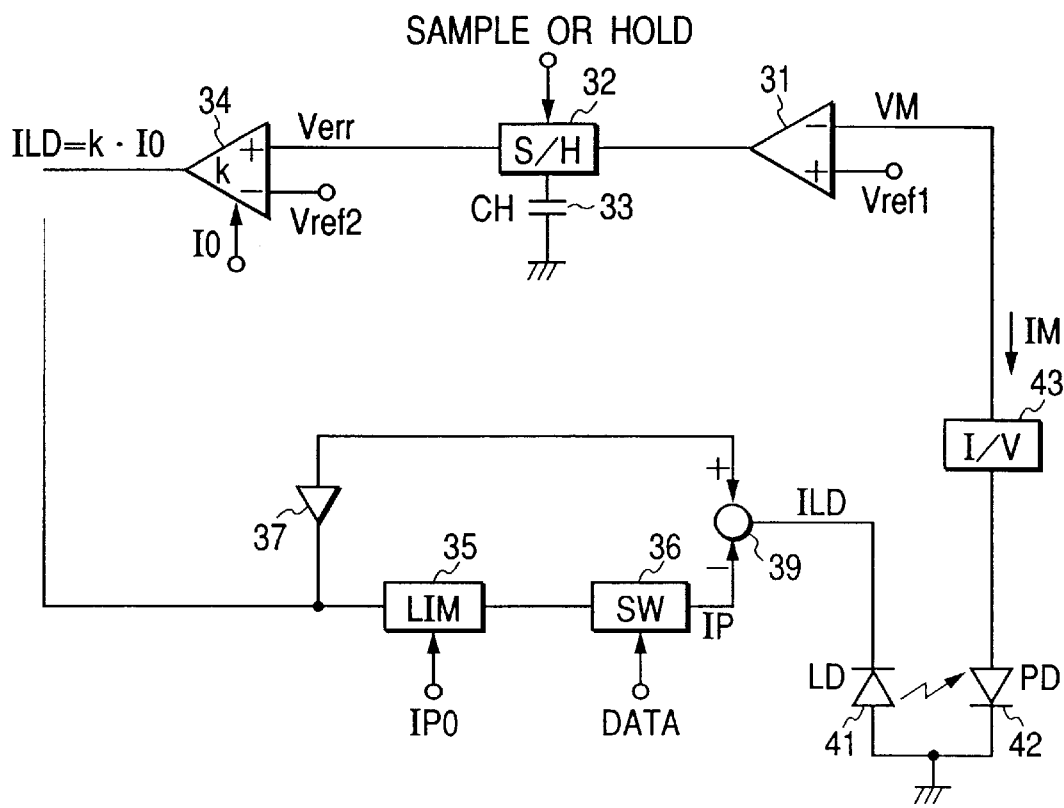
FIG. 7 is a circuit diagram showing the structure of the laser diode drive circuit according to the second embodiment of the present invention.

FIG. 7 shows the laser diode drive circuit of anode drive type according to the second embodiment. In FIG. 7, it should be noted that the parts same as those in the first embodiment are added with the same reference numerals respectively, and the explanations of these parts are thus omitted.

In FIG. 7, an output monitor current IM of a photodiode 42 is input to a current/voltage conversion circuit 43, and an output voltage VM of the circuit 43 is input to the negative input terminal of the comparator 31. Further, a reference voltage Vref1 corresponding to the desired light quantity is input to the positive input terminal of the comparator 31, and the output of the comparator 31 is input to the S/H circuit 32. A hold capacitor 33 is connected to the S/H circuit 32. An output voltage Verr of the S/H circuit 32 is input to the positive input terminal of a variable gm amplifier 34.

Further, a reference current I0 is input to the amplifier 34, a reference voltage Vref2 is input to the negative input terminal of the amplifier 34, and the current output according to the potential difference between the two input voltages Verr and Vref2 acts as a laser diode drive current ILD (=k·I0) to determine the light emission quantity. The current ILD is input to a current restriction circuit 35 and a current buffer 37. Further, the output of the circuit 35 acts as the current to give the amplitude level of the optical pulse modulation signal to the output light (or beam) of a laser diode 41, and a reference pulse current IPO acting as the current restriction value is input to the circuit 35.

The output current of the circuit 35 is input to a switching circuit 36, and the output current of the current buffer 37 and the output current (called pulse current IP hereinafter) of the circuit 36 are subjected to the current subtraction by a current subtraction circuit 39. Then, the current obtained by the subtraction is supplied to the anode of the laser diode 41. It should be noted that, like the first embodiment, the current subtraction circuit 35 has such the characteristic as shown by the curve (a) of FIG. 4 to the change of a control function k.

Subsequently, the operation in the present embodiment will be explained. It is assumed that, in the APC operation, the switching circuit 36 is OFF. If the light output from the laser diode 41 is detected by the photodiode 42 in the state that the circuit 36 is OFF, the monitor current IM flows in the photodiode 42. Then, the monitor current IM is converted into the monitor voltage VM by the current/voltage conversion circuit 43, the monitor voltage VM is compared with the reference voltage Vref1 corresponding to the desired light quantity by the comparator 31, and the compared result is then output as the error voltage Verr to the variable gm amplifier 34 through the S/H circuit 32. In the amplifier 34, the control function k is determined on the basis of the potential difference between the voltages Verr and Vref2, whereby the laser diode drive current ILD (=k·I0) is controlled.

When the S/H circuit 32 is in the holding state, the current output from the current restriction circuit 35 acts as the current to give the modulation signal to the laser diode drive signal ILD in the optical pulse modulation, and is input to the switching circuit 36. In order to perform the pulse modulation on the laser diode 41, the circuit 36 is turned on/off according to the input data. The output current (called as pulse current IP hereinafter) of the circuit 36 and the output current of the current buffer 37 are input to the current subtraction circuit 39. Thus, the current obtained by subtracting the pulse current IP from the output current of the current buffer 37 is supplied to the cathode of the laser diode 41.

At this time, the current obtained by subtracting the pulse current IP from the output current of the current buffer 37 acts as the bias current IB to determine the low level in the optical pulse modulation.

Also, in the present embodiment, it is possible to freely change or switch the transition point of the control from the pulse current control to the bias current control and vice versa by changing the value of the reference pulse current IPO. Further, since the bias current IB is determined according to the difference between the currents ILD and IP, the current ILD is determined only based on the error voltage Verr of the comparator 31 irrespective of the transition point of the control.

As explained above, in the present embodiment, the current obtained by subtracting the pulse current IP from the laser diode drive current ILD is supplied to the anode of the laser diode 41. Thus, it is possible to derive the same effect as that in the first embodiment by selectively performing both or either one of the pulse current control and the bias current control to control the light emission operation of the laser diode 41.

(Third Embodiment)

Figure 33:
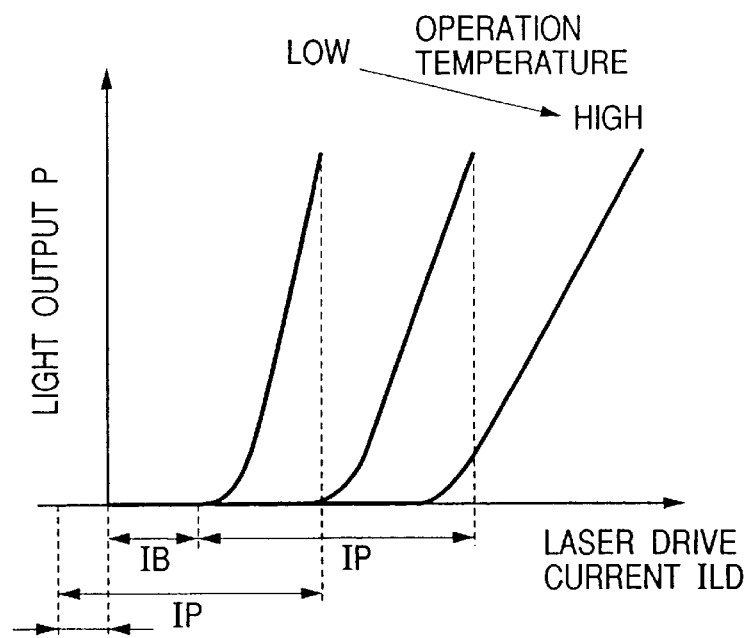
FIG. 33 is a (common) characteristic diagram showing the relation of the drive current to the change of the laser diode temperature.

In the general temperature characteristic of the laser diode, as shown in FIG. 33, if the operation temperature rises, the threshold (value) increases. Therefore, in order to obtain the desired light quantity, it is necessary to increase the laser diode drive current as described above. However, there is another phenomenon which is specific in the temperature characteristic of the laser diode. That is, slope efficiency (also called as differential efficiency) is lowered in the laser oscillation area.

For this reason, in order to sufficiently secure the quenching ratio of the laser diode in case of performing the optical pulse modulation, it is necessary to gradually increase the pulse current when the slope efficiency is gradually lowered.

In the light emission element drive circuit used in the image formation apparatus of the present invention, it is possible to cope with such the problem by setting the current restriction capability of the current restriction circuit to be finite in the first and second embodiments.

Figure 8:
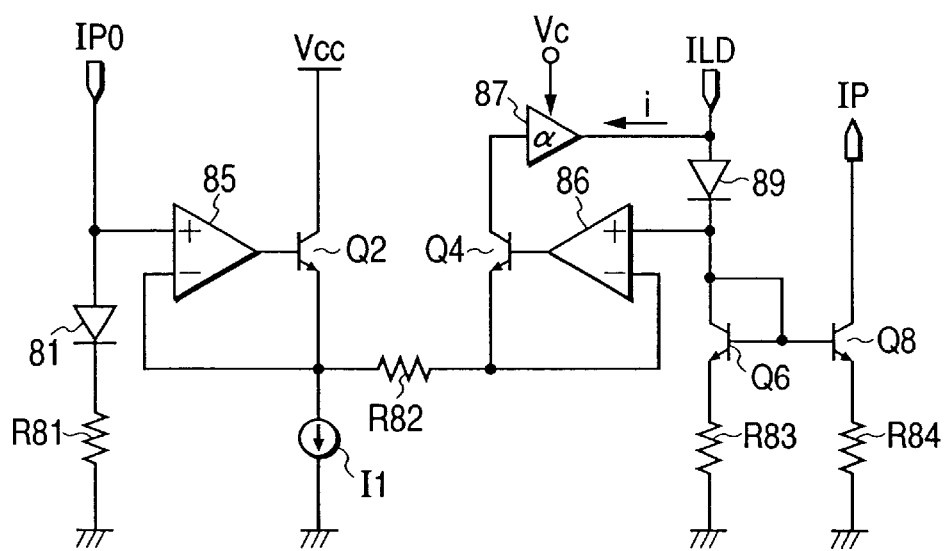
FIG. 8 is a circuit diagram showing the structure of the current restriction circuit according to the third embodiment of the present invention.

That is, for example, as represented by a curve (b) of FIG. 4, in the bias current control area in the light emission element drive circuit used in the image formation apparatus of the present invention, the current restriction circuit may have such a current restriction capability so as to slightly increasing the pulse current according to the increase of the laser diode drive current. It is simple to cause the current restriction circuit to have the characteristic represented by the curve (b). FIG. 8 shows an example of the circuit structure having such the characteristic.

A reference pulse current IPO for giving the current restriction value to a current restriction circuit 80 is supplied to the anode of a diode 81 and the positive input terminal of an operational amplifier 85. The cathode of the diode 81 is connected to the upper end of a resistor R81, and the lower end thereof is grounded. The output of the amplifier 85 is connected to the base of a transistor Q2, and the collector of the transistor Q2 is connected to a power source voltage Vcc. Further, the emitter of the transistor Q2 is connected to one end of a resistor R82, a constant current source I1 and the negative input terminal of the operational amplifier 85.

On the other hand, a laser diode drive current ILD to be input to the current restriction circuit 80 is then supplied to the anode of a diode 89 and the output of a variable gm amplifier 87. The cathode of the diode 89 is connected to the collector and base of a transistor Q6, the base of a transistor Q8 and the positive input terminal of an operational amplifier 86. The collector of a transistor Q4 is connected to the reference current input terminal of the amplifier 87, and the output of the amplifier 86 is connected to the base of the transistor Q4. Further, the emitter of the transistor Q4 is connected to the other end of the resistor R82 and the negative input terminal of the amplifier 86.

The emitter of the transistor Q6 is connected to the upper end of a resistor R83, and the emitter of the transistor Q8 is connected to the upper end of a resistor R84. The other end of each of the resistors R83 and R84 is grounded. An output current IP can be obtained from the collector of the transistor Q8. In the present embodiment, the resistor R82 has resistance R1, each of the resistors R81, R83 and R84 has resistance R2. Further, a potential difference Vc for determining a control function a is input to the amplifier 87, and its gain is "1".

Subsequently, the operation of the current restriction circuit 80 having the above structure will be explained. Initially, to simply explain the basic operation, the control function a of the amplifier 87 is given as "α=1".

When the input current (i.e., laser diode drive current ILD) is equal to or smaller than the reference pulse current IPO, the current does not flow at the resistor R82. Thus, as the output current IP, the input current ILD is output as it is.

If the input current ILD exceeds the current IPO, the potential difference occurs between both ends of the resistor R82, and the current starts to flow, whereby the current restriction operation is performed. The output current IP at this time can be given by the following equations. In these equations, the emitter voltage of the transistor Q2 is given as "V1E", the emitter voltage of the transistor Q4 is given as "V2E", the base emitter voltage of the transistor Q6 is given as "VBE", and the forward voltage of the diode 81 is given as "VF".

$$IP = ILD - i \quad (1)$$

$$i = (V2E - V1E)/R1$$

$$= [\{R2 \cdot (ILD - i) + VBE\} - (R2 \cdot IP0 + VF)]/R1$$

If VF=VBE, then $$i = (R2 \cdot IP - R2 \cdot IP0)/R1 \quad (2)$$

$$= (IP - IP0) \cdot R2/R1$$

Therefore, if substituting the equation (2) for the equation (1), then $$IP = ILD - (IP - IP0) \cdot R2/R1 \quad (3)$$

$$= ILD - IP \cdot R2/R1 + IP0 \cdot R2/R1$$

$$= (ILD + IP0 \cdot R2/R1)/(1 + R2/R1)$$

$$= (ILD + a \cdot IP0)/(1 + a) \quad (a = R2/R1)$$

If the resistance ratio is selected such that the coefficient a has the very large value, it is possible to highly improve the restriction capability of the current restriction circuit 80 having the structure shown in FIG. 8, whereby the output current IP substantially satisfies "IP=IPO". On the other hand, if the resistance ratio is selected such that the coefficient a has the small value, it is possible to weaken or lower the current restriction capability of the circuit 80, whereby the output current IP has the value given by the equation (3).

Therefore, if the resistance ratio is selected to set the coefficient a in the equation (3) to have the appropriate value suitable for the change of the slope efficiency according to the temperature, it is possible to control the increase of the pulse current in the bias control area of the light emission drive circuit used in the image formation apparatus of the present invention. Thus, even if the laser diode drive current increases and thus the slope efficiency is lowered, it is possible to secure the sufficient quenching ratio.

Further, although the control function a of the variable gm amplifier 87 is given as "1" in the above explanation, it is possible to change the control function α by controlling the potential difference Vc input to the amplifier 87, thereby making the seeming coefficient a variable. Therefore, it is possible to control the increase of the pulse current in the bias control area of the light emission element drive circuit without changing the once-set values of the resistors R81 to R84. Also, it is possible to cope with the laser diode having a difference temperature characteristic in the slope efficiency.

As explained above, according to the present embodiment, it is possible to perform the operation which takes the temperature characteristic in the slope efficiency into consideration. That is, when the laser diode drive current ILD increases above the reference pulse current, since the current restriction capability is set to be finite such that the output current of the current restriction circuit increases according to the certain function, the pulse current gradually increases in the bias current control area. For this reason, even if the slope efficiency of the laser oscillation area is lowered because the laser diode drive current increases, it is possible to sufficiently secure the quenching ratio. Further, if the control function of the variable gm amplifier is controlled by making the input potential difference variable, it is possible to control the current control capability without changing the once-set resistance.

As above, as in the first to third embodiments, the current according to the output light quantity is produced in case of driving the light emission element of which output light quantity depends on the bias current and the temperature. Then, on the basis of the produced current, the light emission element is driven by using the current giving the amplitude level to the modulation signal if the temperature is lower than the predetermined temperature, while the element is driven by using the current giving the amplitude level and the bias current if the temperature is higher than the predetermined temperature. Therefore, since the current giving the amplitude level or the bias current is used for the operation of the light emission element (from low-temperature operation to high-temperature operation) to control the light emission, it is possible to perform the satisfactory image formation irrespective of the temperature change.

(Fourth Embodiment)

Subsequently, the fourth embodiment will be explained with reference to FIGS. 9, 10, 11, 12, 13, 14A and 14B.

Initially, the outline of the present embodiment will be explained. That is, an oscillation threshold current I2 is obtained from the difference current between a laser diode drive current Idrv controlled to set the light emission quantity of a laser diode 901 to have the desired value and the current necessary for obtaining 1/N of the desired light quantity. Then, a restriction current value I0 (current) is obtained by adding a constant current Ix to the current I2. Further, the current Idrv is subjected to the current restriction based on the restriction current value I0 in a current restriction circuit 907, and an output current I1 for giving the amplitude level in the pulse modulation is produced, whereby a pulse current IP for controlling the light emission operation is determined from the output current I1. Furthermore, a bias current IB is obtained by subtracting the current IP from the current Idrv, and a current ILD obtained by superimposing the current IP on the current IB is supplied to the cathode of the laser diode 901.

Since the laser diode drive circuit of such cathode drive type is provided, even if the oscillation threshold current or the characteristic of slope efficiency in the laser oscillation area changes due to the change of operation temperature of the diode 901 or the like, it is possible to always apply the stable bias current IB in the vicinity of the oscillation threshold current I2 and also to emit the satisfactory laser beam always capable of sufficiently securing the quenching ratio.

Subsequently, the concrete example will be explained.

Figure 9:
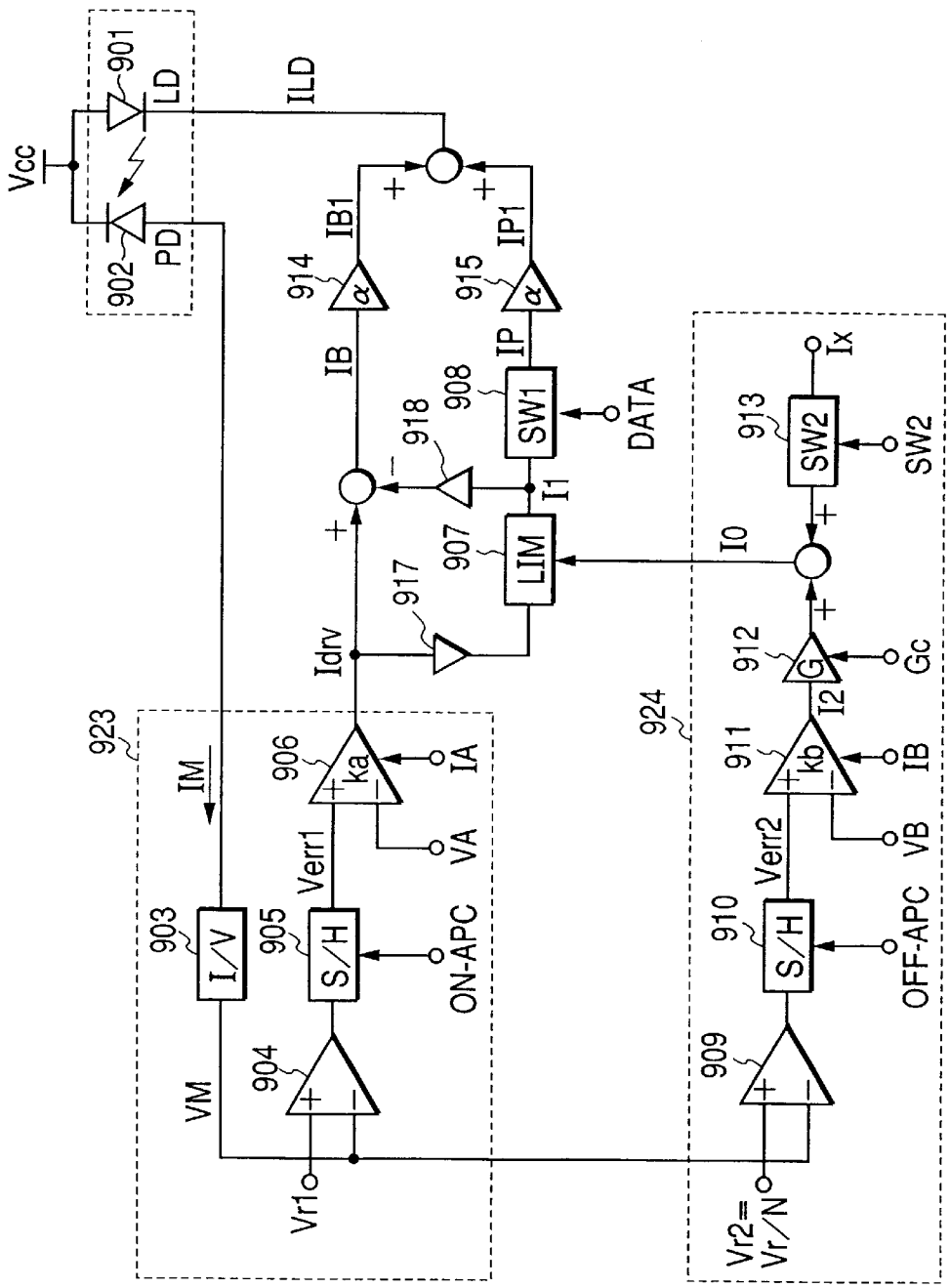
FIG. 9 is a circuit diagram showing the structure of the laser diode drive apparatus according to the fourth embodiment of the present invention.

FIG. 9 shows the example of the laser diode drive circuit according to the present invention.

Initially, variable gm amplifiers 906 and 911 used in the present invention will be explained.

Two voltages and one reference current Iin are input to each of the amplifiers 906 and 911. If the potential difference between the two input voltages is defined as "ΔVi", an output current Iout is represented by the following equation. In this case, the gain of the variable gm amplifier is assumed to be "1".

$$Iout = f(\Delta vi) \cdot Iin \qquad (4)$$
$$= k \cdot Iin \; (k: f(\Delta vi))$$

In this equation, "k" satisfies "0≦k≦1" and is called as "control function k" hereinafter. If the potential difference Δvi changes within the range of −1 to +1, the control function k and the output current Iout change as follows. In the above range, the function k and the current Iout are assumed to linearly change.

Δ$vi$=−1 to 0 to +1

$k$=0 to 0.5 to 1

$Iout$=0 to $Iin$/2 to $Iin$ \qquad (5)

Hereinafter, the concrete structure will be explained.

Numeral 901 denotes the laser diode of cathode drive type, and numeral 902 denotes a photodiode which monitors the light emission quantity from the laser diode 901.

A current IM produced at the output terminal of the photodiode 902 is input to a current/voltage conversion circuit 903 provided in a circuit 923 for determining the laser diode drive current Idrv, and then converted into a voltage VM. The obtained voltage VM is input to the negative input terminal of a first voltage comparator 904 in the circuit 923 and the negative input terminal of a second voltage comparator 909 in a circuit 924.

A first reference voltage Vr1 corresponding to the desired light quantity is input to the positive input terminal of the comparator 904. The output of the comparator 904 is connected to a first sample-and-hold (S/H) circuit 905, and a control signal ON-APC for determining the sampling state or the holding state is input to the first S/H circuit 905.

An output voltage Verr1 of the first S/H circuit 905 is input to the positive input terminal of the first variable gm amplifier 906. A second reference voltage VA is input to the negative input terminal of the amplifier 906, and also a constant current IA is input as the reference current. The value of a control function ka of the amplifier 906 is determined based on the potential difference between the input voltages Verr1 and VA, whereby the laser diode drive current Idrv (=ka·IA) for determining the light emission quantity is determined.

The current Idrv is input to the current restriction circuit 907 through a first current buffer 917, and then subjected to the current restriction by using the restriction current value I0. The method to determine the value I0 will be explained later. The output current I1 of the circuit 907 acts as the current for giving the amplitude level in the optical pulse modulation. The current I1 is input to a first switching circuit 908, and subjected to the pulse modulation according to the input data, thereby obtaining the pulse current IP.

Further, the current I1 is connected so as to decrease the laser diode drive current Idrv through a second current buffer 918. The bias current IB is obtained by subtracting the current I1 from the current Idrv.

The current ILD to be supplied to the cathode of the laser diode 901 is obtained by adding a current IB1 to a current IP1. The current IB1 is obtained by amplifying the bias current IB with a first current amplification circuit 914 (gain α), and the current IP1 is obtained by amplifying the pulse current IP with a second current amplification circuit 915 (gain α). By using the first and second current amplification circuits 914 and 915, it is possible to suppress the power to be consumed by the control circuit until the currents IB and IP are determined.

In the circuit 924 for determining the restriction current value I0, the voltage value (Vr1/N) being 1/N of the first reference voltage Vr1 is input as a third reference voltage Vr2 to the positive input terminal of the second voltage comparator 909. The output of the comparator 909 is connected to a second sample-and-hold (S/H) circuit 910, whereby a control signal OFF-APC for determining the sampling state or the holding state is input to the second S/H circuit 910.

An output voltage Verr2 of the second S/H circuit 910 is input to the positive input terminal of a second variable gm amplifier 911. Further, a fourth reference voltage VB is input to the negative input terminal of the amplifier 911, and also a constant current IB is input thereto as the reference current. A control function kb of the amplifier 911 is determined from the potential difference between the input voltages Verr2 and VB, and the output current of the amplifier 911 is given as the current I2 (=kb·IB).

The current I2 is input to a variable current gain circuit 912, and a control signal Gc is also input to the circuit 912. If the signal Gc is "L", the gain G of the circuit 912 is given as "1", while if the signal Gc is "H", the gain G is given as "n/(n−1)". Then, the arbitrary constant current Ix flowing through a second switching circuit 913 is added to the output current of the circuit 912 to obtain the restriction current value I0, and the value is supplied to the current restriction circuit 907.

Figure 10:
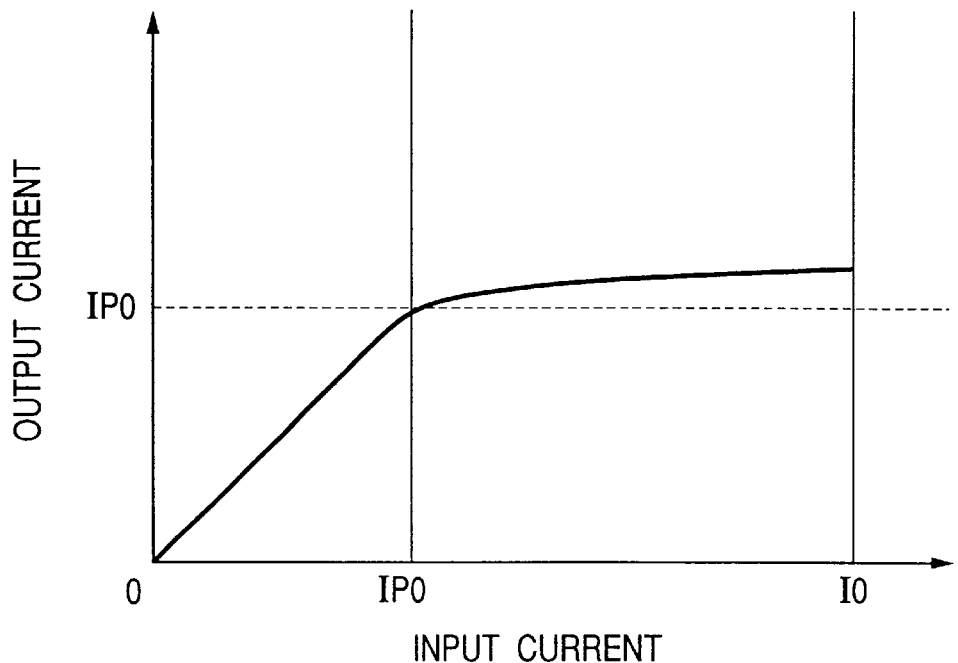
FIG. 10 is a characteristic diagram showing the change of the output current of the current restriction circuit to the input current thereof.

FIG. 10 shows the characteristic of the current restriction circuit 907 used in the present embodiment.

As the current restriction circuit 907, it is desirable to use the circuit having finite current restriction capability. Of course, the current restriction capability may be infinite. However, in the light emission characteristic of the laser diode 901, if the laser diode drive current Idrv increase and thus the slope efficiency is lowered, it is necessary to increase the pulse current IP. For this reason, it is desirable to have a characteristic in which the output current I1 slightly increases even if the current Idrv of which value is equal to or larger than the restriction current value I0 is input.

Figure 11:
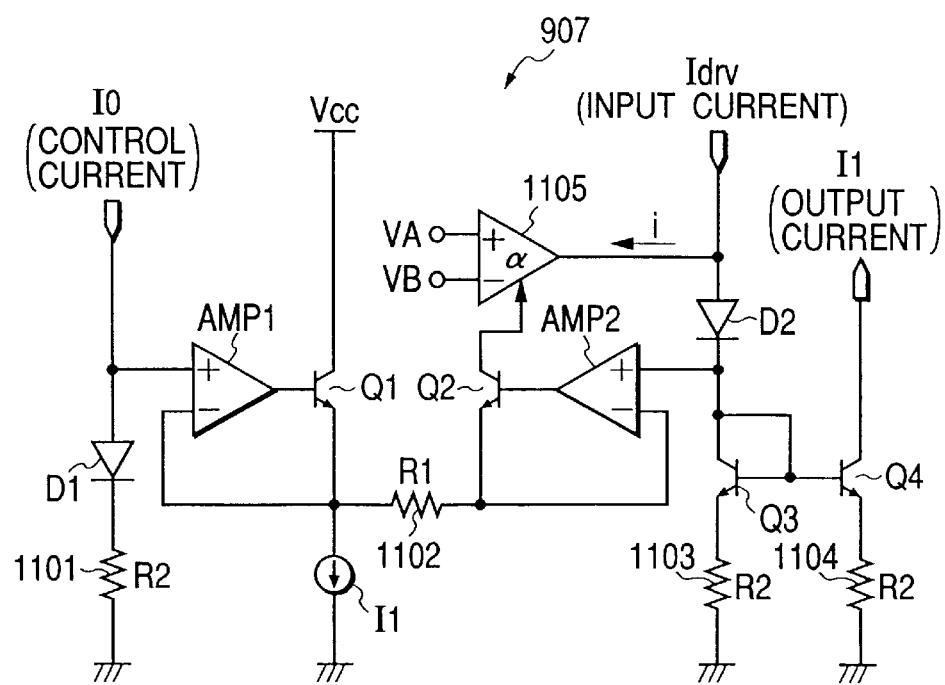
FIG. 11 is a circuit diagram showing the structure of the current restriction circuit.

FIG. 11 shows the example capable of realizing the current restriction circuit 907 having such the characteristic.

In this circuit 907, the restriction current value I0 is input to the anode of a first diode D1 and the positive input terminal of a first operational amplifier AMP1. The cathode of the first diode D1 is connected to a first resistor 1101, and the other end of the resistor 1101 is grounded. The output of the amplifier AMP1 is connected to the base of a first transistor Q1, and the collector of the transistor Q1 is connected to a power source (voltage) Vcc. Further, the emitter of the transistor Q1 is connected to a resistor 1102, a constant current source I1 and the negative input terminal of the amplifier AMP1.

On the other hand, the laser diode drive current Idrv, the input of the current restriction circuit 907, is connected to the anode of a second diode D2 and the output of a variable gm amplifier 1105. Further, the cathode of the diode D2 is connected to the collector and the base of a third transistor Q3, the base of a fourth transistor Q4 and the positive input terminal of a second operational amplifier AMP2.

The collector of a second transistor Q2 is connected to the reference current input terminal of the variable gm amplifier 1105, and the base of the transistor Q2 is connected to the output of the second operational amplifier AMP2. The emitter of the transistor Q2 is connected to the other end of the second resistor 1102 and the negative input terminal of the amplifier AMP2. The emitter of the third transistor Q3 is connected to a third resistor 1103, and the emitter of the fourth transistor Q4 is connected to a fourth resistor 1104. Further, the other end of each of the resistors 1103 and 1104 is grounded.

The output current IP can be obtained or drawn from the collector of the fourth transistor Q4. The reference voltage VA and the control voltage VB are input to the variable gm amplifier 1105, and the value of the control function α is determined based on the potential difference between the voltages VA and VB.

Hereinafter, the operation of the current restriction circuit 907 will be explained. In this case, to simplify the explanation, the control function α of the variable gm amplifier 1105 is assumed to be "α=1".

When the input current (i.e., laser diode drive current Idrv) is equal to or smaller than the restriction current value I0, since the current does not flow at the second resistor 1102, such a current i as decreasing the input current Idrv does not exist. Therefore, as the output current I1, the input current Idrv is output as it is. When the input current Idrv is equal to or larger than the restriction current value I0, since the current flows at the resistor 1102, the current restriction operation is performed. The output current I1 at this time is represented by the following equations.

In these equations, it should be noted that symbol V(Q1E) denotes the emitter voltage of the first transistor Q1, symbol V(Q2E) denotes the emitter voltage of the second transistor Q2, symbol VBE(Q3) denotes the voltage between the base and the emitter of the third transistor Q3, and symbol VP(D1) denotes the forward-direction voltage of the first diode D1.

$$I1 = Idrv - i \quad (6)$$

$$i = \{V(Q2E) - V(Q1E)\}/R1 \quad (7)$$
$$\{R2 \cdot (Idrv - i) + VBE(Q3) - R2 \cdot I0 - VF(D1)\}/R1$$

If VF(D1)=VBE(Q3), then $$i = \{R2 \cdot I1 - R2 \cdot I0\}/R1 \quad (8)$$
$$= (I1 - I0) \cdot R2/R1$$

Therefore, if substituting the equation (8) for the equation (6), then $$I1 = Idrv - (I1 - I0) \cdot R2/R1 \quad (9)$$
$$= Idrv - I1 \cdot R2/R1 + I0 \cdot R2/R1$$
$$= (Idrv + I0 \cdot R2/R1)/(1 + R2/R1)$$
$$= (Idrv + a \cdot I0)/(1 + a) \; (a = R2/Rn)$$

If the coefficient a is set to have the very large value, the restriction capability of the current restriction circuit in the present embodiment is highly improved, whereby the output current I1 substantially satisfies "I1=I0".

On the other hand, if the coefficient a is set to have the small value, the current restriction capability is weakened or lowered, whereby the output current I1 (=IP) has the current value given by the equation (9). Namely, if the input current increases in the current area of which current value is equal to or larger than the restriction current value, the output current also increases.

In the above explanation, the control function a of the variable gm amplifier 1105 is given as "1". However, it is possible to change the control function α by making the control voltage VB input to the amplifier 1105 variable, thereby making the seeming coefficient a variable. Therefore, it is possible to change the current restriction capability by controlling the voltage VB input to the amplifier 1105, without changing the once-set values of the first resistor 1101, the second resistor 1102, the third resistor 1103 and the fourth resistor 1104.

In the laser diode drive circuit shown in FIG. 9, the laser diode drive current Idrv is determined only based on the potential difference between the voltages Verr1 and VA input to the first variable gm amplifier 906. Further, if the gain α of the first and second current amplification circuits 914 and 915 is assumed to be "1", when the first switching circuit 908 is in the conductive state, the current ILD to be supplied to the laser diode 901 comes to have the value same as that of the current Idrv. This is apparent from the drive circuit shown in FIG. 9 and the following equations.

$$IB1 = IB = Idrv - I1 \quad (10)$$

$$IP1 = IP = I1 \quad (11)$$

$$ILD = IB1 + IP1 = (Idrv - I1) + I1 \quad (12)$$

That is, irrespective of the value of the output current I1 of the current restriction circuit 907, the current ILD supplied to the laser diode is determined from the potential difference between the two voltages input to the first variable gm amplifier 906, and it is possible to control the light emission quantity of the laser diode 901 by controlling the laser diode drive current Idrv.

Further, the reason why the current obtained by adding the currents IP1 and IB1 is supplied to the cathode of the laser diode 901 is as follows. That is, at present, in the semiconductor integrated circuit manufacturing process, various electrical characteristics of the N-type transistor are generally better than those of the P-type transistor. Therefore, it is possible to easily draw or fetch the current obtained by adding the currents IP1 and IB1, with use of the circuit structured mainly by the N-type transistor.

Subsequently, the operation of the laser diode drive circuit shown in FIG. 9 will be explained. To simplify the explanation, it is assumed that the gain α of the first and second current amplification circuits 914 and 915 is "α=1", the current IP1 is "IP1=IP", and the current IB1 is "IB1=IB".

Figure 12:
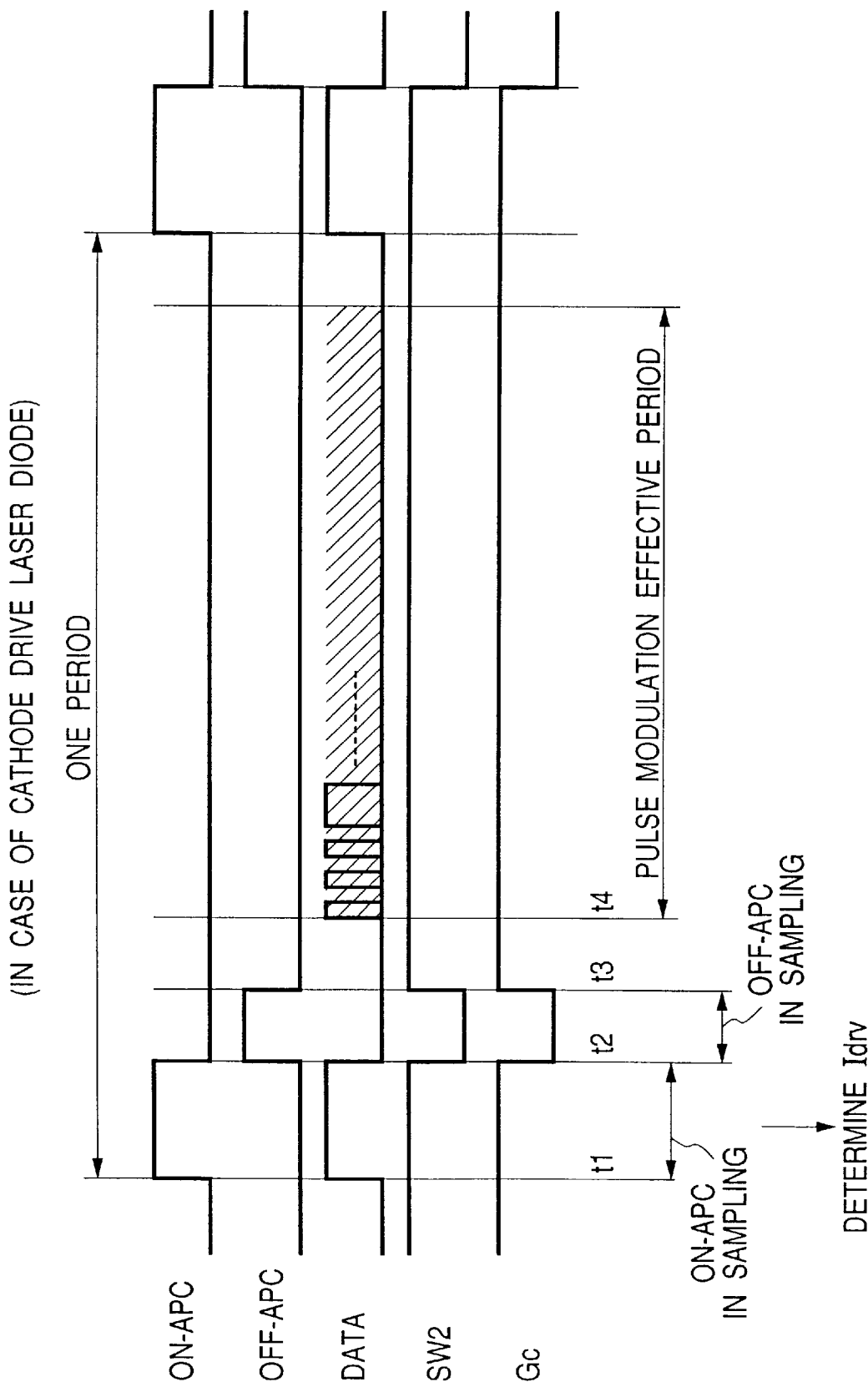
FIG. 12 is a timing chart of the control signals.

FIG. 12 is the timing chart of the control signals in the present embodiment.

Initially, the current value control of the laser diode drive current Idrv for determining the light emission quantity will be explained. The control operation is performed for the period from a time t1 to a time t2, and the respective control signals for such a period are given as follows.

ON-APC: "H"
OFF-APC: "L"
DATA: "H"
SW2: "H"
Gc: "H"

In this situation, the first S/H circuit 905 is in the sampling state, and the first switching circuit 908 is in the conductive state such that the laser diode 901 is in the entire-face light emission state. Thus, the output current I1 of the current restriction circuit 907 acts as the pulse current IP as it is.

Further, if the second S/H switching circuit 913 is in the conductive state and the gain G of the variable current gain circuit 912 is "n/(n−1)", the arbitrary value is given to the restriction current value I0. However, as described above, the value is not at all relative to the control operation for determining the laser diode drive current Idrv.

By monitoring the light output of the laser diode 901 with use of the photodiode 902, the monitor current IM is produced at the photodiode 902. Then, the current IM flows in the current/voltage conversion circuit 903, whereby the monitor voltage VM is produced at the output of the circuit 903. The monitor voltage VM is compared with the first reference voltage Vr1 corresponding to the desired light quantity by the first voltage comparator 904, and the compared result is output to the first variable gm amplifier 906 through the first S/H circuit 905. The control function ka of the amplifier 906 is determined based on the potential difference between the output voltage Verr1 of the circuit 905 and the second reference voltage VA, thereby determining the laser diode drive current Idrv (=ka·IA) for determining the light emission quantity. Further, the pulse current IP and the bias current IB are determined based on the current Idrv, and the current obtained by superimposing the currents IP and IB is supplied to the cathode of the laser diode 901.

Figure 13:
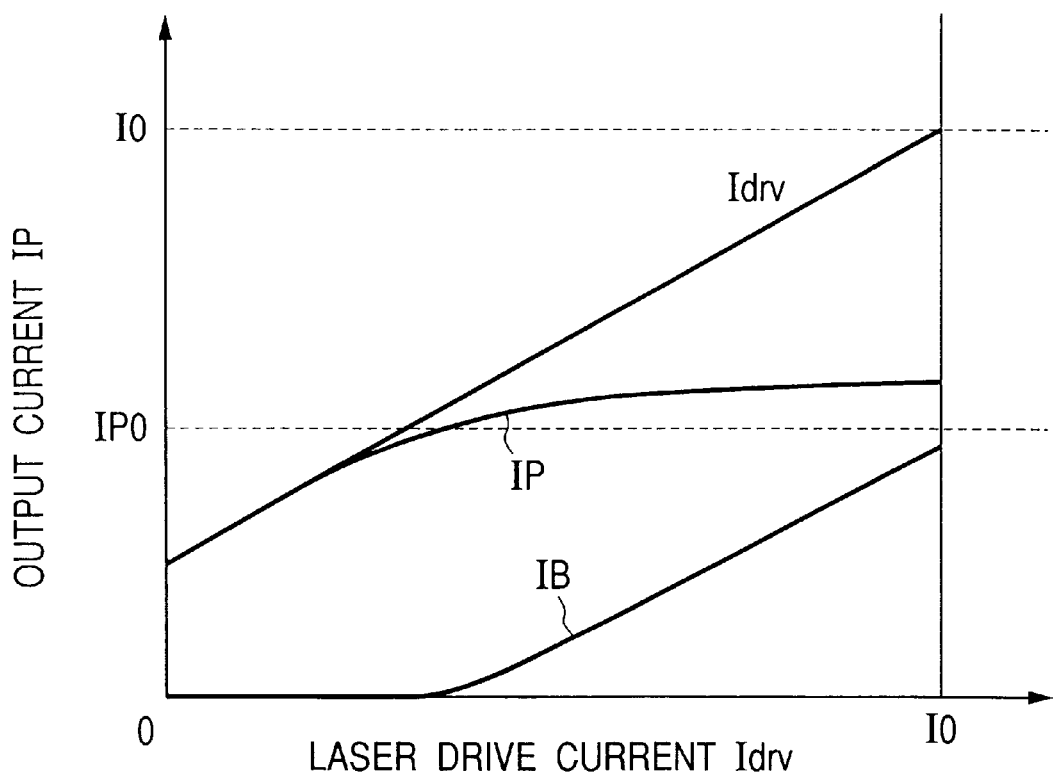
FIG. 13 is a characteristic diagram showing the change of the output current to the laser diode drive current.

FIG. 13 shows the relation of the pulse current IP and the bias current IB in the case where the laser diode drive current Idrv changes. Hereinafter, how to determine the pulse current IP and the bias current IB will be explained.

When the value of the laser diode drive current Idrv is smaller than the restriction current value I0, the current restriction circuit 907 does not operate, and the same current as the current Idrv is output as the output current I1 of the circuit 907. Further, since the first switching circuit 908 is in the conductive state, the pulse current IP becomes identical with the current Idrv. Therefore, the bias current IB is not produced. This is because the bias current IB corresponds to the difference between the currents Idrv and IP, and such the difference at this time is "0". Furthermore, the current ILD to be supplied to the cathode of the laser diode 901 consists of only the pulse current IP, whereby the light emission operation of the laser diode 901 is performed only based on the pulse current control.

If the current Idrv becomes close to the restriction current value I0, the current restriction circuit 907 gradually starts to operate, whereby the difference occurs between the current Idrv and the output current I1 of the circuit 907. This difference becomes the bias current IB, and the currents IP and IB are supplied to the cathode of the laser diode 901.

Further, if the current Idrv increases and thus exceeds the restriction current value I0, the increased quantity of the pulse current IP abruptly decreases while the bias current IB increases. This is because, since the restriction capability of the current restriction circuit 907 is finite, the complete current restriction is impossible. The current consisting of the currents IP and IB is supplied to the cathode of the laser diode 901, whereby the light emission operation of the laser diode 901 is performed.

Subsequently, the control operation to determine the restriction current value I0 to be input to the current restriction circuit 907 and necessary for the determination of the current I1 will be explained. Such the control operation is performed for the period from the time t1 to a time t4 in FIG. 12.

Initially, for the period from the time t2 to a time t3, the output current I2 of the second variable gm amplifier 911 is controlled to be able to obtain 1/N of the desired light quantity. The respective control signals in this period are as follows.

ON-APC: "L"
OFF-APC: "H"
DATA: "L"
SW2: "L"
Gc: "L"

In this period, the first S/H circuit 905 is in the holding state, and the second S/H circuit 910 is in the sampling state, and the first switching circuit 908 is in the nonconductive state, whereby the pulse current does not exist. For this reason, only the bias current IB is supplied to the cathode of the laser diode 901.

The laser diode drive current Idrv is subjected to the current restriction by the current restriction circuit 907. Thus, the output current I1 of the circuit 907 does not flow in the first switching circuit 908, but acts only to decrease the current Idrv through the second current buffer. Further, the second switching circuit 913 is in the nonconductive state, and the gain G of the variable current gain circuit 912 is "1". The output current I2 of the second variable gm amplifier 911 is controlled such that the output light of the laser diode 901 becomes 1/N of the desired light quantity.

The reason why the output light of the diode 901 is controlled by controlling the current I2 is as follows. That is, for the period from the time t2 to the time t3, the first switching circuit 908 is in the nonconductive state, whereby the current ILD to be supplied to the diode 901 is only the bias current IB.

Further, the bias current IB is obtained by subtracting the output current I1 of the current restriction circuit 907 from the laser diode drive current Idrv. Furthermore, the output current I1 is determined according to the restriction current value I0, and the value I0 is the output current I2 of the second variable gm amplifier 911 flowing through the variable current gain circuit 912 of which gain is "1". The second switching circuit is in the nonconductive state at this time, whereby the constant current Ix is not superimposed on the restriction current value I0. Therefore, if the current I2 is controlled, it is possible to control the output light of the laser diode 901.

If the output light of the laser diode 901 is monitored by the photodiode 902, the monitor current IM flows at the output terminal of the photodiode 902. By inputting the monitor current IM to the current/voltage conversion circuit 903, the monitor voltage VM is produced at the output of the circuit 903. Then, the voltage VM is compared with the third reference voltage Vr2 corresponding to 1/N of the desired light quantity by the second voltage comparator 909, and the compared result is output to the second variable gm amplifier 911 through the second S/H circuit 910. The control function kb of the amplifier 911 is determined based on the potential difference between the output voltage Verr2 of the second S/H circuit 910 and the fourth reference voltage VB, whereby the output current I2 (=kb·IB) of the amplifier 911 is determined. For the period from the time t2 to the time t3, since the gain G of the variable current gain circuit 912 is "1" and the second switching circuit 913 is in the nonconductive state, the restriction current value I0 is the same as that of the output current I2 of the amplifier 911. Here the current I2 represents the difference current (Idrv−In) between the current Idrv for obtaining the desired light quantity and the current In for obtaining 1/N of the desired light quantity.

If the current I2 is determined, the restriction current value I0 and the current ILD to be supplied to the laser diode 901 are also determined. Therefore, the current I2 is controlled such that the output light of the laser diode 901 becomes 1/N of the desired light quantity.

Herein, the value of the output current I2 of the variable gm amplifier 911 is concretely obtained.

As the condition for obtaining such the current value, it is assumed in the characteristic of the laser diode 901 that the oscillation threshold current is 20 mA, the desired light quantity value is 4 mW, and the current ILD supplied to the diode 901 at this time is 30 mA. Further, it is assumed that the light quantity linearly increases when the current value to be obtained is equal to or larger than the oscillation threshold current. Furthermore, to simplify the explanation, it is assumed that the restriction capability of the current restriction circuit 907 is infinite.

On such the condition, the case of "n=4" is considered. If the laser diode drive current Idrv is determined for the period from the time t1 to the time t2, the current Idrv=ILD=30 mA, and the current ILD necessary to obtain ¼ of the desired light quantity is In (=22.5), then $$IP1 = IP = 0 \tag{13}$$

$$IB1 = IB = In = Idrv - I2 \tag{14}$$

Therefore, $$I2 = Idrv - I1 = 30 - 22.5 = 7.5 \text{ (mA)} \tag{15}$$

At this time, since the gain G of the variable current gain circuit 912 is "1" and the second switching circuit 913 is in the nonconductive state, the restriction current value I0 becomes identical with the value of the current I2, i.e., I0=I2=7.5 mA.

Subsequently, for the period from the time t3 to the time t4, the oscillation threshold current Ith is obtained based on the current I2 obtained in the previous period, and the control is performed to determine the final restriction current value I0. The control operation at this time will be explained hereinafter. The respective control signals in this operation are as follows.

ON-APC: "L"
OFF-APC: "L"
DATA: "L"
SW2: "H"
Gc: "H"

In this situation, the first S/H circuit 905 is in the holding state, and the second S/H circuit 910 is in the sampling state, and the first switching circuit 908 is in the nonconductive state, whereby only the bias current IB is supplied to the cathode of the laser diode 901. Further, the second switching circuit 913 is in the conducive state, whereby the constant current Ix is added to the output current of the variable current gain circuit 912. Furthermore, the gain G of the circuit 912 is "n/(n−1)". Therefore, the oscillation threshold current Ith is given by the following equation.

$$Ith = I2 \cdot n/(n-1) \tag{16}$$

$$= (Idrv - In) \cdot n/(n-1)$$

Therefore, the restriction current value I0 is given and determined by the following equation.

$$I0 = I2 \cdot n/(n-1) + Ix \tag{17}$$

$$= (Idrv - In) \cdot n/(n-1) + Ix$$

The constant current Ix is the offset current which is used to determine how much the oscillation threshold current Ith is decreased, so as to completely turn on/off the output light of the diode 901. It is necessary for the constant current Ix to satisfy the condition "Ix≦Ith".

Here the reason why the oscillation threshold current Ith is not set to have the current restriction value I0 will be explained. If the value I0 is determined only based on the current Ith, the current (i.e., bias current IB) flowing while the diode 901 does not emit the light acts as the current Ith. The laser diode slightly emits the light even by such the current. For example, in the electrophotographic process, it is highly possible that such the light quantity makes the undesirable background on the image. For this reason, the constant current Ix is added to decrease the current (i.e., bias current IB) flowing while the diode 901 does not emit the light, so as to make the state that the light is completely turned off.

Herein, the current restriction value I0 at this time is concretely obtained. In this case, it is assumed that the conditions of the laser diode and the like are the same as those in the case where the current restriction value I0 for the period from the time t2 to the time t3 is obtained. The value I0 for the period from the time t2 to the time t3 and the output current I2 of the second variable gm amplifier 911 were given as "I0=I2=7.5 mA". Further, in this case, the constant current Ix is assumed to be "Ix=5 mA". On such the conditions, the restriction current value I0 is obtained from the equation (16), as follows.

$$I0 = 7.5 \times 4/3 + 5 = 15 \text{ (mA)}$$

That is, the value I0 obtained by such the concrete calculation is 15 mA, whereby the current value giving the amplitude of the pulse current IP in the current ILD supplied to the diode 901 is 15 mA.

From the time t4, the first switching circuit 908 is turned on/off according to the input data. Thus, it becomes possible to perform the pulse modulation according to the input data, whereby it is possible to derive the pulse-modulated output light from the diode 901.

Figure 14A:
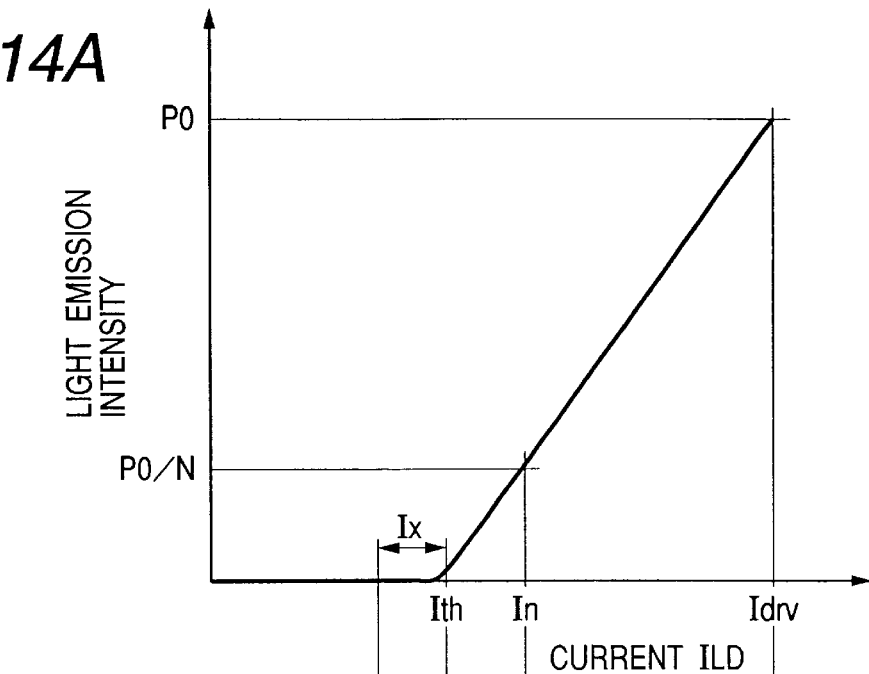
FIG. 14A is a characteristic diagram showing the relation of the current supplied to the laser diode and the light emission intensity.
Figure 14B:
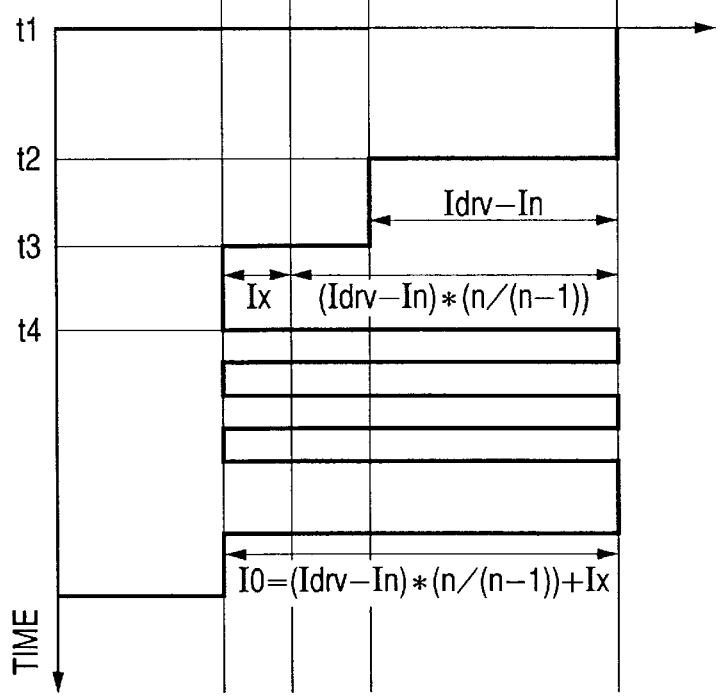
FIG. 14B is a characteristic diagram showing the relation the control time and the current.

FIG. 14A shows the relation between the current ILD supplied to the laser diode 901 and the light emission intensity of the diode 901, and FIG. 14B shows the change of the current ILD in the above-explained period from the time t1 to the time t4, and the period (i.e., pulse modulation effective period) from the time t4.

For the period from the time t1 to the time t2, the current Idrv is determined to be able to obtain the desired light quantity I0.

For the period from the time t2 to the time t3, the current In is supplied to the diode 901 such that the light quantity becomes "P0/N", thereby obtaining the difference current "Idrv−In" between the currents Idrv and In.

For the period from the time t3 to the time t4, the restriction current value I0 is obtained to determine the current giving the amplitude level in the pulse modulation. Further, the oscillation threshold current Ith is obtained from the equation (16), on the basis of the difference current "Idrv−In" between the currents Idrv and In determined in the previous period from the time t2 to the time t3. Before the pulse modulation starts, the current in which the currents Ith and Ix are added to each other is obtained as the final restriction current value I0, and this acts as the current value given by the equation (17).

It is desirable that the period from the time t1 to the time t2 is made equal to or longer than the period from the time t2 to the time t3. This is because, since the current value determined for the period from the time t1 to the time t2 gives the desired light quantity and the current value determined for the period from the time t2 to the time t3 is necessary to determine the restriction current value, the former current value is highly important as compared with the latter current value.

(Fifth Embodiment)

Subsequently, the fifth embodiment of the present invention will be explained with reference to FIGS. 15 and 16. In the fifth embodiment, the parts same as those in the above-described fourth embodiment are added with the same reference numerals respectively, and the explanations thereof are omitted.

Initially, the outline of the present embodiment will be explained. That is, an oscillation threshold current I2 is obtained from the difference current between a laser diode drive current Idrv controlled to set the light emission quantity of a laser diode 901 to have the desired value and the current necessary for obtaining 1/N of the desired light quantity. Then, a restriction current value I0 (current) is obtained by adding a constant current Ix to the current I2. Further, the current Idrv is subjected to the current restriction based on the restriction current value I0 in a current restriction circuit 907, and an output current I1 for giving the amplitude level in the pulse modulation is produced, whereby a pulse current IP for controlling the light emission operation is determined from the output current I1. Furthermore, a current IP1 obtained by subtracting the current IP from the current Idrv is supplied to the anode of the laser diode 901.

Since the laser diode drive circuit of such anode drive type is provided, even if the oscillation threshold current or the characteristic of slope efficiency in the laser oscillation area changes due to the change of operation temperature of the diode 901 or the like, it is possible to always apply the stable bias current in the vicinity of the oscillation threshold current and also to emit the satisfactory laser beam always capable of sufficiently securing the quenching ratio.

Subsequently, the concrete example will be explained.

Figure 15:
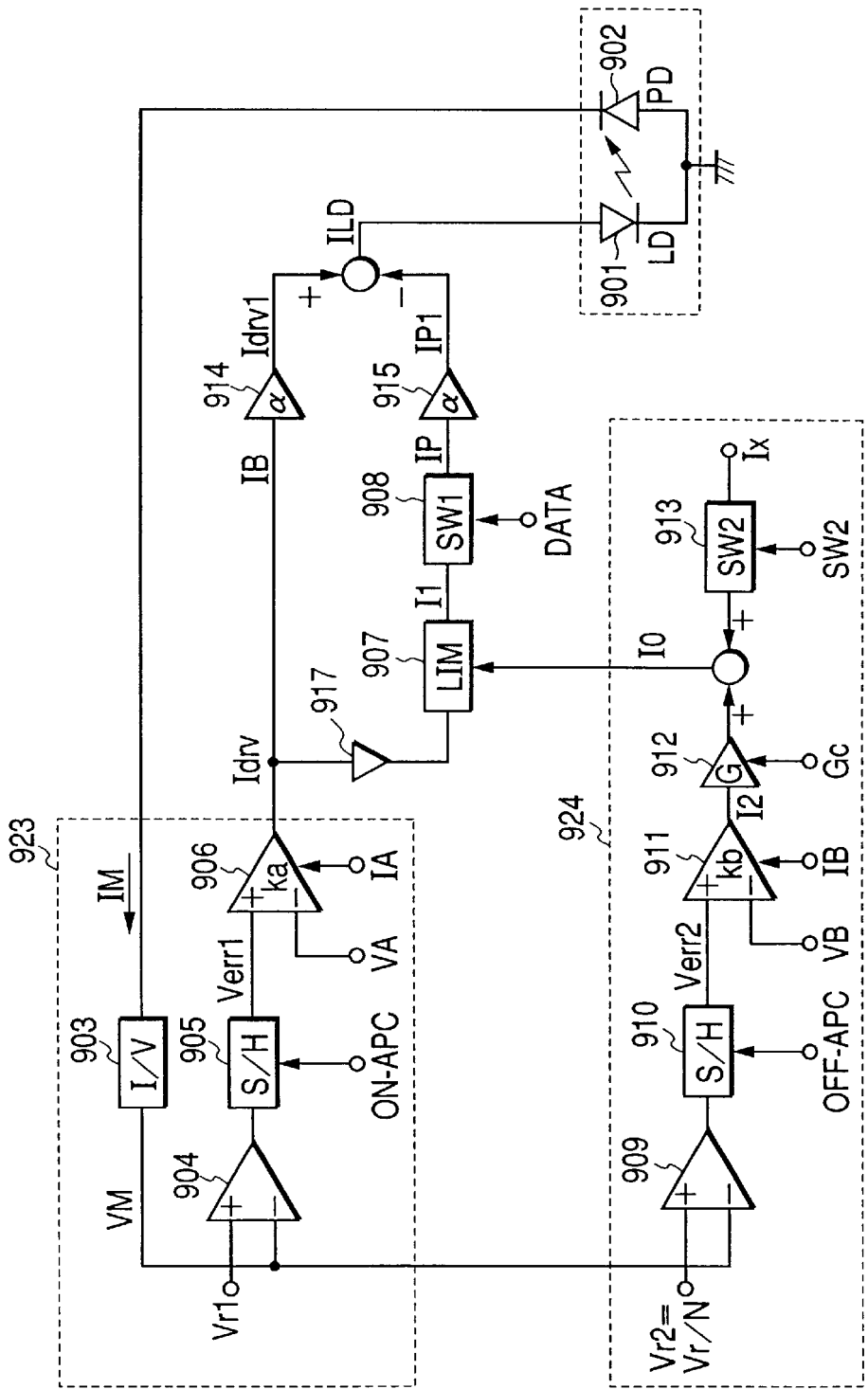
FIG. 15 is a circuit diagram showing the structure of the laser diode drive apparatus according to the fifth embodiment of the present invention.

FIG. 15 shows the example of the laser diode drive circuit according to the present invention. Numeral 901 denotes the laser diode of cathode drive type, and numeral 902 denotes a photodiode which monitors the light emission quantity from the laser diode 901. Since a circuit 923 for determining the laser diode drive current Idrv has the same structure as that in the above fourth embodiment, the explanation thereof is omitted.

The current Idrv output from the circuit 923 is then input to the current restriction circuit 907 through a first current buffer 917 and subjected to the current restriction based on the restriction current value I0. Since a circuit 924 for determining the value I0 has the same structure as that in the fourth embodiment, the explanation thereof is omitted. Further, the current restriction circuit 907 used in the present embodiment has the characteristic explained in the above fourth embodiment.

The output current I1 from the current restriction circuit 907 acts as the current for giving the amplitude level in the optical pulse modulation and is input to a first switching circuit 908. Then, the current is pulse-modulated by the circuit 908 according to the input data to obtain the pulse current IP.

A current ILD to be supplied to laser diode 901 is obtained by subtracting the current IP1 from the current Idrv1. In this case, the current Idrv1 is obtained by amplifying the current Idrv with use of a first current amplification circuit 914 (gain α), and the current IP1 is obtained by amplifying the current IP with use of a second current amplification circuit 915 (gain α). By using the first and second current amplification circuits 914 and 915, it is possible to suppress the power consumption in the control circuit until the currents Idrv and IP are determined.

In the laser diode drive circuit, the current Idrv is determined only based on the potential difference between voltages Verr1 and VA input to a first variable gm amplifier 906. Further, if the gain α of the first and second current amplification circuits 914 and 915 is given as "α=1" and the circuit 908 is in the nonconductive state, the current ILD supplied to the diode 901 has the value same as that of the current Idrv and acts as the current for giving the high level in the pulse modulation.

On the other hand, when the circuit 908 is in the conductive state, the current ILD supplied to the diode 901 is obtained by subtracting the current IP from the current Idrv and acts as the current (i.e., bias current IB) for giving non-luminous level in the pulse modulation.

The reason why the current obtained by subtracting the current IP1 from the current Idrv1 is supplied to the anode of the diode 901 is as follows. That is, at present, in the semiconductor integrated circuit manufacturing process, various electrical characteristics of the N-type transistor are generally better than those of the P-type transistor. Therefore, it is possible to draw or fetch the current IP1 by the circuit structured mainly by the N-type transistor, whereby it is possible to easily secure the high-speed operation in the pulse modulation.

Subsequently, the operation of the laser diode drive circuit will be explained. In the explanation, it is assumed that the gain α of the first and second current amplification circuits 914 and 915 is "α=1", the current Idrv1 is "Idrv1=Idrv", and the current IP1 is "IP1=IP". Further, to simply explain the basic operation in the present embodiment, it is assumed that the current restriction circuit 907 of which restriction capability is infinite is used. In other words, it is assumed that the circuit of which output current has the restriction current value if the current exceeding the restriction current value is input is used.

Figure 16:
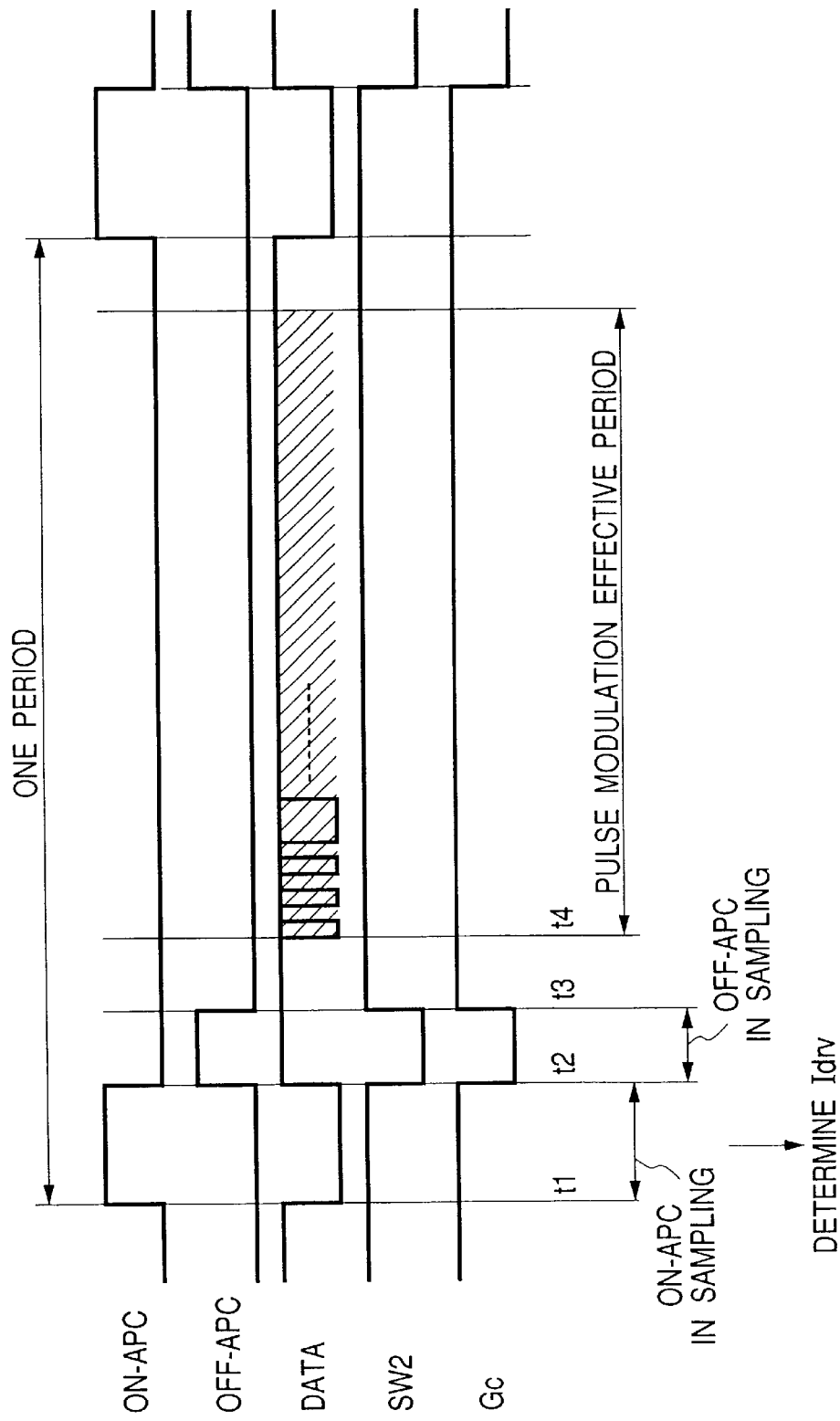
FIG. 16 is a timing chart of the control signals.

FIG. 16 is the timing chart of the control signals in the present embodiment. Initially, the control operation to determine the laser diode drive current Idrv will be explained. Such the control operation is performed for the period from a time t1 to a time t2 shown in FIG. 16, and the respective control signals for such the period are given as follows.

ON-APC: "H"
OFF-APC: "L"
DATA: "L"
SW2: "H"
Gc: "H"

In this situation, the first S/H circuit 905 is in the sampling state, and the data (DATA) input to the first switching circuit 908 is set to be in the nonconductive state such that the laser diode 901 is in the entire-face light emission state in which the current for decreasing the laser diode drive current Idrv does not exist.

Further, in this situation, the second switching circuit 913 is in the conductive state, and the gain G of the variable current gain circuit 912 is "n/(n−1)". Furthermore, the output current I1 of the current restriction circuit 907 acts as the pulse current IP as it is, and the arbitrary value is given as the restriction current value I0. However, the value I0 is not at all relative to the control operation of the laser diode drive current Idrv for the period from the time t1 to the time t2.

By monitoring the light output of the laser diode 901 with use of the photodiode 902, the monitor current IM is produced at the photodiode 902. Then, the current IM flows in the current/voltage conversion circuit 903, whereby the monitor voltage VM is produced at the output of the circuit 903.

The monitor voltage VM is compared with the first reference voltage Vr1 corresponding to the desired light quantity by the first voltage comparator 904, and the compared result is output to the first variable gm amplifier 906 through the first S/H circuit 905. The control function ka of the amplifier 906 is determined based on the potential difference between the output voltage Verr1 of the circuit 905 and the second reference voltage VA, whereby the laser diode drive current Idrv (=ka·IA) for determining the light emission quantity is determined.

For the period from the time t1 to the time t2, since the first switching circuit 908 is in the nonconductive state, the pulse current IP does not exist. Thus, the current ILD supplied to the laser diode 901 comes to have the same value as that of the current Idrv, whereby the current Idrv is controlled to obtain the desired light emission quantity.

Subsequently, for the period from the time t2 to the time t4, the control operation is performed to determine the restriction current value I0 to be input to the current restriction circuit 907.

Initially, for the period from the time t2 to the time t3, the output current I2 of the second variable gm amplifier 911 is controlled to be able to obtain 1/N of the desired light quantity. The respective control signals for such the period are given as follows.

ON-APC: "L"
OFF-APC: "H"
DATA: "H"
SW2: "L"
Gc: "L"

In this situation, the first S/H circuit 905 is in the holding state, the second S/H circuit 910 is in the sampling state, and the first switching circuit 908 is in the conductive state, whereby the current obtained by subtracting the current IP from the current Idrv is supplied to the anode of the laser diode 901. Further, the second switching circuit 913 is in the nonconductive state, and the gain G of the variable current gain circuit 912 is "1". Then, the output current I2 of the amplifier 911 is controlled to set the output light from the diode 901 to have 1/N of the desired light quantity.

Here the reason why the output light from the diode 901 is controlled by controlling the output current I2 of the amplifier 911 will be explained.

For the period from a time t2 to a time t3, the first switching circuit 908 is in the conductive state, and the current ILD supplied to the anode of the laser diode 901 is obtained by subtracting the pulse current IP from the laser diode drive current Idrv. Further, the current IP is determined based on the output current I1 of the current restriction circuit 907, and the current I1 is determined based on the restriction current value I0. That is, the restriction current value I0 is the value of the current I2 which is output from the second variable gm amplifier 911 and flows through the variable current gain circuit 912 of which gain is "1". Thus, the output light from the diode 901 is controlled.

By monitoring the output light from the laser diode 901 with use of the photodiode 902, the monitor current IM flows at the output end of the diode 902. Then, by inputting the current IM to the current/voltage conversion circuit 903, the monitor voltage VM is produced at the output of the circuit 903. The voltage VM is compared with the third reference voltage Vr2 corresponding to 1/N of the desired light quantity by the second voltage comparator 909, and the compared result is output to the second variable gm amplifier 911 through the second S/H circuit 910.

The control function kb of the amplifier 911 is determined based on the potential difference between the output voltage Verr2 of the circuit 910 and the fourth reference voltage VB, whereby the output current I2 (=kb·IB) of the amplifier 911 is determined.

For the period from the time t2 to the time t3, since the gain G of the circuit 912 is "1" and the second switching circuit 913 is in the nonconductive state, the restriction current value I0 becomes identical with the value of the output current I2 of the amplifier 911. Here the current I2 represents the difference current (Idrv−In) between the current Idrv for obtaining the desired light quantity and the current In for obtaining 1/N of the desired light quantity.

If the current I2 is determined, the restriction current value I0 and the current ILD to be supplied to the laser diode 901 are also determined. Therefore, the current I2 is controlled such that the output light of the laser diode 901 becomes 1/N of the desired light quantity.

Subsequently, for the period from the time t3 to the time t4, the oscillation threshold current Ith is obtained based on the current I2 obtained for the previous period, and the control operation for determining the final restriction current value I0 is performed. The respective control signals for such the period are given as follows.

ON-APC: "L"
OFF-APC: "L"
DATA: "H"
SW2: "H"
Gc: "H"

In this situation, the first S/H circuit 905 is in the holding state, the second S/H circuit 910 is in the sampling state, and the first switching circuit 908 is in the conductive state, whereby the current obtained by subtracting the current IP from the current Idrv is supplied to the anode of the laser diode 901. Further, the second switching circuit 913 is in the conductive state, and the constant current Ix is added to the output current of the variable current gain circuit 912. In this case, the gain G of the circuit 912 is "n/(n−1)". Further, the oscillation threshold current Ith is given by the above equation (16), and the restriction current value I0 is given and determined by the above equation (17).

The constant current Ix in the equation (17) is the offset current which is obtained from the current Ith and used to completely turn on/off the output light of the diode 901 at the constant current. The explanation concerning the reason why the offset current is given is omitted because such the reason has been explained in the above fourth embodiment.

From a time t4, since the first switching circuit 908 is turned on/off according to the input data, it becomes possible to perform the pulse modulation according to the input data, whereby it is possible to derive the pulse-modulated output light from the laser diode 901.

Also, in the present embodiment, it is desirable that the period from the time t1 to the time t2 is at least equal to or longer than the period from the time t2 to the time t3.

(Sixth Embodiment)

Subsequently, the sixth embodiment of the present invention will be explained with reference to FIG. 17. In the sixth embodiment, the parts same as those in the above-described embodiments are added with the same reference numerals respectively, and the explanations thereof are omitted.

Initially, the outline of the present embodiment will be explained.

In the present embodiment, an oscillation threshold current I2 is obtained from the difference current between a laser diode drive current Idrv controlled to set the light emission quantity of a laser diode 901 to have the desired value and the current necessary for obtaining 1/N of the desired light quantity. Then, a restriction current value I0 (current) is obtained by adding a constant current Ix to the current I2. Further, the current Idrv is subjected to the current restriction based on the restriction current value I0 in a current restriction circuit 907, and an output current I1 for giving the amplitude level in the pulse modulation is produced, whereby a pulse current IP for controlling the light emission operation is determined from the output current I1 of the circuit 907. Also, a bias current IB is obtained by subtracting the current IP from the current Idrv.

Further, in the present embodiment, the means for supplying the current obtained by superimposing the currents IP and IB to the cathode of the laser diode 901 and the means for supplying the current obtained by subtracting the current IP from the current Idrv to the anode of the diode 901 are simultaneously provided. Also, the selection means for selecting either of these two means is provided, whereby the laser diode 901 of cathode drive type is driven by using the selection means.

Since such laser diode drive circuits of anode drive type and cathode drive type are provided, it is possible to derive the same effect as that in the fourth embodiment by selecting the circuit of cathode drive type with use of the selection means. Also, it is possible to drive the laser diode 901 of anode drive type by selecting the other type with use of the selection means, whereby it becomes unnecessary to independently design a new drive circuit.

Subsequently, the present embodiment will be concretely explained.

Figure 17:
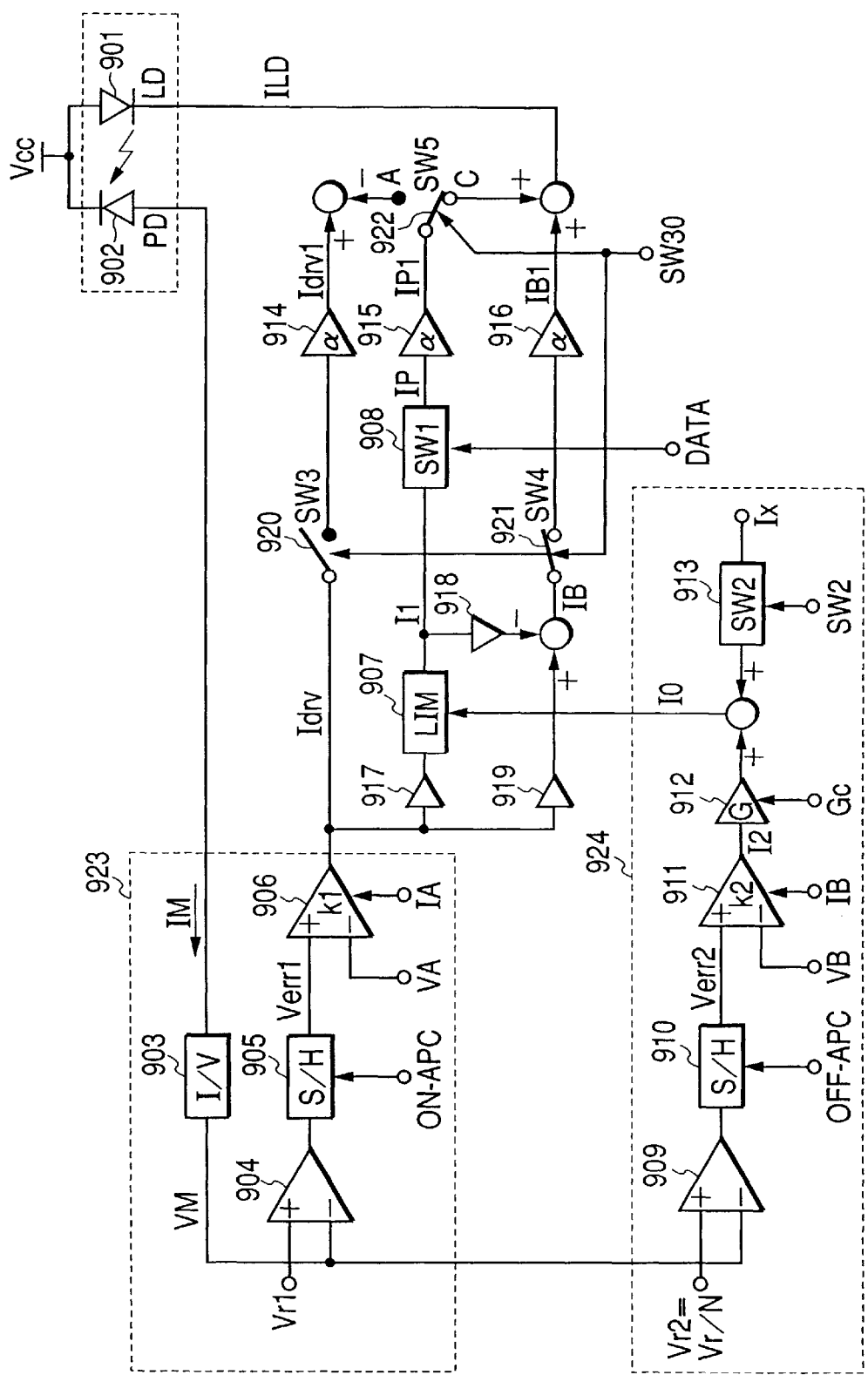
FIG. 17 is a circuit diagram showing the structure of the laser diode drive apparatus according to the sixth embodiment of the present invention.

FIG. 17 shows the structural example of the laser diode drive circuit to which the present invention is applied. This drive circuit simultaneously has both the functions described in the above fourth and fifth embodiments, and selects and drives either of the laser diode 901 of cathode drive type and the laser diode 901 of anode drive type. In this example, since the drive circuit is provided to drive the diode 901 of cathode drive type, the case of driving the laser diode of cathode drive type will be explained hereinafter.

Numeral 901 denotes the laser diode of cathode drive type, and numeral 902 denotes a photodiode which monitors the light emission quantity of the diode 901. Since the structure of a circuit 923 for determining the laser diode drive current Idrv is the same as that in the fourth embodiment, the explanation thereof is omitted.

The current Idrv output from the circuit 923 for determining the laser diode drive current Idrv is input to the current restriction circuit 907 through a first current buffer 917, and subjected to the current restriction on the basis of the restriction current value I0. In the present embodiment, since the structure of a circuit 924 for determining the value I0 is the same as that in the fourth embodiment, the explanation thereof is omitted.

The output current I1 of the current restriction circuit 907 acts as the current for giving the amplitude level to the optical pulse in the pulse modulation. The current I1 is input to a first switching circuit 908, subjected to the pulse modulation according to the input data, and output as the pulse current IP. The current IP is input to a second current amplification circuit 915, and then output therefrom as an output current IP1.

Further, the current I1 passed through a second current buffer 918 flows to decrease the current Idrv flowing through a third current buffer 919, and the current obtained by subtracting the current I1 from the current Idrv acts as the bias current IB. The current IB is input to a third current amplification circuit 916 through a fourth switching circuit 921, and then output therefrom as an output current IB1. The output current IP1 of the second current amplification circuit 915 is input to a fifth switching circuit 922. The circuit 922 has the two outputs, one for increasing the current IB1, and the other for decreasing the current Idrv1.

A third switching circuit 920, the fourth switching circuit 921 and the fifth switching circuit 922 cooperate with others, and are controlled based on a control signal SW30.

In the present embodiment, since the driving of the laser diode 901 of cathode drive type is explained, the third switching circuit 920 is set to be in the nonconductive state, and the fourth switching circuit 921 is set to be in the conductive state. Further, the fifth switching circuit 922 is controlled to select the side (i.e., C terminal side in FIG. 17) through which the currents IP1 and IB1 are added or superimposed, thereby connecting the laser diode 901 such that the current obtained by superimposing the currents IP1 and IB1 is supplied to the cathode of the diode 901.

It should be noted that the current restriction circuit 907 in the present embodiment has the same characteristic as that already explained in the fourth embodiment.

According to the above structure, in the laser diode drive circuit of the present embodiment, the laser diode drive current Idrv is determined only based on the potential difference between the voltages Verr1 and VA input to the first variable gm amplifier 906. Further, if the gain α of the first, second and third current amplification circuits 914, 915 and 916 is given as "α=1" and the first switching circuit 908 is in the conductive state, the current ILD supplied to the diode 901 has the same value as that of the current Idrv. On the other hand, if the circuit 908 is in the nonconductive state, the current ILD supplied to the laser diode 901 is only the bias current IB. In any case, since the operation in the present embodiment is substantially the same as that in the fourth embodiment, the explanation thereof is omitted.

(Seventh Embodiment)

Subsequently, the seventh embodiment of the present invention will be explained with reference to FIG. 18. In the seventh embodiment, the parts same as those in the above-described embodiments are added with the same reference numerals respectively, and the explanations thereof are omitted.

Initially, the outline of the present embodiment will be explained.

In the present embodiment, an oscillation threshold current I2 is obtained from the difference current between a laser diode drive current Idrv controlled to set the light emission quantity of a laser diode 901 to have the desired value and the current necessary for obtaining 1/N of the desired light quantity. Then, a restriction current value I0 (current) is obtained by adding a constant current Ix to the current I2. Further, the current Idrv is subjected to the current restriction based on the restriction current value I0 in a current restriction circuit 907, and an output current I1 for giving the amplitude level in the pulse modulation is produced, whereby a pulse current IP for controlling the light emission operation is determined from the output current I1. Also, a bias current IB is obtained by subtracting the current IP from the current Idrv.

Further, in the present embodiment, the means for supplying the current obtained by superimposing the currents IP and IB to the cathode of the laser diode 901 and the means for supplying the current obtained by subtracting the current IP from the current Idrv to the anode of the diode 901 are simultaneously provided. Also, the selection means for selecting either of these two means is provided, whereby the laser diode 901 of anode drive type is driven by using the selection means.

If such the laser diode drive circuits of cathode drive type and anode drive type are provided and the laser diode 901 of anode drive type is selected by the selection means, it is possible to derive the same effect as that in the fifth embodiment. Also, if the laser diode drive circuit of the other type is selected by using the selection means, it is possible to drive the laser diode 901 of cathode drive type, whereby it becomes unnecessary to independently design a new drive circuit.

Subsequently, the present embodiment will be concretely explained.

Figure 18:
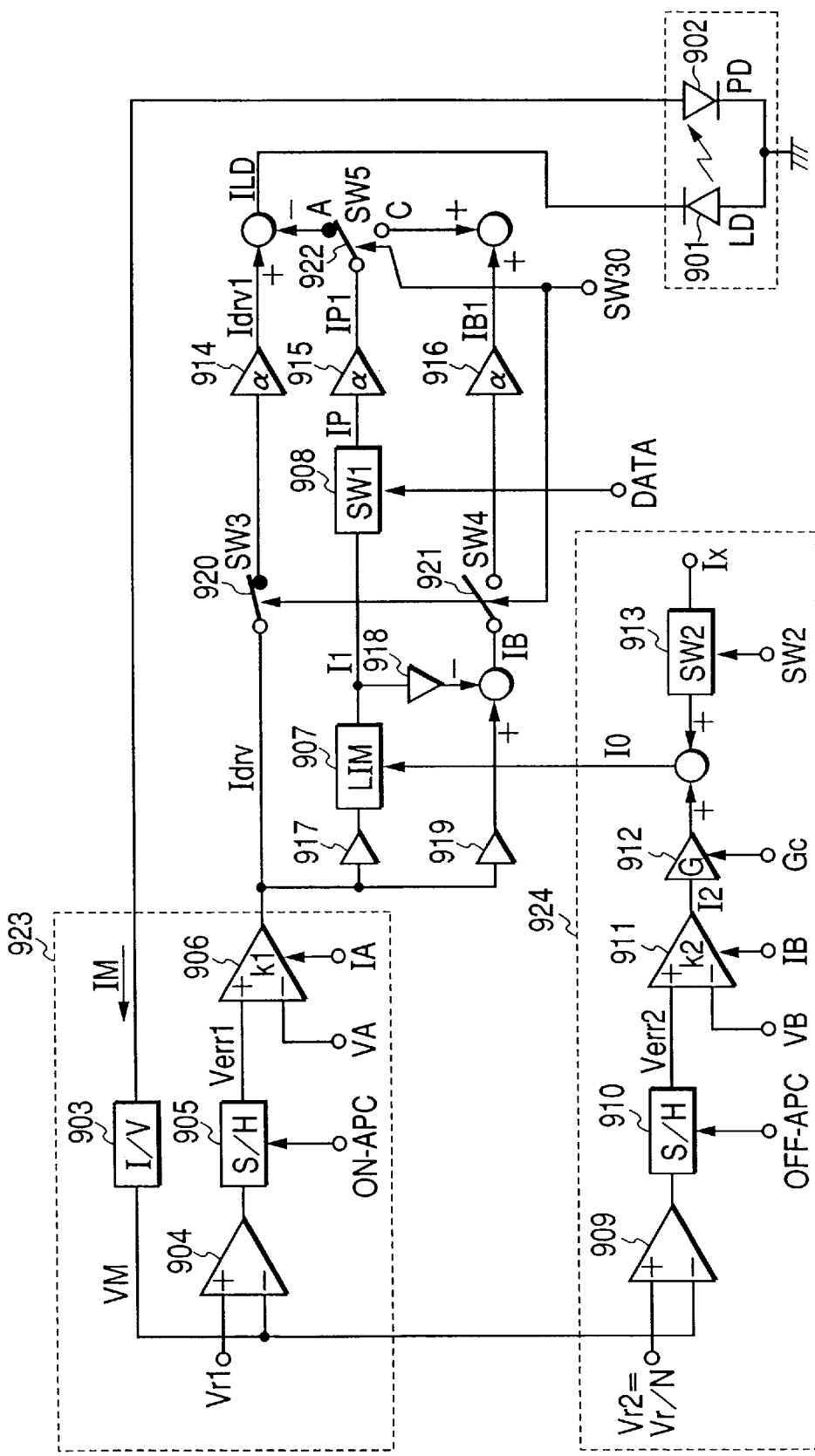
FIG. 18 is a circuit diagram showing the structure of the laser diode drive apparatus according to the seventh embodiment of the present invention.

FIG. 18 shows the structural example of the laser diode drive circuit to which the present invention is applied. This drive circuit has the same function as that explained in the above sixth embodiment. That is, by selecting either of the laser diode 901 of cathode drive type and the laser diode 901 of anode drive type, the laser diode 901 is then driven. In this example, since the drive circuit is provided to drive the diode 901 of anode drive type, the case of driving the laser diode of anode drive type will be explained hereinafter.

In the present embodiment, since the means for determining the currents Idrv, IP1 and IB1 are the same as those described in the sixth embodiment, the explanations thereof are omitted. The present embodiment is different from the sixth embodiment in the following points. That is, since the drive type of the subject laser diode 901 is different from that in the sixth embodiment, the states of sixth, seventh and eighth subject switching circuits 920, 921 and 922 and the methods for connecting these circuits to the laser diode 901 are different from those in the sixth embodiment. Hereinafter, the points different from the sixth embodiment will be explained.

In the present embodiment, since the laser diode 901 of anode drive type is driven, a control signal SW30 is applied such that the third switching circuit 920 comes to be in the conductive state, the fourth switching circuit 921 comes to be in the nonconductive state, and the fifth switching circuit 922 selects the side (i.e., terminal A side in FIG. 18) through which the current IP1 is subtracted from the current Idrv1. Further, the laser diode 901 is connected such that the current obtained by subtracting the current IP1 from the current Idrv1 is supplied to the anode of the diode 901.

In this situation, if the gain α of first, second and third current amplification circuits 914, 915 and 916 is given as "α=1", when a first switching circuit 908 is in the nonconductive state, a current ILD supplied to the diode 901 has the same value as that of the laser diode drive current Idrv. On the other hand, when the circuit 908 is in the conductive state, the current ILD supplied to the laser diode 901 is obtained by subtracting the pulse current IP from the current Idrv, and the obtained current acts as the current (i.e., bias current IB) for giving non-luminous level in the pulse modulation. Here, since the operation in the present embodiment is substantially the same as that in the fifth embodiment, the explanation thereof is omitted.

(Eighth Embodiment)

Subsequently, the eighth embodiment of the present invention will be explained with reference to FIGS. 19, 20 and 21. In the eighth embodiment, the parts same as those in the above-described embodiments are added with the same reference numerals respectively, and the explanations thereof are omitted.

Initially, the outline of the present embodiment will be explained.

In the present embodiment, an oscillation threshold current I2 is obtained from the difference current between a laser diode drive current Idrv controlled to set the light emission quantity of a laser diode 901 to have the desired value and the current necessary for obtaining 1/N of the desired light quantity. The current obtained by multiplying the current I2 and its coefficient together is added to the current I2 to obtain a restriction current value I0 (current). Further, the current Idrv is subjected to the current restriction based on the restriction current value I0 in a current restriction circuit 907, and an output current I1 for giving the amplitude level in the pulse modulation is produced. Then, a pulse current IP for controlling the light emission operation is determined from the output current I1. Also, a bias current IB is obtained by subtracting the current IP from the current Idrv, and the current obtained by superimposing the currents IP and IB is supplied to the cathode of the diode 901.

By providing such the laser diode drive circuit of cathode drive type, it is possible to derive the same effect as that in the fourth embodiment. Also, as compared with the fourth embodiment, it is possible to reduce one constant current and one control signal in the present embodiment.

Subsequently, the present embodiment will be concretely explained.

Figure 19:
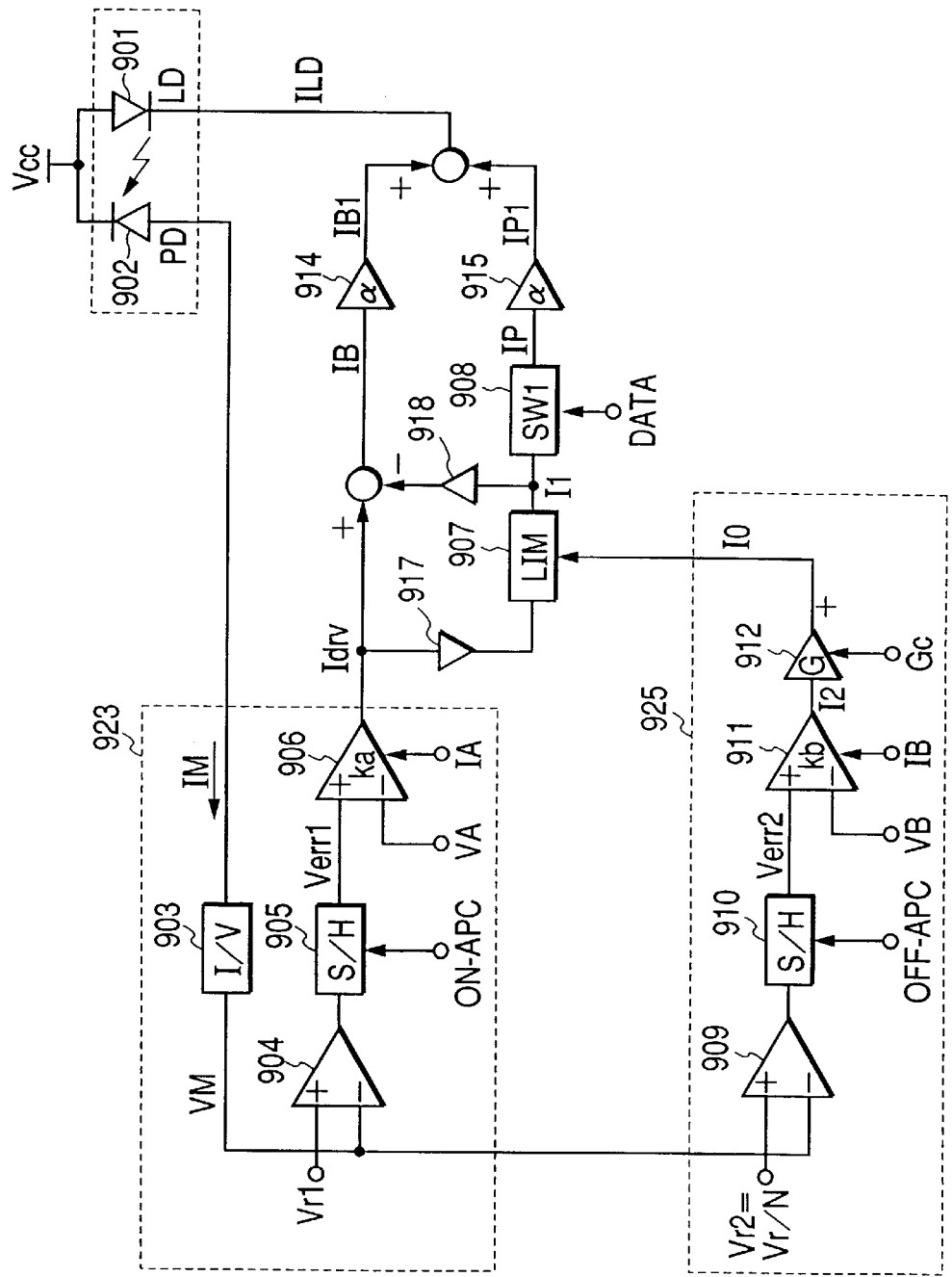
FIG. 19 is a circuit diagram showing the structure of the laser diode drive apparatus according to the eighth embodiment of the present invention.

FIG. 19 shows the structural example of the laser diode drive circuit to which the present invention is applied. Like the fourth embodiment, this circuit is the laser diode drive circuit of cathode drive type. The present embodiment is different from the fourth embodiment in the point as to the means for determining the restriction current value I0. Hereinafter, the structure of a circuit 925 for determining the value I0 will be explained. In the present embodiment, since other structures of the present embodiment are substantially the same as those of the fourth embodiment, the explanations thereof are omitted.

In the fourth embodiment, the oscillation threshold current Ith (=I2) is initially obtained, and then the constant current Ix is added to the current Ith to determine the restriction current value I0. On the other hand, in the present embodiment, the current obtained by multiplying the current Ith and its coefficient a together is used instead of the constant current Ix, and the current (a+1)·Ith is used as the restriction current value I0.

In the circuit 925 for determining the restriction current value I0, the voltage (=Vr1/N) being 1/N of a first reference voltage Vr1 is input as a third reference voltage Vr2 to the positive input terminal of a second voltage comparator 909. The output of the comparator 909 is connected to a second sample-and-hold (S/H) circuit 910, whereby a control signal OFF-APC for determining the sampling state or the holding state is input to the second S/H circuit 910.

An output voltage Verr2 of the second S/H circuit 910 is connected or input to the positive input terminal of a second variable gm amplifier 911. Further, a fourth reference voltage VB is input to the negative input terminal of the amplifier 911, and also a constant current IB is input thereto as the reference current. A control function kb of the amplifier 911 is determined from the potential difference between the input voltages Verr2 and VB, and the output current of the amplifier 911 is given as the current I2 (=kb·IB). The current I2 is input to a variable current gain circuit 912, and a control signal Gc is also input to the circuit 912. If the signal Gc is "L", the gain of the circuit 912 is given as "1", while if the signal Gc is "H", the gain of the circuit 912 is given as "n·(a+1)/(n−1)".

The reason why the gain of the circuit 912 is set to be "1" when the signal Gc is "L" is to obtain the current I2 for setting the output light of the laser diode 901 to have the value corresponding to 1/N of the desired light quantity. Further, the reason why the gain is set to be "n·(a+1)/(n−1)" when the signal Gc is "H" is to obtain the oscillation threshold current Ith (=I2·n/(n−1)) from the current I2 and finally determine the current given to the restriction current value I0. Such the current value is given as "(a+1)·Ith", and can be represented by the following equation.

$$I0 = (a+1) \cdot Ith \qquad (18)$$
$$= I2 \cdot n \cdot (a+1)/(n-1)$$

Subsequently, the circuit operation in the present embodiment will be explained. Hereinafter, to simplify the explanation, it is assumed that a gain α of first and second current amplification circuits 914 and 915 is "α=1", the current IP1 is "IP1=IP", and the current IB1 is "IB1=IB".

Figure 20:
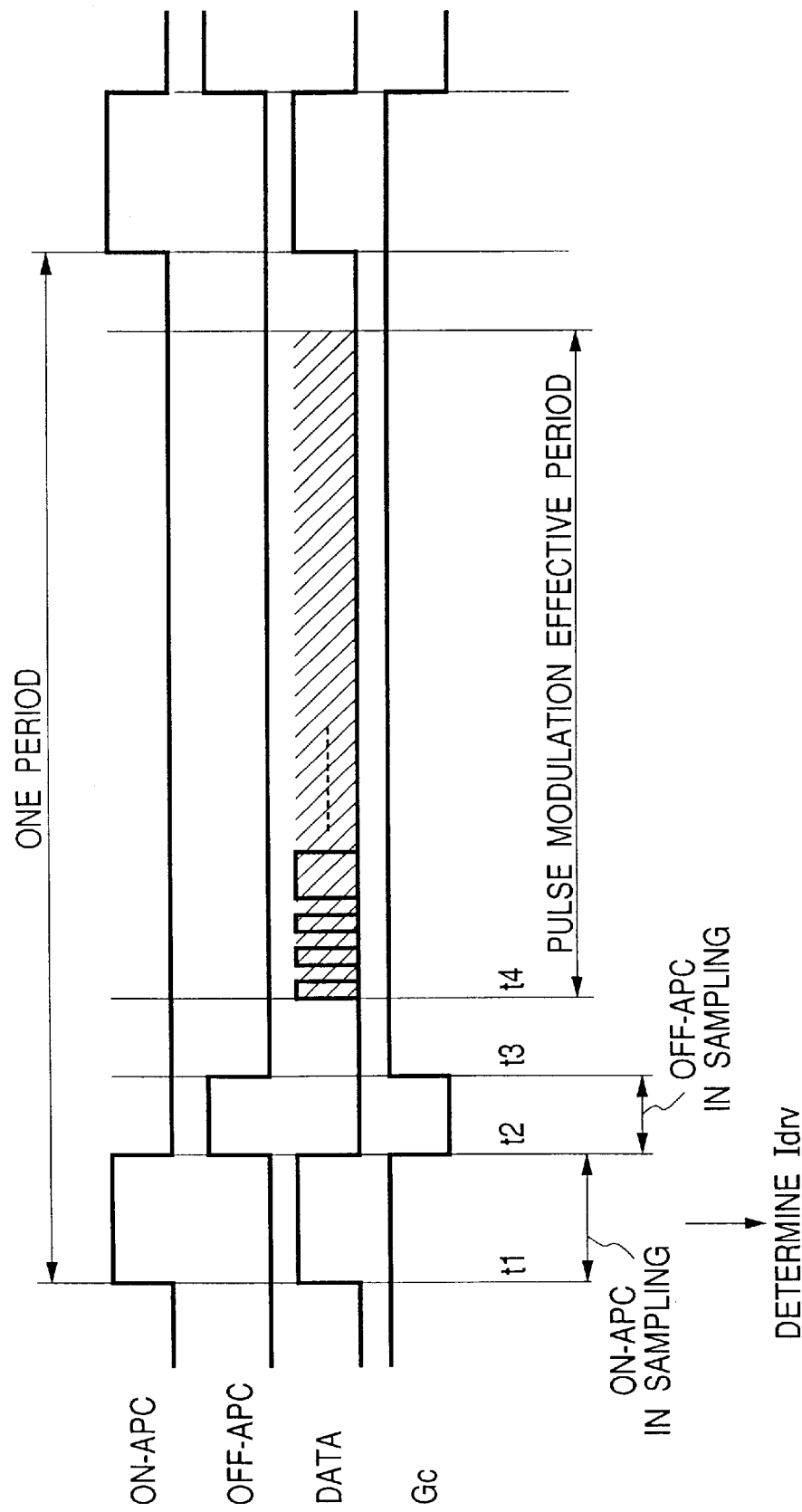
FIG. 20 is a timing chart of the control signals.

FIG. 20 is the timing chart of the control signals in the present embodiment. Initially, the control to determine the laser diode drive current Idrv is performed for the period from a time t1 to a time t2. However, such the control of this period is the same as that in the fourth embodiment, the explanation thereof is omitted. The control operation to determine the restriction current value I0 is performed for the period from the time t2 to a time t4 shown in FIG. 20.

Initially, for the period from the time t2 to a time t3, the output current I2 of the second variable gm amplifier 911 is controlled to be able to obtain 1/N of the desired light quantity. Also, since the control operation of this period is the same as that in the fourth embodiment, the explanation thereof is omitted.

Subsequently, for the period from a time t3 to the time t4, the oscillation threshold current Ith is determined based on the current I2 obtained in the previous period, and the final restriction current value I0 is determined. The respective control signals in the above operations for such the period are given as follows.

ON-APC: "L"

OFF-APC: "L"

DATA: "L"

Gc: "H"

In this situation, the first S/H circuit 905 is in the holding state, the second S/H circuit 910 is in the sampling state, and the first switching circuit 908 is in the nonconductive state, whereby only the bias current IB is supplied to the cathode of the laser diode 901. Further, the gain G of the variable current gain circuit 912 is "n·(a+1)/(n−1)". Therefore, the restriction current value I0 has the current value given by the equation (18).

From the time t4, since the first switching circuit 908 is turned on/off according to the input data, it is possible to control the light emission operation.

Also, in the present embodiment, it is desirable that the period from the time t1 to the time t2 is at least equal to or longer than the period from the time t2 to the time t3.

Figure 21:
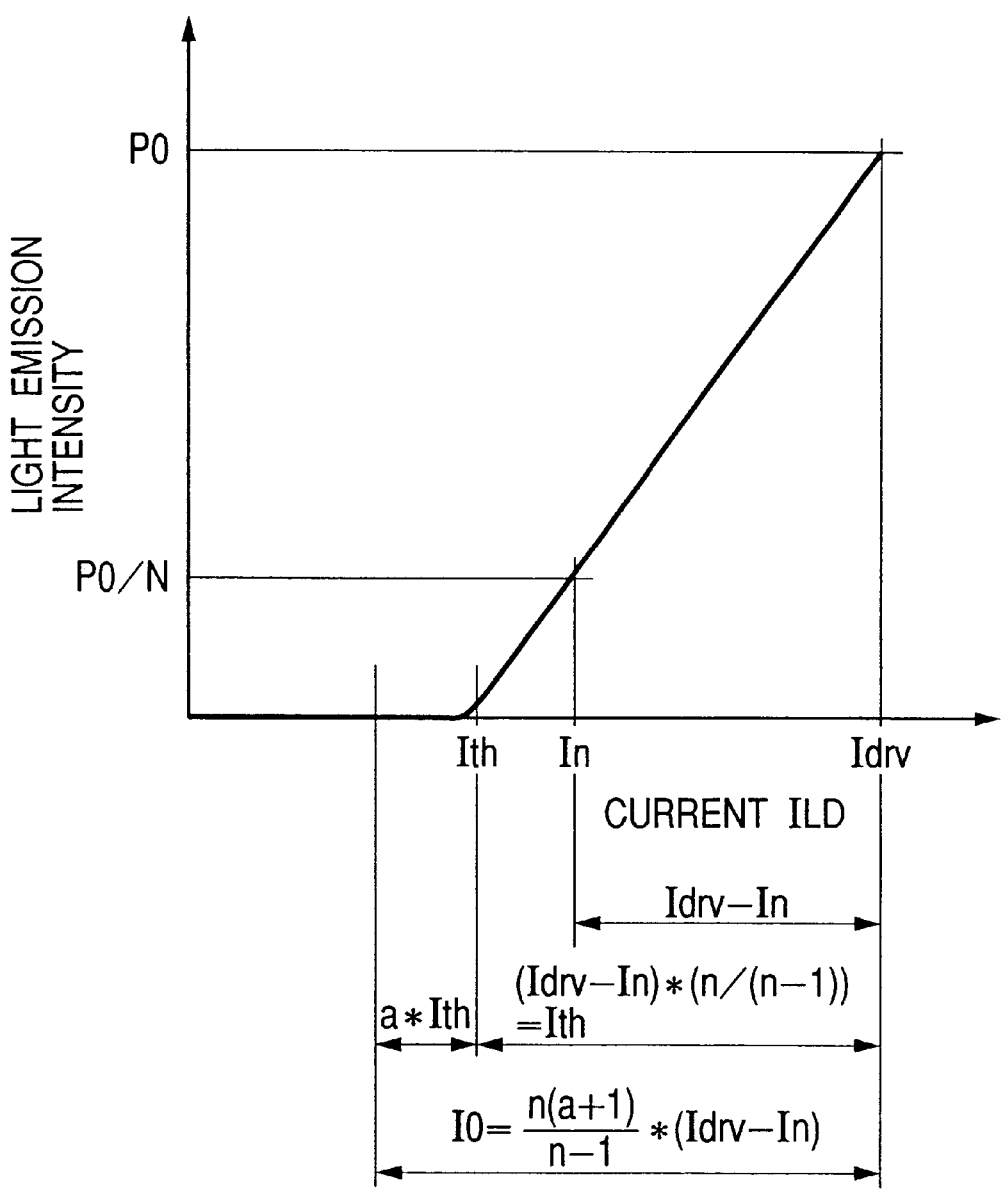
FIG. 21 a characteristic diagram showing the relation of the current determined in each control and the light emission intensity.

FIG. 21 shows the relation between the current determined in each control of the present embodiment and the output light of the laser diode 901. That is, the oscillation threshold current Ith is obtained from the current I2 (=Idrv−In) determined for the period from the time t2 to the time t3. Further, the current Ith is added to the current (a·Ith) obtained by multiplying the current Ith and its coefficient a together, thereby obtaining the restriction current value I0. The relations of the respective currents are represented by the following equation.

$$Ith = (Idrv - In) \cdot n / (n-1) \qquad (19)$$
$$I0 = Ith + a \cdot Ith$$
$$= (a+1) \cdot Ith$$
$$= (Idrv - In) \cdot n \cdot (a+1)/(n-1)$$

(Ninth Embodiment)

Subsequently, the ninth embodiment of the present invention will be explained with reference to FIG. 22. In the ninth embodiment, the parts same as those in the above-described embodiments are added with the same reference numerals respectively, and the explanations thereof are omitted.

Initially, the outline of the present embodiment will be explained.

In the present embodiment, an oscillation threshold current I2 is obtained from the difference current between a laser diode drive current Idrv controlled to set the light emission quantity of a laser diode 901 to have the desired value and the current necessary for obtaining 1/N of the desired light quantity. The current obtained by multiplying the current I2 and its coefficient together is added to the current I2 to obtain a restriction current value I0 (current). Further, the current Idrv is subjected to the current restriction based on the restriction current value I0 in a current restriction circuit 907, and an output current I1 for giving the amplitude level in the pulse modulation is produced. Then, a pulse current IP for controlling the light emission operation is determined from the output current I1. Also, the current obtained by subtracting the current IP from the current Idrv is supplied to the anode of the diode 901.

By providing such the laser diode drive circuit of anode drive type, it is possible to derive the same effect as that in the fifth embodiment. Also, as compared with the fifth embodiment, it is possible to reduce one constant current and one control signal in the present embodiment.

Subsequently, the present embodiment will be concretely explained.

Figure 22:
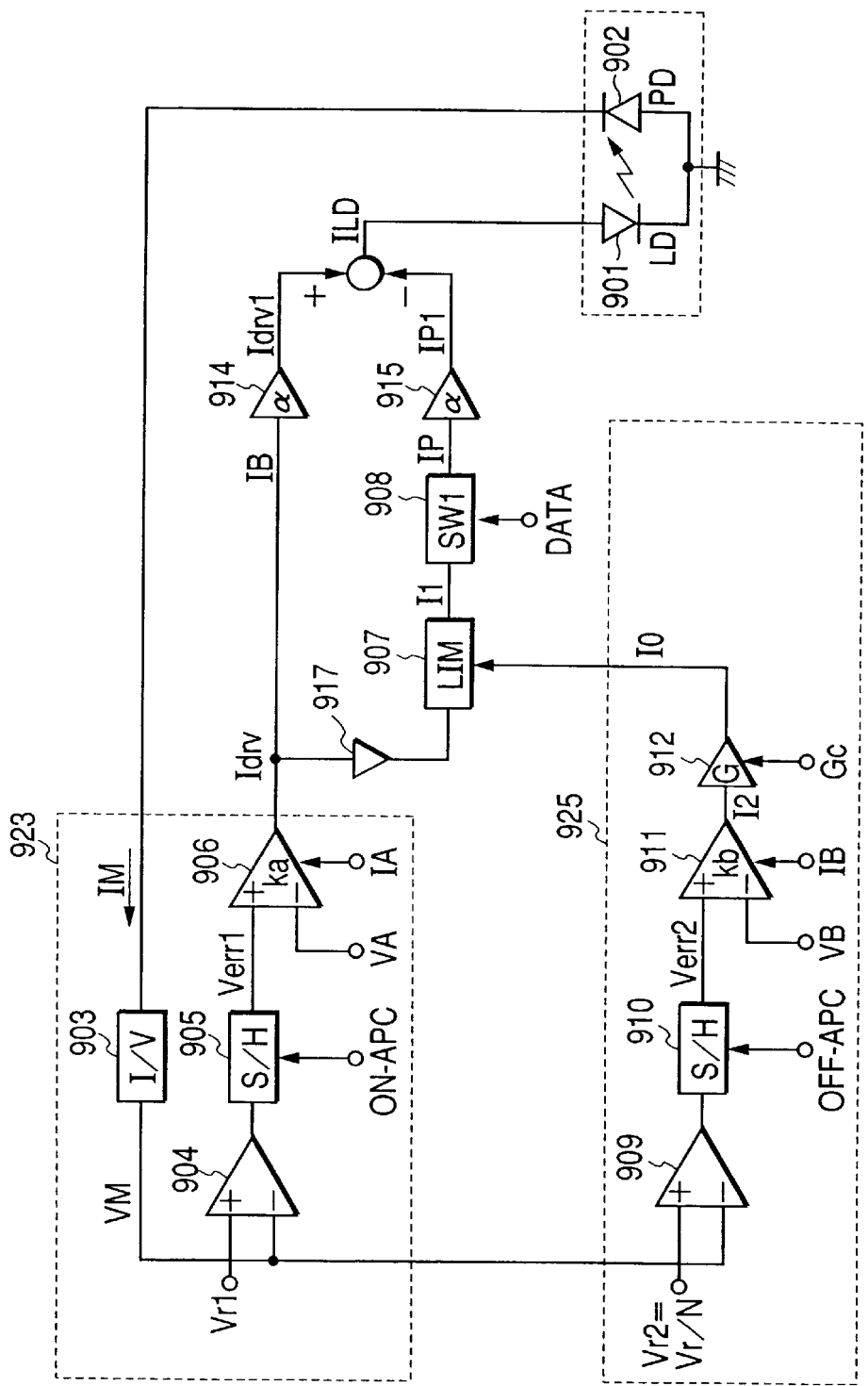
FIG. 22 is a circuit diagram showing the structure of the laser diode drive apparatus according to the ninth embodiment of the present invention.

FIG. 22 shows the structural example of the laser diode drive circuit to which the present invention is applied. In this structure, the circuit 924 for determining the restriction current value I0 in the fifth embodiment is replaced by the circuit 925 for determining the value I0 in the eight embodiment. Therefore, the detailed explanation thereof is omitted.

Subsequently, the operation in the present embodiment will be explained. Initially, in order to obtain the desired light quantity, the control operation to determine the laser diode drive current Idrv and the control operation to determine the current I2 for setting 1/N of the desired light quantity are performed. It should be noted that these operations are performed in the same manner as in the fifth embodiment.

Then, the control operation to determine the final restriction current value I0 is performed. Also, it should be noted that this operation is performed in the same manner as in the fifth embodiment.

(Tenth Embodiment)

Subsequently, the tenth embodiment of the present invention will be explained with reference to FIG. 23. In the ninth embodiment, the parts same as those in the above-described embodiments are added with the same reference numerals respectively, and the explanations thereof are omitted.

Initially, the outline of the present embodiment will be explained.

In the present embodiment, an oscillation threshold current I2 is obtained from the difference current between a laser diode drive current Idrv controlled to set the light emission quantity of a laser diode 901 to have the desired value and the current necessary for obtaining 1/N of the desired light quantity. The current obtained by multiplying the current I2 and its coefficient together is added to the current I2 to obtain a restriction current value I0 (current). Further, the current Idrv is subjected to the current restriction base d on the restriction current value I0 in a current restriction circuit 907, and an output current I1 for giving the amplitude level in the pulse modulation is produced. Then, a pulse current IP for controlling the light emission operation is determined from the output current I1. Also, a bias current IB is obtained by subtracting the current IP from the current Idrv.

Further, in the present embodiment, the means for supplying the current obtained by superimposing the currents IP and IB to the cathode of the laser diode 901 and the means for supplying the current obtained by subtracting the current IP from the current Idrv to the anode of the diode 901 are simultaneously provided. Also, the selection means for selecting either of these two means is provided, whereby the laser diode 901 of cathode drive type is driven by using the selection means.

If such laser diode drive circuits of cathode drive type and anode drive type are provided and the laser diode 901 of cathode drive type is selected by the selection means, it is possible to derive the same effect as that in the sixth embodiment. Also, as compared with the sixth embodiment, it is possible to reduce one constant current and one control signal in the present embodiment.

Subsequently, the present embodiment will be concretely explained.

Figure 23:
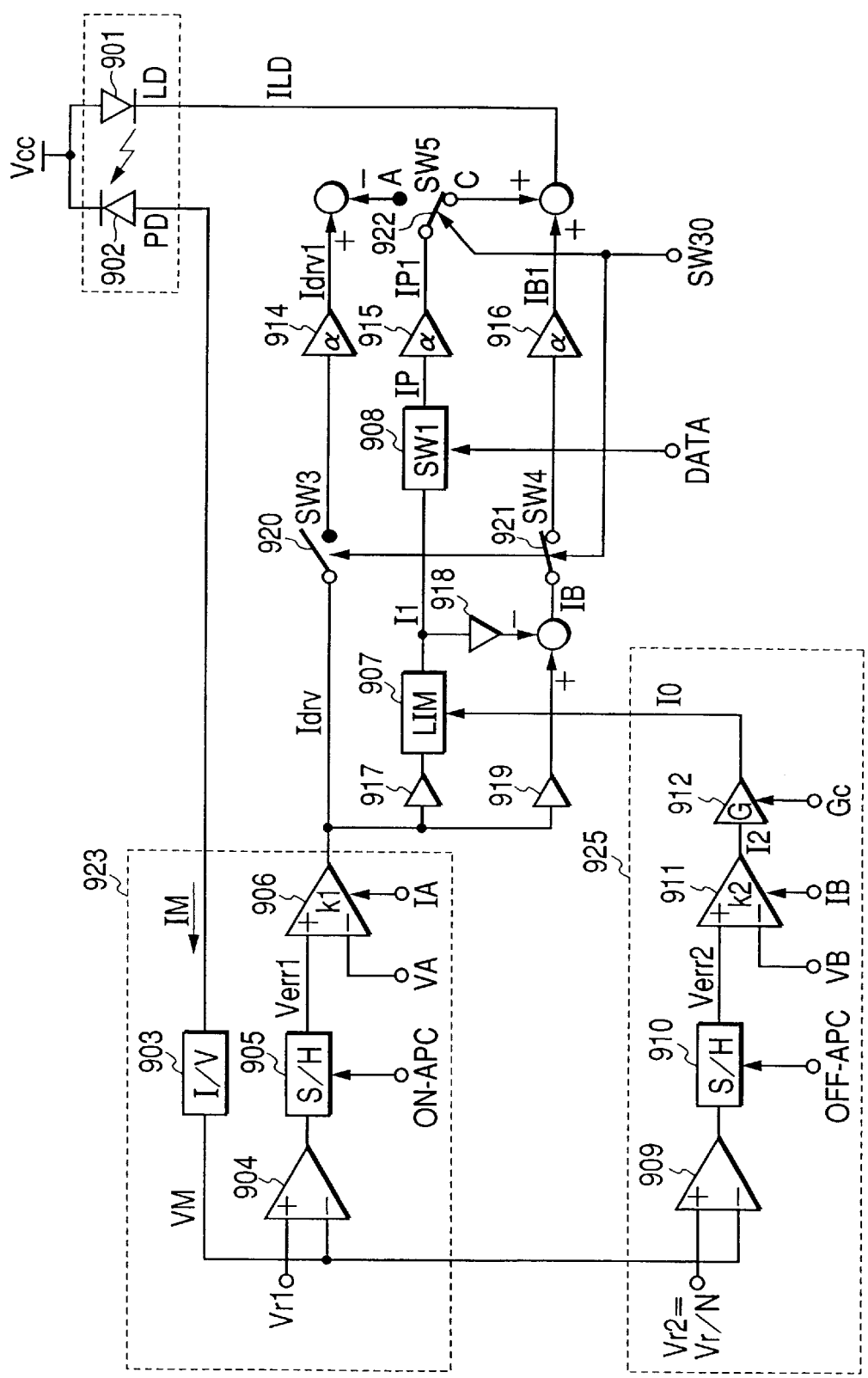
FIG. 23 is a circuit diagram showing the structure of the laser diode drive apparatus according to the tenth embodiment of the present invention.

FIG. 23 shows the structural example of the laser diode drive circuit to which the present invention is applied. Like the sixth embodiment, this circuit simultaneously contains the laser diode drive circuits of cathode drive type and anode drive type, and selects either of the circuits to drive the laser diode 901. Hereinafter, the case of driving the laser diode 901 of cathode drive type will be explained. In the present embodiment, since the circuit 924 for determining the restriction current value I0 in the sixth embodiment is replaced by the circuit 925 for determining the value I0 in the eight embodiment, the detailed explanation thereof is omitted.

Subsequently, the operation in the present embodiment will be explained. That is, since the laser diode 901 of cathode drive type is driven, a control signal SW3 is applied such that a third switching circuit 920 comes to be in the nonconductive state, a fourth switching circuit 921 comes to be in the conductive state, and a fifth switching circuit 922 selects the side (i.e., terminal C side in FIG. 23) through which the currents IB1 and IP1 are added to each other.

Initially, the control operation to determine the laser diode drive current Idrv for obtaining the desired light quantity and the control operation to determine the current I2 for obtaining 1/N of the desired light quantity are performed. These operations are performed respectively in the manners same as those in the fourth embodiment.

Then, the control operation to determine the final restriction current I0 is performed. Also, this operation is performed in the manner same as that in the eighth embodiment.

(Eleventh Embodiment)

Subsequently, the eleventh embodiment of the present invention will be explained with reference to FIG. 24. In the eleventh embodiment, the parts same as those in the above-described embodiments are added with the same reference numerals respectively, and the explanations thereof are omitted.

Initially, the outline of the present embodiment will be explained.

In the present embodiment, an oscillation threshold current I2 is obtained from the difference current between a laser diode drive current Idrv controlled to set the light emission quantity of a laser diode 901 to have the desired value and the current necessary for obtaining 1/N of the desired light quantity. The current obtained by multiplying the current I2 and its coefficient together is added to the current I2 to obtain a restriction current value I0 (current). Further, the current Idrv is subjected to the current restriction based on the restriction current value I0 in a current restriction circuit 907, and an output current I1 for giving the amplitude level in the pulse modulation is produced. Then, a pulse current IP for controlling the light emission operation is determined from the output current I1. Also, a bias current IB is obtained by subtracting the current IP from the current Idrv.

Further, in the present embodiment, the means for supplying the current obtained by superimposing the currents IP and IB to the cathode of the laser diode 901 and the means for supplying the current obtained by subtracting the current IP from the current Idrv to the anode of the diode 901 are simultaneously provided. Also, the selection means for selecting either of these two means is provided, whereby the laser diode 901 of anode drive type is driven by using the selection means.

If such laser diode drive circuits of cathode drive type and anode drive type are provided and the laser diode 901 of anode drive type is selected by the selection means, it is possible to derive the same effect as that in the seventh embodiment. Also, as compared with the seventh embodiment, it is possible to reduce one constant current and one control signal in the present embodiment.

Subsequently, the present embodiment will be concretely explained.

Figure 24:
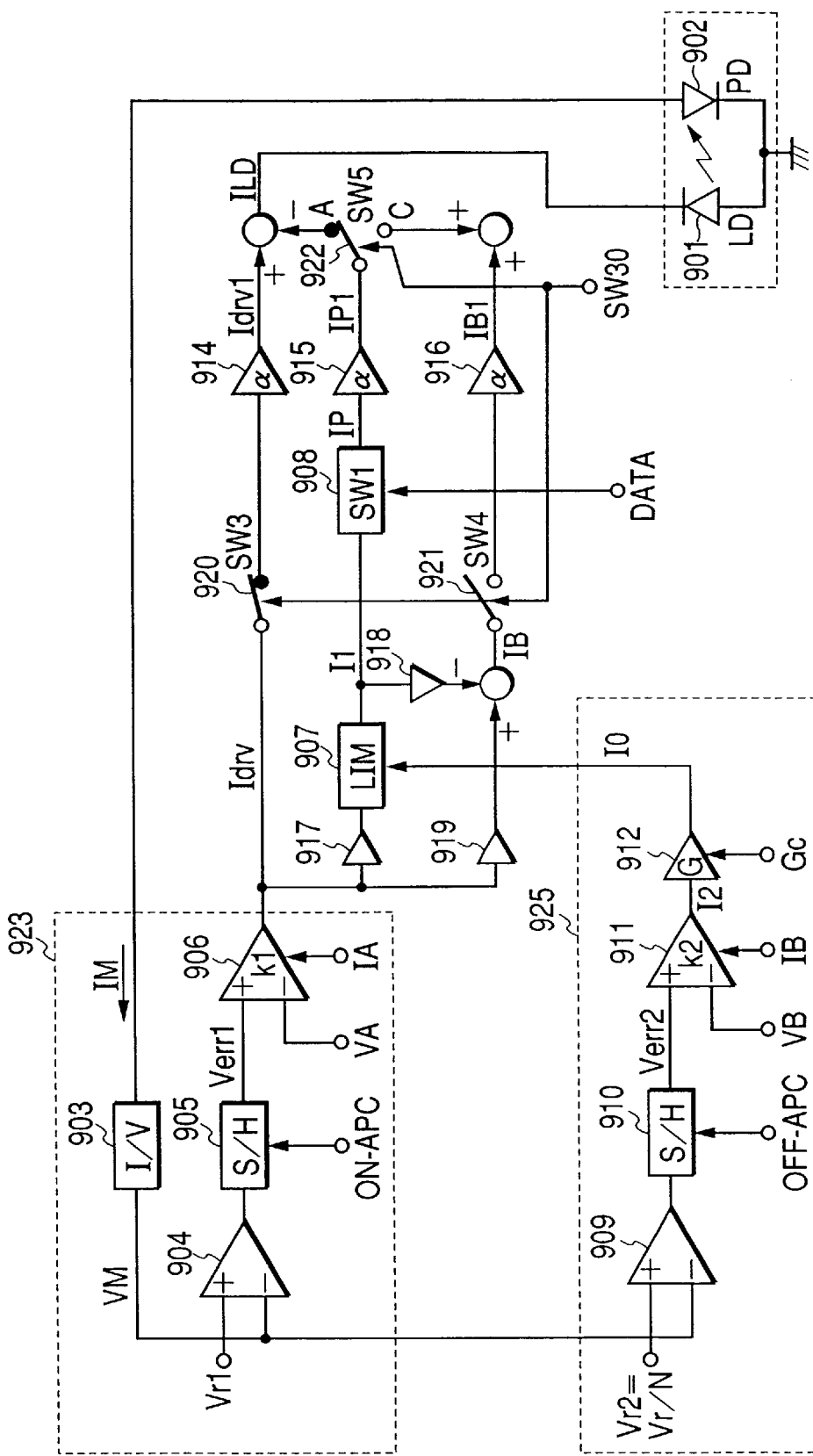
FIG. 24 is a circuit diagram showing the structure of the laser diode drive apparatus according to the eleventh embodiment of the present invention.

FIG. 24 shows the structural example of the laser diode drive circuit to which the present invention is applied. Like the seventh embodiment, this circuit simultaneously contains the laser diode drive circuits of cathode drive type and anode drive type, and selects either of the circuits to drive the laser diode 901. Hereinafter, the case of driving the laser diode 901 of anode drive type will be explained. In the present embodiment, since the circuit 924 for determining the restriction current value I0 in the seventh embodiment is replaced by the circuit 925 for determining the value I0 in the eight embodiment, the detailed explanation thereof is omitted.

Subsequently, the operation in the present embodiment will be explained. That is, since the laser diode 901 of anode drive type is driven, a control signal SW3 is applied such that a third switching circuit 920 comes to be in the conductive state, a fourth switching circuit 921 comes to be in the nonconductive state, and a fifth switching circuit 922 selects the side (i.e., terminal A side in FIG. 24) through which a current IP1 is subtracted from a current Idrv1.

Initially, the control operation to determine the laser diode drive current Idrv for obtaining the desired light quantity and the control operation to determine the current I2 for obtaining 1/N of the desired light quantity are performed. These operations are performed respectively in the manners same as those in the fifth embodiment.

Then, the control operation to determine the final restriction current I0 is performed. Also, this operation is performed in the manner same as that in the seventh embodiment.

(Twelfth Embodiment)

Subsequently, the twelfth embodiment will be explained with reference to FIGS. 25 and 26. In the twelfth embodiment, the parts same as those in the above-described embodiments are added with the same reference numerals respectively, and the explanations thereof are omitted.

Initially, the outline of the present embodiment will be explained.

In the present embodiment, an oscillation threshold current I2 is obtained from the difference current between a laser diode drive current Idrv controlled to set the light emission quantity of a laser diode 901 to have the desired value and the current necessary for obtaining 1/N of the desired light quantity. Then, a restriction current value I0 (current) is obtained by adding a constant current Ix to the current I2. Further, the current Idrv is subjected to the current restriction based on the restriction current value I0 in a current restriction circuit 936, and an output current I1 for giving the amplitude level in the pulse modulation is produced. Furthermore, a bias current IB is output from the difference current between the restriction current value I0 and the current Idrv equal to or larger than the restriction current value, and a pulse current IP for controlling the light emission operation is determined from the current giving the amplitude level in the pulse modulation. Thus, the current obtained by superimposing the currents IP and IB is supplied to the cathode of the laser diode 901.

By providing the laser diode drive circuit of cathode drive type as above, it is possible to derive the same effect as that in the fourth embodiment.

Also, as compared with the fourth embodiment, it is possible to simplify the circuit structure. It is thus possible to realize the laser diode drive circuit in which influence of variation of circuit elements can be lowered.

Subsequently, the present embodiment will be concretely explained.

Figure 25:
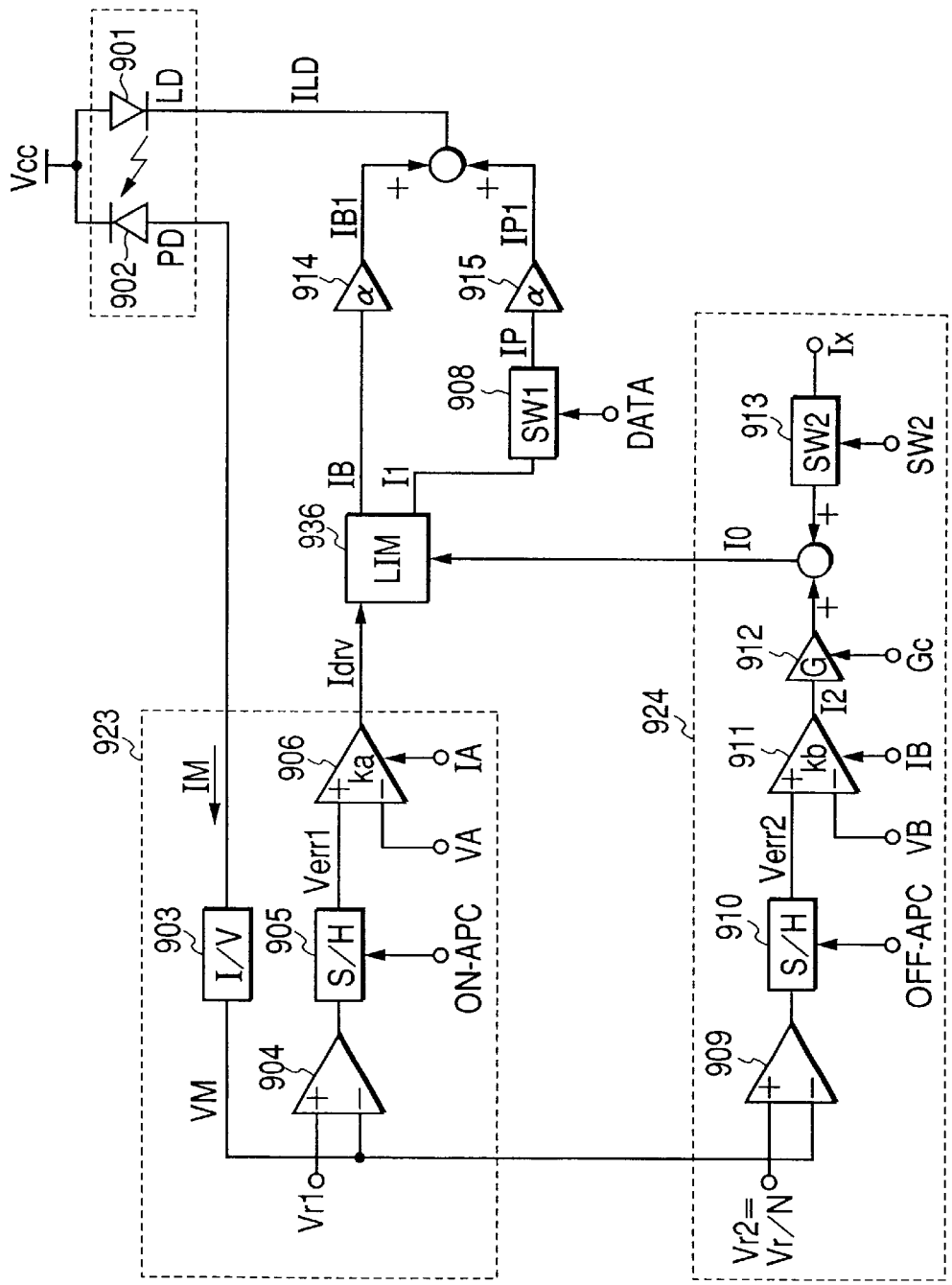
FIG. 25 is a circuit diagram showing the structure of the laser diode drive apparatus according to the twelfth embodiment of the present invention.

FIG. 25 shows the example of the laser diode drive circuit according to the present invention.

Numeral 901 denotes the laser diode of cathode drive type, and numeral 902 denotes a photodiode which monitors the light emission quantity from the laser diode 901.

Since a circuit 923 for determining the laser diode drive current Idrv concerning the light emission quantity and a current restriction circuit 924 for determining the restriction current value I0 have the same structures as those in the fourth embodiment respectively, the explanations thereof are omitted.

Figure 26:
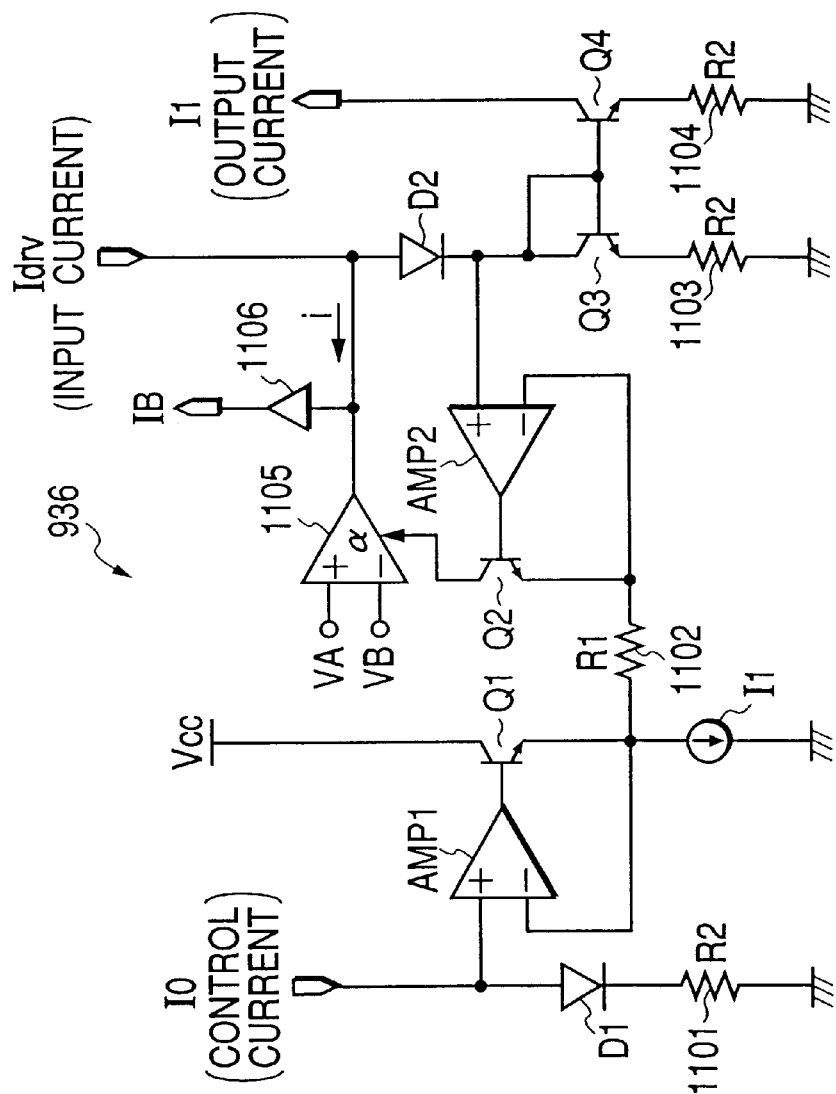
FIG. 26 is a circuit diagram showing the structure of the current restriction circuit.

FIG. 26 shows the current restriction circuit 936 in the present embodiment which performs the current restriction for the current Idrv according to the restriction current value I0. In this circuit 936, the current I1 for giving the amplitude level in the pulse modulation and the bias current IB are simultaneously determined. The current IB thus determined is input to a first current amplification circuit 914, and the current I1 is input to a second current amplification circuit 915. Further, the current obtained by superimposing an output current IB1 of the circuit 914 and an output current IP1 of the circuit 915 is supplied to the cathode of the laser diode 901.

Here, by using the first and second current amplification circuits 914 and 915, it becomes possible to lower power consumption in the control circuit unit consisting of the circuit 923 for determining the current Idrv and the circuit 924 for determining the value I0.

Subsequently, the structure and operation of the current restriction circuit 936 shown in FIG. 26 will be explained. It should be noted that, since the basic structure of this circuit is substantially the same as that in the fourth embodiment (FIG. 11), only the different point will be explained.

It has been already explained that, when the input current Idrv is subjected to the current restriction based on the value I0 and the current I1 is output, the current i as decreasing the current Idrv is produced. In other words, this current i corresponds to the bias current IB. Therefore, the current i output through a current buffer 1106 acts as the bias current IB, and the currents I1 and IB act as the output currents of the current restriction circuit 936.

For this reason, when it is considered practically manufacturing the circuit, it is possible to simplify the circuit structure as compared with the fourth embodiment. Further, it is possible to realize the circuit structure in which influence of variation of the circuit elements is small.

It should be noted that the explanations of the operations of the laser diode drive circuit and the current restriction circuit 936 are omitted.

(Thirteenth Embodiment)

Subsequently, the thirteenth embodiment will be explained with reference to FIG. 27. In the thirteenth embodiment, the parts same as those in the above-described embodiments are added with the same reference numerals respectively, and the explanations thereof are omitted.

Initially, the outline of the present embodiment will be explained.

In the present embodiment, an oscillation threshold current I2 is obtained from the difference current between a laser diode drive current Idrv controlled to set the light emission quantity of a laser diode 901 to have the desired value and the current necessary for obtaining 1/N of the desired light quantity. Then, a restriction current value I0

(current) is obtained by adding a constant current Ix to the current I2. Further, the current Idrv is subjected to the current restriction based on the restriction current value I0 in a current restriction circuit 936, and an output current I1 for giving the amplitude level in the pulse modulation is produced. Furthermore, a bias current IB is output from the difference current between the restriction current value I0 and the current Idrv equal to or larger than the restriction current value, and a pulse current IP for controlling the light emission operation is determined from the current giving the amplitude level in the pulse modulation. Further, the means for supplying the current obtained by superimposing the currents IP and IB to the cathode of the laser diode 901 and the means for supplying the current obtained by subtracting the current IP from the current Idrv to the anode of the diode 901 are simultaneously provided. Furthermore, the selection means for selecting either of these two means is provided, whereby the laser diode 901 of cathode drive type or the laser diode 901 of anode drive type is driven by using the selection means.

By providing the laser diode drive circuits of cathode drive type and anode drive type and also driving the diode 901 of desired drive type with the selection means, it is possible to derive the same effect as that in the sixth embodiment. Also, as compared with the sixth embodiment, it is possible to simplify the circuit structure and realize the laser diode drive circuit in which influence of variation of circuit elements can be lowered.

Subsequently, the present embodiment will be concretely explained.

Figure 27:
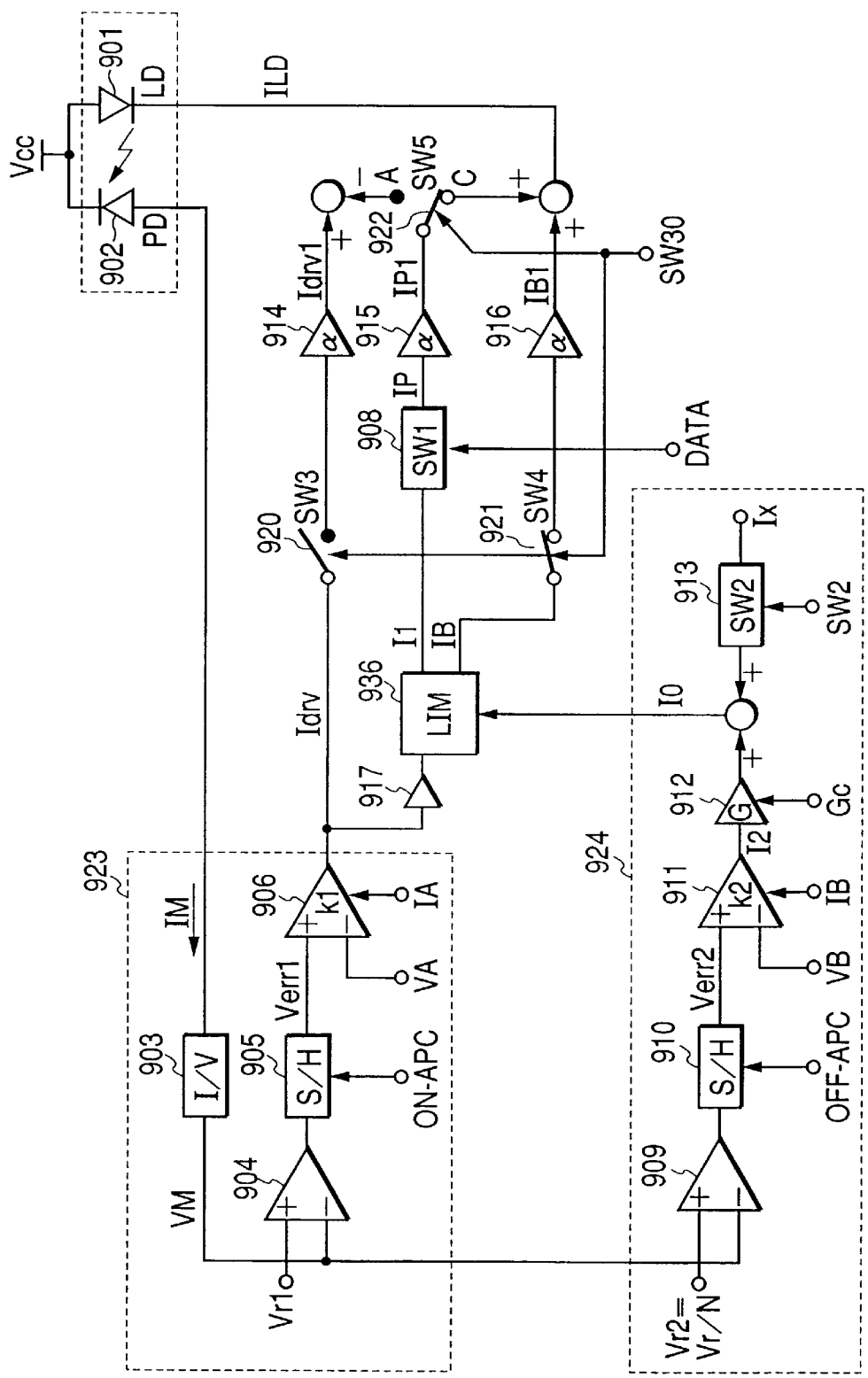
FIG. 27 is a circuit diagram showing the structure of the laser diode drive apparatus according to the thirteenth embodiment of the present invention.

FIG. 27 shows the example of the laser diode drive circuit according to the present invention.

Initially, the structure of the present embodiment will be explained. Numeral 901 denotes the laser diode of cathode drive type, and numeral 902 denotes a photodiode which monitors the light emission quantity from the laser diode 901.

Since a circuit 923 for determining the laser diode drive current Idrv concerning the light emission quantity and a current restriction circuit 924 for determining the restriction current value I0 have the same structures as those in the fourth embodiment respectively, the explanations thereof are omitted.

In the present embodiment, the current Idrv determined by the circuit 923 is input to a first current amplification circuit 914 through a third switching circuit 920. Further, the current Idrv is input to the second current restriction circuit 936 having the structure (FIG. 26) in the twelfth embodiment through a first current buffer 917, and then subjected to the current restriction. Thus, the current I1 for giving the amplitude level in the optical pulse modulation and the bias current IB are simultaneously determined. The determined current I1 is input to a first switching circuit 908, and the pulse current IP output from the circuit 908 is then input to a second current amplification circuit 915. Furthermore, the current IB is input to a third current amplification circuit 916 through a fourth switching circuit 921.

By using the first, second and third current amplification circuits 914, 915 and 916, it is possible to lower power consumption in the control circuit until it consists of the circuit 923 for determining the current Idrv and the first current restriction circuit 924 for determining the value I0.

In the present embodiment, since the laser diode 901 of cathode drive type is driven, the third switching circuit 920 is in the nonconductive state, the fourth switching circuit 921 is in the conductive state, and a fifth switching circuit 922 selects the side (i.e., terminal C side in FIG. 27) through which the currents IP1 and IB1 are superimposed. Thus, the current obtained by superimposing the currents IP1 and IB1 is supplied to the cathode of the laser diode 901. Therefore, as compared with the sixth embodiment, it is possible to simplify the practical circuit structure and also realize the laser diode drive circuit in which influence of variation of circuit elements can be lowered.

Further, a control signal SW3 is applied such that the third switching circuit 920 comes to be in the conductive state, the fourth switching circuit 921 comes to be in the nonconductive state, and the fifth switching circuit 922 selects the side (i.e., terminal A side) through which the current IP1 is subtracted from the current Idrv1. Also, the current obtained by subtracting the current IP1 from the current Idrv is supplied to the anode of the laser diode 901 of anode drive type, whereby it is possible to drive the laser diode 901.

As describe above, by applying the appropriate control signal as the control signal SW3, it is possible to drive the laser diode 901 of different drive types (i.e., cathode drive type and anode drive type).

It should be noted that, since the operation in the present embodiment is substantially the same as that in the sixth embodiment, the explanation thereof is omitted.

(Fourteenth Embodiment)

Subsequently, the fourteenth embodiment will be explained with reference to FIG. 28. In the fourteenth embodiment, the parts same as those in the above-described embodiments are added with the same reference numerals respectively, and the explanations thereof are omitted.

Initially, the outline of the present embodiment will be explained.

In the present embodiment, an oscillation threshold current I2 is obtained from the difference current between a laser diode drive current Idrv controlled to set the light emission quantity of a laser diode 901 to have the desired value and the current necessary for obtaining 1/N of the desired light quantity. The current obtained by multiplying the current I2 and its coefficient together is added to the current I2 to obtain a restriction current value I0 (current). Further, the current Idrv is subjected to the current restriction based on the restriction current value I0 in a current restriction circuit 936, and an output current I1 for giving the amplitude level in the pulse modulation is produced. Then, the difference current between the value I0 and the current Idrv equal to or larger than the restriction current value is output as a bias current IB, a pulse current IP for controlling the light emission operation is determined from the current for giving the amplitude level in the pulse modulation, and the current obtained by superimposing the currents IP and IB is supplied to the cathode of the laser diode 901.

By providing the laser diode drive circuit of cathode drive type, it is possible to derive the same effect as that in the eighth embodiment. Further, as compared with the eighth embodiment, it is possible to simplify the circuit structure and also realize the laser diode drive circuit in which influence of variation of circuit elements can be lowered.

Subsequently, the present embodiment will be concretely explained.

Figure 28:
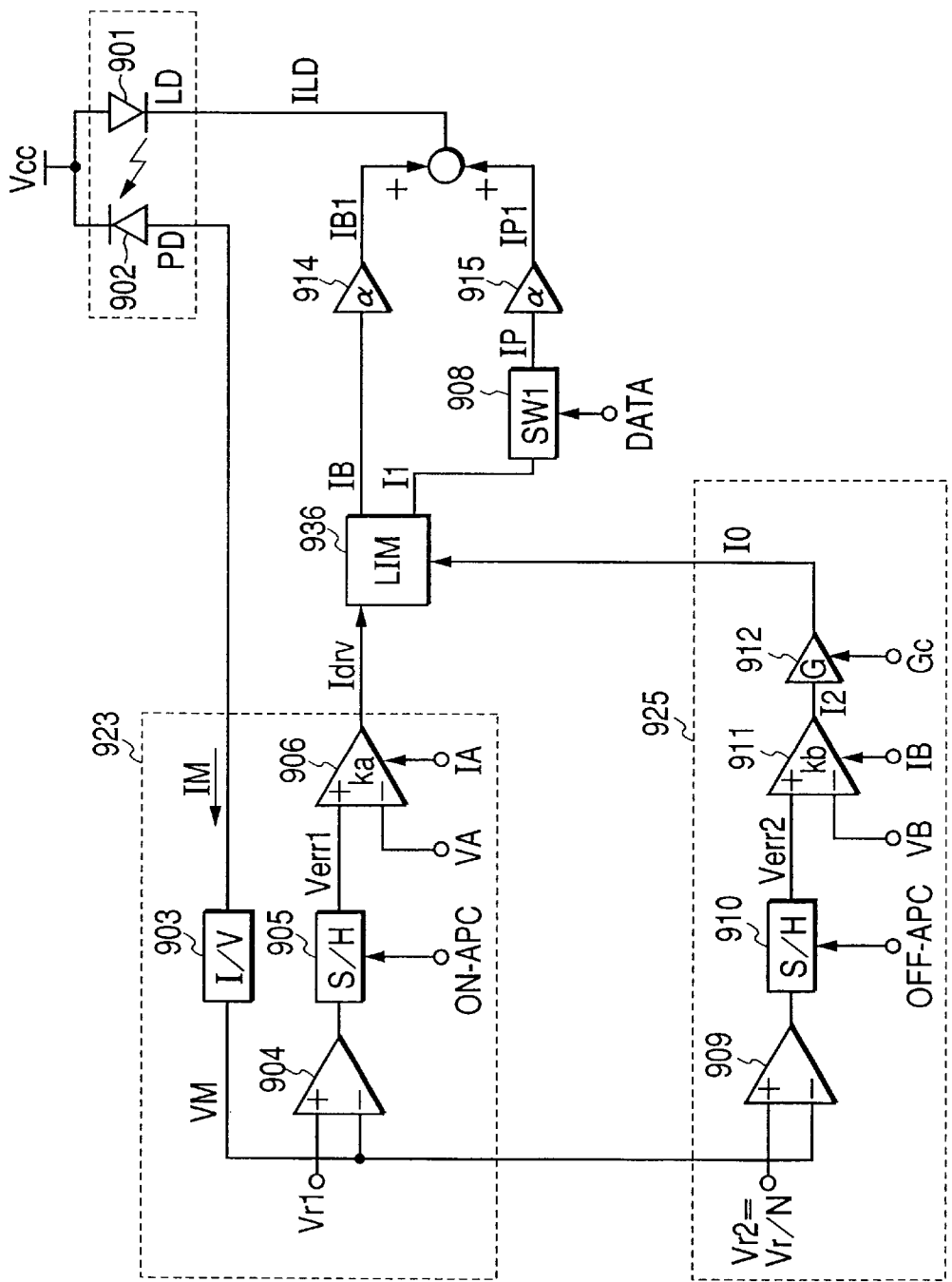
FIG. 28 is a circuit diagram showing the structure of the laser diode drive apparatus according to the fourteenth embodiment of the present invention.

FIG. 28 shows the structural example of the laser diode drive circuit according to the present invention.

Initially, the structure of the present embodiment will be explained. Numeral 901 denotes the laser diode of cathode drive type, and numeral 902 denotes a photodiode which monitors the light emission quantity from the laser diode 901.

Since a circuit 923 for determining the laser diode drive current Idrv concerning the light emission quantity and a current restriction circuit 925 for determining the restriction current value I0 have the same structures as those in the eighth embodiment respectively, the explanations thereof are omitted.

In the present embodiment, in the case where the current Idrv is subjected to the current restriction based on the restriction current value I0, the current I1 for giving the amplitude level in the optical pulse modulation and the bias current IB are simultaneously determined by using the second current restriction circuit 936 previously explained in the twelfth embodiment. The determined current IB is input to a first current amplification circuit 914, and the determined current I1 is input to a first switching circuit 908 to output a pulse current IP. The output pulse current IP is input to a second current amplification circuit 915. Then, the current obtained by superimposing an output current IB1 of the circuit 914 and an output current IP1 of the circuit 915 is supplied to the cathode of the laser diode 901.

Here, by using the first and second current amplification circuits 914 and 915, it becomes possible to lower power consumption in the control circuit unit to consists of the circuit 923 for determining the current Idrv and the current restriction circuit 925 for determining the value I0.

Further, by using such the structure, when it is considered practically manufacturing the circuit, it is possible to simplify the circuit structure as compared with the eighth embodiment. Further, it is also possible to realize the circuit structure in which influence of variation of the circuit elements is small.

It should be noted that, since the operation of the present embodiment is substantially the same as that of the eighth embodiment, the explanation thereof is omitted.

(Fifteenth Embodiment)

Subsequently, the fifteenth embodiment will be explained with reference to FIG. 29. In the fifteenth embodiment, the parts same as those in the above-described embodiments are added with the same reference numerals respectively, and the explanations thereof are omitted.

Initially, the outline of the present embodiment will be explained.

In the present embodiment, an oscillation threshold current I2 is obtained from the difference current between a laser diode drive current Idrv controlled to set the light emission quantity of a laser diode 901 to have the desired value and the current necessary for obtaining 1/N of the desired light quantity. The current obtained by multiplying the current I2 and its coefficient together is added to the current I2 to obtain a restriction current value I0 (current). Further, the current Idrv is subjected to the current restriction based on the restriction current value I0 in a current restriction circuit 936, and an output current I1 for giving the amplitude level in the pulse modulation is produced. Further, the difference current between the value I0 and the current Idrv equal to or larger than the restriction current value is output as a bias current IB, and a pulse current IP for controlling the light emission operation is determined from the current for giving the amplitude level in the pulse modulation.

Further, in the present embodiment, the means for supplying the current obtained by superimposing the currents IP and IB to the cathode of the laser diode 901 and the means for supplying the current obtained by subtracting the current IP from the current Idrv to the anode of the diode 901 are simultaneously provided. Also, the selection means for selecting either of these two means is provided, whereby the diode 901 of cathode drive type or the diode 901 of anode drive type is driven by using the selection means.

If such the laser diode drive circuits of cathode drive type and anode drive type are provided and the laser diode 901 of desired drive type is selected by the selection means, it is possible to derive the same effect as that in the tenth embodiment. Also, as compared with the tenth embodiment, it is possible to simplify the circuit structure and also realize the laser diode drive circuit in which influence of variation of the circuit elements is small.

Subsequently, the present embodiment will be concretely explained.

Figure 29:
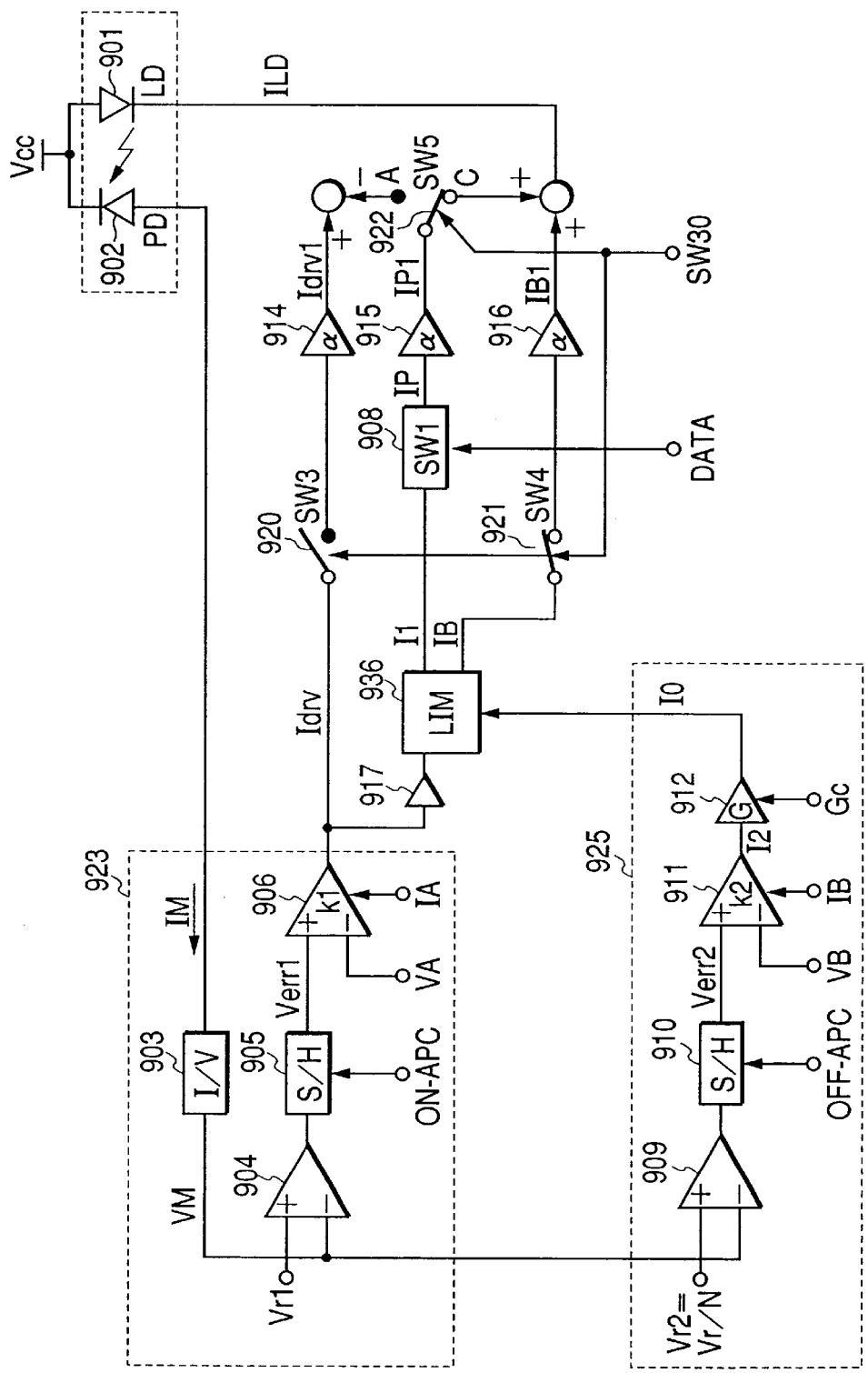
FIG. 29 is a circuit diagram showing the structure of the laser diode drive apparatus according to the fifteenth embodiment of the present invention.
Figure 30:
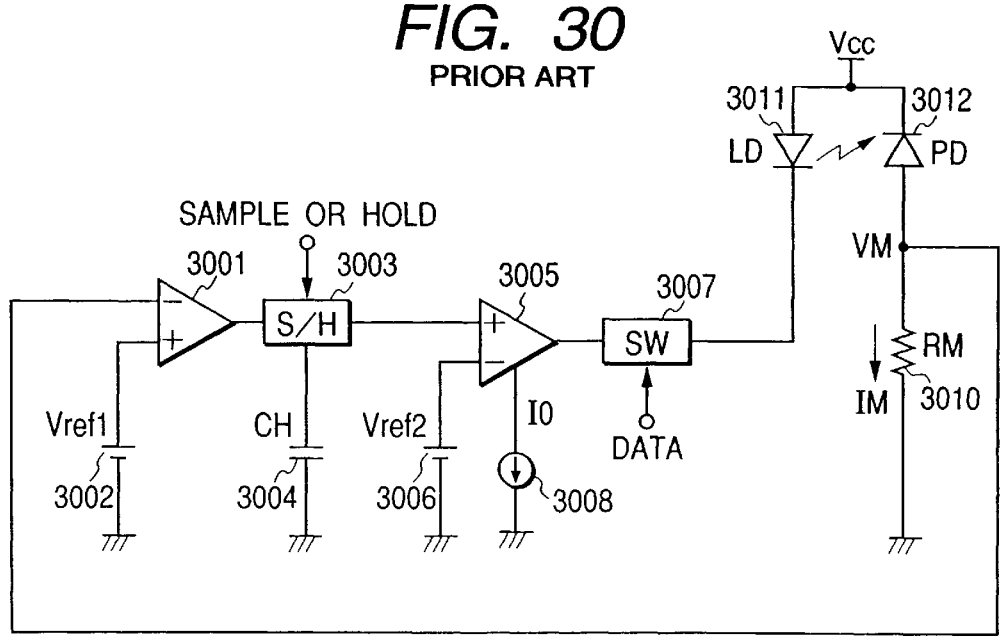
FIG. 30 is a circuit diagram showing the laser diode drive circuit in the conventional image formation apparatus.
Figure 31:
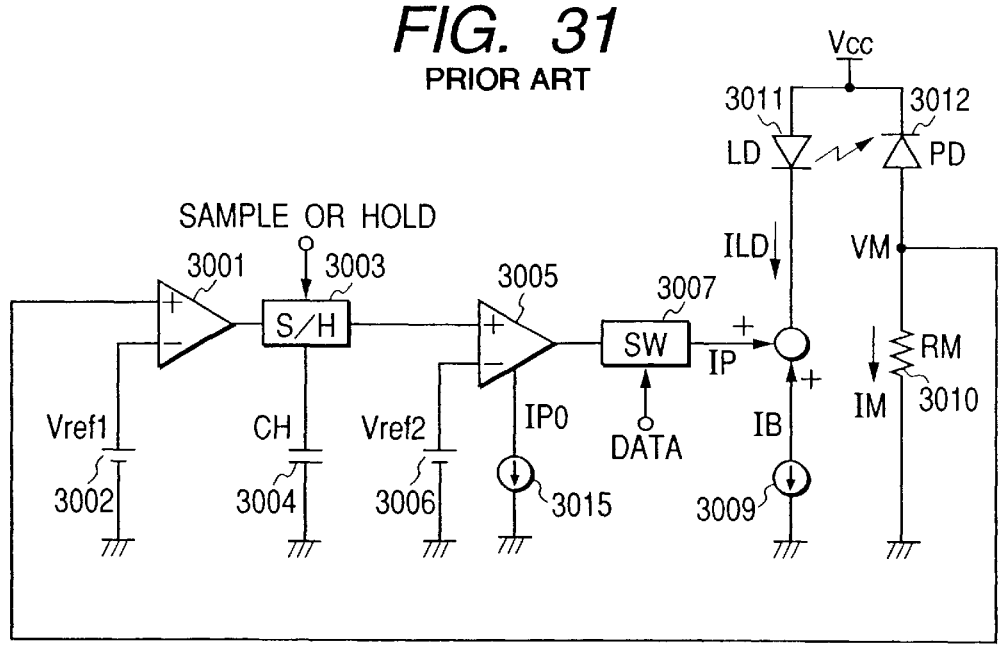
FIG. 31 is a circuit diagram showing the laser diode drive circuit subjected to the pulse current control in the conventional image formation apparatus.
Figure 32:
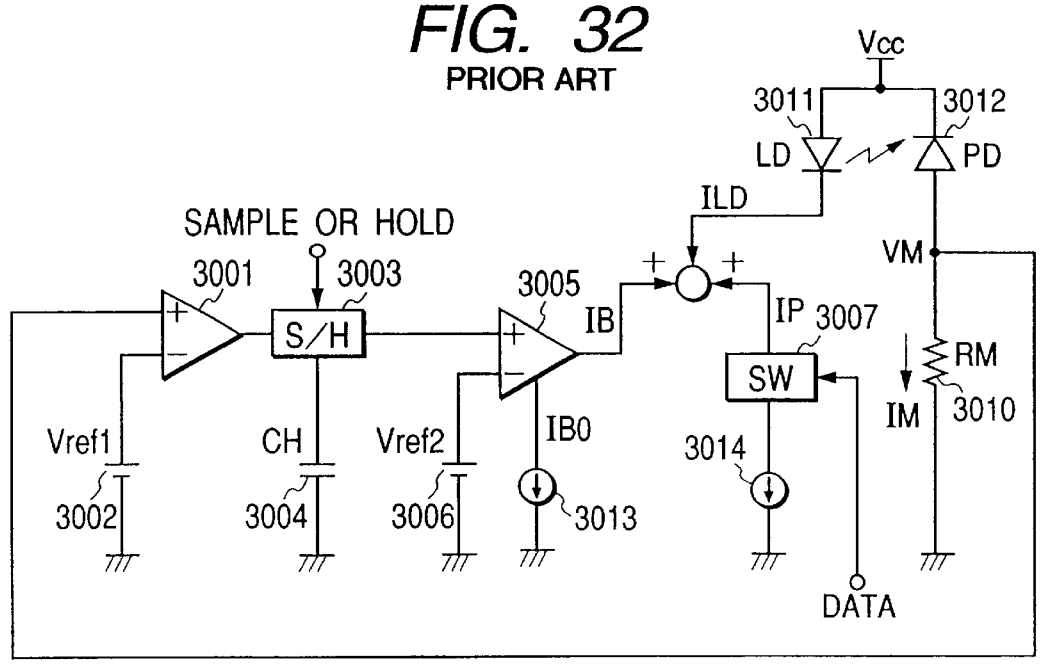
FIG. 32 is a circuit diagram showing the laser diode drive circuit subjected to the bias current control in the conventional image formation apparatus.

FIG. 29 shows the structural example of the laser diode drive circuit according to the present embodiment.

Initially, the structure of the present embodiment will be explained. Numeral 901 denotes the laser diode of cathode drive type, and numeral 902 denotes a photodiode which monitors the light emission quantity from the laser diode 901.

Since a circuit 923 for determining the laser diode drive current Idrv concerning the light emission quantity and a current restriction circuit 925 for determining the restriction current value I0 have the same structures as those in the eighth embodiment respectively, the explanations thereof are omitted.

In the present embodiment, the current Idrv determined by the circuit 923 is input to a first current amplification circuit 914 through a third switching circuit 920. Further, the current Idrv is input to the current restriction circuit 936 explained in the twelfth embodiment through a first current buffer 917, and then subjected to the current restriction. Thus, the current I1 for giving the amplitude level in the optical pulse modulation and the bias current IB are simultaneously determined. The determined current I1 is output as a pulse current IP through a first switching circuit 908, and then input to a second current amplification circuit 915.

Further, the current IB is input to a third current amplification circuit 916 through a fourth switching circuit 921. In the present embodiment, since the laser diode 901 of cathode drive type is driven, the third switching circuit 920 is in the nonconductive state, the fourth switching circuit 921 is in the conductive state, and a fifth switching circuit 922 selects the side (i.e., terminal C side) through which currents IP1 and IB1 are superimposed. Thus, the current obtained by superimposing the currents IP1 and IB1 is supplied to the cathode of the laser diode 901.

By using the structure in the present embodiment, in case of practically manufacturing the circuit, it is possible to simplify the circuit structure as compared with the tenth embodiment. Further, it is also possible to realize the laser diode drive circuit in which influence of variation of the circuit elements is small.

Furthermore, a control signal SW30 is applied such that the third switching circuit 920 comes to be in the conductive state, the fourth switching circuit 921 comes to be in the nonconductive state, and the fifth switching circuit 922 selects the side (i.e., terminal A side) through which the current IP1 is subtracted from the current Idrv. Also, the current obtained by subtracting the current IP1 from the current Idrv is supplied to the anode of the laser diode 901 of anode drive type, whereby it is possible to drive the laser diode 901. That is, by applying the appropriate control signal as the control signal SW3, it is possible to drive the laser diode 901 of different drive types (i.e., cathode drive type and anode drive type).

It should be noted that, since the operation in the present embodiment is substantially the same as that in the tenth embodiment, the explanation thereof is omitted.

(Effect 4)

As explained above, according to the fourth embodiment, the laser diode drive current is determined by the predetermined means, the current on which the pulse current and the bias current are superimposed is produced by using the determined laser diode drive current and the current restriction means, and the obtained current is then supplied to the cathode of the laser diode. Therefore, even if the characteristics such as the oscillation threshold current, the slope efficiency and the like change due to change in the operation temperature of the laser diode or the like, it is always possible to stably supply the bias current nearby the oscillation threshold current. As a result, it is possible to highly improve the frequency characteristic and always generate the laser beam of which quenching ratio is superior.

(Effect 5)

As explained above, according to the fifth embodiment, the laser diode drive current is determined by the predetermined means, the pulse current is produced by using the determined laser diode drive current and the current restriction means, and the current obtained by subtracting the pulse current from the laser diode drive current is supplied to the anode of the laser diode, whereby it is possible to derive the effect substantially identical with the above Effect 4.

(Effect 6)

As explained above, according to the sixth embodiment, the laser diode drive current is determined by the predetermined means, and the pulse current and the current on which the pulse and bias currents are superimposed are produced by using the determined laser diode drive current and the current restriction means. Further, there are provided the two kinds of drive means, one for driving the laser diode by supplying the obtained superimposition current to the cathode of the laser diode, and the other for driving the laser diode by supplying the current obtained by subtracting the pulse current from the laser diode drive current to the anode of the laser diode. Thus, since either of these drive means is selected according to the drive type to drive the laser diode, it is possible to derive the effect substantially identical with the above Effect 4. Furthermore, since the two laser diodes of the different drive types can be driven by the single circuit, it is unnecessary to prepare the plural drive circuits suitable for the respective drive types. As a result, it is possible to simplify the circuit structure.

(Effect 7)

As explained above, according to the seventh embodiment, it is possible to derive the effect substantially identical with the above Effect 6.

(Effect 8)

As explained above, according to the eighth embodiment, the laser diode drive current is determined by the predetermined means, the current on which the pulse current and the bias current are superimposed is produced by using the determined laser diode drive current and the current restriction means, and the obtained current is then supplied to the cathode of the laser diode, whereby it is possible to derive the effect substantially identical with the above Effect 4. Further, it is possible to reduce one constant current and one control signal.

(Effect 9)

As explained above, according to the ninth embodiment, the laser diode drive current is determined by the predetermined means, the pulse current is produced by using the determined laser diode drive current and the current restriction means, and the current obtained by subtracting the pulse current from the laser diode drive current is then supplied to the anode of the laser diode, whereby it is possible to derive the effect substantially identical with the above Effect 4. Further, it is possible to reduce one constant current and one control signal.

(Effect 10)

As explained above, according to the tenth embodiment, the laser diode drive current is determined by the predetermined means, and the pulse current and the current on which the pulse and bias currents are superimposed are produced by using the determined laser diode drive current and the current restriction means. Further, there are provided the two kinds of drive means, one for driving the laser diode by supplying the obtained superposition current to the cathode of the laser diode, and the other for driving the laser diode by supplying the current obtained by subtracting the pulse current from the laser diode drive current to the anode of the laser diode. Thus, since either of these drive means is selected according to the drive type to drive the laser diode, it is possible to derive the effect substantially identical with the above Effect 6. Furthermore, it is possible to reduce one constant current and one control signal.

(Effect 11)

As explained above, according to the eleventh embodiment, it is possible to derive the effect substantially identical with the above Effect 10.

(Effect 12)

As explained above, according to the twelfth embodiment, the laser diode drive current is determined by the predetermined means, the current on which the pulse current and the bias current are superimposed is produced by using the determined laser diode drive current and the current restriction means, and the obtained current is then supplied to the cathode of the laser diode, whereby it is possible to derive the effect substantially identical with the above Effect 4. Further, when it is considered practically manufacturing the circuit, it is possible to simplify the circuit itself and also realize the circuit structure in which influence of variation of the circuit elements on the light emission characteristic is small.

(Effect 13)

As explained above, according to the thirteenth embodiment, the laser diode drive current is determined by the predetermined means, and the pulse current and the current on which the pulse and bias currents are superimposed are produced by using the determined laser diode drive current and the current restriction means. Further, there are provided the two kinds of drive means, one for driving the laser diode by supplying the obtained current to the cathode of the laser diode, and the other for driving the laser diode by supplying the current obtained by subtracting the pulse current from the laser diode drive current to the anode of the laser diode. Thus, since either of these drive means is selected according to the drive type to drive the laser diode, it is possible to derive the effect substantially identical with the above Effect 6. Furthermore, when it is considered practically manufacturing the circuit, it is possible to simplify the circuit itself and also realize the circuit structure in which influence of variation of the circuit elements on the light emission characteristic is small.

(Effect 14)

As explained above, according to the fourteenth embodiment, the laser diode drive current is determined by the predetermined means, the current on which the pulse current and the bias current are superimposed is produced by using the determined laser diode drive current and the current restriction means, and the obtained current is then supplied to the cathode of the laser diode, whereby it is possible to derive the effect substantially identical with the above Effect 8. Further, when it is considered practically manufacturing the circuit, it is possible to simplify the circuit itself and also realize the circuit structure in which influence of variation of the circuit elements on the light emission characteristic is small.
(Effect 15)

As explained above, according to the fifteenth embodiment, the laser diode drive current is determined by the predetermined means, and the pulse current and the current on which the pulse and bias currents are superimposed are produced by using the determined laser diode drive current and the current restriction means. Further, there are provided the two kinds of drive means, one for driving the laser diode by supplying the obtained superimposition current to the cathode of the laser diode, and the other for driving the laser diode by supplying the current obtained by subtracting the pulse current from the laser diode drive current to the anode of the laser diode. Thus, since either of these drive means is selected according to the drive type to drive the laser diode, it is possible to derive the effect substantially identical with the above Effect 10. Further, when it is considered practically manufacturing the circuit, it is possible to simplify the circuit itself and also realize the circuit structure in which influence of variation of the circuit elements on the light emission characteristic is small.

As above, although the present invention has been explained with reference to the several preferred embodiments, the present invention is not limited to these embodiments. That is, it is apparent that various modifications and application are possible within the scope of the appended claims.

What is claimed is:

1. A light source drive apparatus for causing a light source to generate a modulation light beam of a desired light quantity by supplying a drive current to said light source, comprising:
   determination means for determining a value of the drive current by which the light beam of the desired light quantity is generated;
   modulation current generation means for generating a modulation current modulated by an input signal;
   restriction means for restricting an amplitude value of the modulation current, to a fixed value independent of the drive current determined by said determination means when the value of the drive current is large, and to a variable value according to the drive current determined by said determination means when the value of the drive current is small;
   bias current generation means for generating a bias current representing a difference between the value of the drive current and the amplitude value of the modulation current restricted by said restriction means; and
   supply means for adding the bias current to the modulation current of which amplitude value is restricted by said restriction means, and supplying the obtained current to said light source.

2. An apparatus according to claim 1, wherein said restriction means restricts the amplitude value of the modulation current on the basis of the value of the drive current.

3. An apparatus according to claim 1, further comprising:
   monitor means for monitoring the light quantity of the light beam generated from said light source, and
   wherein said determination means determines the value of the drive current on the basis of the light quantity monitored by said monitor means.

4. An apparatus according to claim 1, wherein said light source is a laser diode, and said supply means supplies the current to a cathode of the laser diode.

5. A light source drive apparatus for causing a light source to generate a modulation light beam of a desired light quantity by supplying a drive current to said light source, comprising:
   determination means for determining a value of the drive current by which the light beam of the desired light quantity is generated;
   drive current generation means for generating the drive current;
   modulation current generation means for generating a modulation current modulated by an input signal;
   restriction means for restricting an amplitude value of the modulation current, to a fixed value independent of the drive current determined by said determination means when the value of the drive current is large, and to a variable value according to the drive current determined by said determination means when the value of the drive current is small; and
   supply means for subtracting the modulation current restricted by said restriction means from the drive current, and supplying the obtained current to said light source.

6. An apparatus according to claim 5, further comprising:
   monitor means for monitoring the light quantity of the light beam generated from said light source, and
   wherein said determination means determines the value of the drive current on the basis of the light quantity monitored by said monitor means.

7. An apparatus according to claim 5, wherein said light source is a laser diode, and said supply means supplies the current to an anode of the laser diode.

8. A light source drive apparatus for causing a light source to generate a modulation light beam of a desired light quantity by supplying a drive current to said light source, comprising:
   determination means for determining a value of the drive current by which the light beam of the desired light quantity is generated;
   means for generating a modulation current modulated according to an input signal; and
   restriction means for restricting an amplitude value of the modulation current, to a fixed value independent of the drive current determined by said determination means when the value of the drive current is large, and to a variable value according to the drive current determined by said determination means when the value of the drive current is small,
   wherein the current of the determined value is supplied to said light source on the basis of an ON state of the input signal, and
   the current representing a difference between the determined value of the drive current and the amplitude value of the modulation current restricted by said restriction means is supplied to said light source on the basis of an OFF state of the input signal.

9. An apparatus according to claim 8, wherein said restriction means restricts the amplitude value of the modulation current on the basis of the value of the drive current.

10. An apparatus according to claim 8, further comprising:
   monitor means for monitoring the light quantity of the light beam generated from said light source, and
   wherein said determination means determines the value of the drive current on the basis of the light quantity monitored by said monitor means.

11. An apparatus according to claim 8, further comprising:
means for generating a bias current representing a difference current between the drive current and the modulation current restricted by said restriction means; and
supply means for supplying to said light source the current obtained by adding the bias current to the modulation current restricted by said restriction means.

12. An apparatus according to claim 11, wherein said light source is a laser diode, and said supply means supplies the current to a cathode of the laser diode.

13. An apparatus according to claim 8, further comprising supply means for supplying to said light source the current obtained by subtracting the modulation current restricted by said restriction means from the drive current.

14. An apparatus according to claim 13, wherein said light source is a laser diode, and said supply means supplies the current to an anode of the laser diode.

15. An image formation apparatus which forms an image on a photosensitive body by using a light beam generated from a light source driven by a light source drive apparatus, comprising said light source drive apparatus that causes said light source to generate a modulation light beam of a desired light quantity by supplying a drive current to said light source, and said light source drive apparatus comprises means for supplying the drive current for causing said light source to generate the light beam of the desired light quantity, to said light source on the basis of an ON state of an input signal, means for supplying a bias current of a level to the extent that said light source does not generate the light beam, on the basis of an OFF state of the input signal, and restriction means for restricting a difference between a value of the drive current and a value of the bias current.

16. An image formation apparatus which forms an image on a photosensitive body by using a light beam generated from a light source driven by a light source drive apparatus, comprising said light source drive apparatus that causes said light source to generate a modulation light beam of a desired light quantity by supplying a drive current to said light source, and
said light source drive apparatus comprises
determination means for determining a value of the drive current by which the light beam of the desired light quantity is generated,
modulation current generation means for generating a modulation current modulated by an input signal,
restriction means for restricting an amplitude value of the modulation current,
bias current generation means for generating a bias current representing a difference between the value of the drive current and the amplitude value of the modulation current restricted by said restriction means, and
supply means for adding the bias current to the modulation current of which amplitude value is restricted by said restriction means, and supplying the obtained current to said light source.

17. An image formation apparatus which forms an image on a photosensitive body by using a light beam generated from a light source driven by a light source drive apparatus, comprising said light source drive apparatus that causes said light source to generate a modulation light beam of a desired light quantity by supplying a drive current to said light source, and
said light source drive apparatus comprises determination means for determining a value of the drive current by which the light beam of the desired light quantity is generated,
drive current generation means for generating the drive current,
modulation current generation means for generating a modulation current modulated by an input signal,
restriction means for restricting an amplitude value of the modulation current, and
supply means for subtracting the modulation current restricted by said restriction means from the drive current, and supplying the obtained current to said light source.

18. An image formation apparatus which forms an image on a photosensitive body by using a light beam generated from a light source driven by a light source drive apparatus, comprising said light source drive apparatus that causes said light source to generate a modulation light beam of a desired light quantity by supplying a drive current to said light source, and
said light source drive apparatus comprises
determination means for determining a value of the drive current by which the light beam of the desired light quantity is generated,
means for generating a modulation current modulated according to an input signal, and
restriction means for restricting an amplitude value of the modulation current,
wherein the current of the determined value is supplied to said light source on the basis of an ON state of the input signal, and the current representing a difference between the determined value of the drive current and the amplitude value of the modulation current restricted by said restriction means is supplied to said light source on the basis of an OFF state of the input signal.

19. A light source drive apparatus for causing a light source to generate a modulation light beam of a desired light quantity by supplying a drive current to a laser diode, comprising:
determination means for determining a value of the drive current by which the light beam of the desired light quantity is generated;
means for generating a modulation current modulated according to an input signal;
restriction means for restricting an amplitude value of the modulation current;
cathode supply means for generating a bias current representing a difference current between the drive current and the modulation current restricted by said restriction means, and supplying to a cathode of the laser diode the current obtained by adding the bias current to the modulation current restricted by said restriction means; and
anode supply means for supplying to an anode of the laser diode the current obtained by subtracting the modulation current restricted by said restriction means from the drive current,
wherein the current of the determined value is supplied to said light source on the basis of an ON state of the input signal, and
the current representing a difference between the determined value of the drive current and the amplitude value of the modulation current restricted by said restriction means is supplied to said light source on the basis of an OFF state of the input signal.

20. An apparatus according to claim 19, further comprising selection means for selecting either said cathode supply means or said anode supply means.

21. A light source drive apparatus which supplies to a laser diode a drive current composed of a bias current and a modulation current, comprising:

determination means for determining a value of the drive current necessary to cause a light source to generate light of a desired light quantity; and modulation current generation means for determining an amplitude value of the modulation current and a value of the bias current on the basis of the drive current determined by said determination means, wherein, when the necessary drive current determined by said determination means belongs to a range equal to or greater than a predetermined value, the value of the modulation current is fixed to a value independent of the value of the drive current, and the bias current is changed according to the value of the necessary drive current, and when the necessary drive current belongs to a range smaller than the predetermined value, the bias current and the modulation current are changed according to the value of the necessary drive current.

22. An apparatus according to claim 21, further comprising:

monitor means for monitoring the light quantity of the light generated from the light source, and wherein said determination means determines the value of the drive current on the basis of the light quantity monitored by said monitor means.

23. An apparatus according to claim 21, wherein said light source is a laser diode, and said light source drive apparatus supplied the current to a cathode of the laser diode.

24. An apparatus according to claim 21, wherein said light source is a laser diode, and said light source drive apparatus supplies the current to an anode of the laser diode.

* * * * *

UNITED STATES PATENT AND TRADEMARK OFFICE
CERTIFICATE OF CORRECTION

PATENT NO. : 6,259,466 B1
DATED : July 10, 2001
INVENTOR(S) : Masanobu Oomura et al.

It is certified that error appears in the above-identified patent and that said Letters Patent is hereby corrected as shown below:

Column 9,
Line 19, "relation" should read -- relation of --.

Column 12,
Line 31, "volt age" should read -- voltage --; and
Line 42, "an d" should read -- and --.

Column 17,
Line 20, "a" (second occurrence) should read -- $\alpha$ --; and
Line 25, "a" should read -- $\alpha$ --.

Column 18,
Line 15, "a" should read -- $\alpha$ --.

Column 22,
Line 5, "$\{R2 \cdot (Idrv - i) + VBE(Q3) - R2 \cdot I0 - VF(D1)\}/R1$" should read
-- = $\{R2 \cdot (Idrv - i) + VBE(Q3) - R2 \cdot I0 - VF(D1)\}/R1$ --; and
Line 35, "a" should read -- $\alpha$ --.

Column 37,
Line 12, "eight" should read -- eighth --; and
Line 43, "base d" should read -- based --.

UNITED STATES PATENT AND TRADEMARK OFFICE
CERTIFICATE OF CORRECTION

PATENT NO. : 6,259,466 B1
DATED : July 10, 2001
INVENTOR(S) : Masanobu Oomura et al.

It is certified that error appears in the above-identified patent and that said Letters Patent is hereby corrected as shown below:

Column 52,
Line 14, "supplied" should read -- supplies --.

Signed and Sealed this

Fifth Day of March, 2002

Attest:

JAMES E. ROGAN
*Attesting Officer*     *Director of the United States Patent and Trademark Office*